US012795406B2

(12) United States Patent
Mitra et al.

(10) Patent No.: US 12,795,406 B2
(45) Date of Patent: Nov. 10, 2026

(54) ENHANCED RADIO FREQUENCY CHANNEL RECONFIGURATION

(71) Applicant: Dell Products L.P., Round Rock, TX (US)

(72) Inventors: Jeebak Mitra, Ottawa (CA); Gwenael Poitau, Montreal (CA)

(73) Assignee: Dell Products L.P., Round Rock, TX (US)

( * ) Notice: Subject to any disclaimer, the term of this patent is extended or adjusted under 35 U.S.C. 154(b) by 330 days.

(21) Appl. No.: 18/677,603

(22) Filed: May 29, 2024

(65) Prior Publication Data

US 2025/0374079 A1 Dec. 4, 2025

(51) Int. Cl.
*H04W 24/02* (2009.01)
*H04B 7/0426* (2017.01)
*H04W 52/02* (2009.01)

(52) U.S. Cl.
CPC .......... *H04W 24/02* (2013.01); *H04B 7/0426* (2013.01); *H04W 52/0206* (2013.01)

(58) Field of Classification Search
CPC ............. H04W 24/02; H04W 52/0206; H04W 52/0258; H04B 7/0426
USPC .......................................................... 370/311
See application file for complete search history.

(56) References Cited

U.S. PATENT DOCUMENTS 6,721,355 B1 * 4/2004 McClennon ............ H04L 12/10 375/377
8,798,120 B2 * 8/2014 de Veciana ....... H04W 52/0261 375/295
11,382,033 B2 * 7/2022 Bellamkonda ......... H04B 7/086
2012/0124398 A1 * 5/2012 Diab ..................... H04L 43/065 709/224
2012/0289224 A1 * 11/2012 Hallberg ........... H04W 52/0206 455/424

(Continued)

OTHER PUBLICATIONS

Office Action mailed Jul. 30, 2025 for U.S. Appl. No. 18/656,200, 52 pages.

(Continued)

*Primary Examiner* — Jean A Gelin
(74) *Attorney, Agent, or Firm* — Amin, Turocy & Watson, LLP

(57) ABSTRACT

Management of RF channel configuration for a base station with regard to communication sessions associated with devices to achieve desirable communication performance and network energy savings (NES) can be enhanced. Configuration manager component (CMC) can employ traffic prediction to predict data traffic to be communicated between base station and device during a time period. CMC can determine, from a group of RF channel configuration modes, a subgroup of candidate modes that can satisfy defined performance criteria. CMC, employing a spatial power consumption model, can determine respective power consumption of respective candidate modes with regard to the data traffic predicted to be communicated during the time period, and can determine which candidate mode provides highest NES and/or rank the respective candidate modes based on respective NES. CMC can determine and select the candidate mode to use at base station based on candidate mode that provides the highest NES.

20 Claims, 17 Drawing Sheets

(56) References Cited

U.S. PATENT DOCUMENTS

| | | | | |
|---|---|---|---|---|
| 2014/0226500 | A1* | 8/2014 | Zhou | H04W 24/10 370/252 |
| 2022/0132374 | A1* | 4/2022 | Cellarius | H04L 41/5051 |
| 2022/0321408 | A1 | 10/2022 | Mahimkar et al. | |
| 2023/0068437 | A1 | 3/2023 | Narayanan et al. | |
| 2023/0097818 | A1* | 3/2023 | Maleki | H04W 52/0245 455/574 |
| 2023/0102489 | A1 | 3/2023 | Hu et al. | |
| 2023/0188233 | A1* | 6/2023 | Gupta Hyde | H04B 17/3913 370/329 |
| 2023/0247655 | A1* | 8/2023 | Ly | H04W 72/1268 370/329 |
| 2024/0267756 | A1* | 8/2024 | Jafarian | H04W 24/02 |
| 2024/0276348 | A1* | 8/2024 | Ertimo | H04W 24/02 |
| 2024/0373345 | A1* | 11/2024 | Niemela | H02J 3/14 |
| 2024/0422667 | A1* | 12/2024 | Luo | G06N 3/044 |
| 2025/0102656 | A1 | 3/2025 | Mamandipoor et al. | |
| 2025/0240339 | A1* | 7/2025 | Sodagar | H04L 65/612 |
| 2025/0286692 | A1* | 9/2025 | Bailey | H04W 72/563 |
| 2026/0052424 | A1* | 2/2026 | Kim | H04W 24/08 |

OTHER PUBLICATIONS

Wallentinsson, E. W. (2019). Multiple Time Series Forecasting of Cellular Network Traffic (Dissertation). Retrieved from [https://urn.kb.se/resolve?urn=urn:nbn:se:liu:diva-154868] (Year: 2019) 68 pages.

Siami-Namini, Sima, Neda Tavakoli, and Akbar Siami Namin. "A Comparison of ARIMA and LSTM in Forecasting Time Series", 17th IEEE International Conference on Machine Learning and Applications, 2018, 8 pages.

X. Wang et al., "Spatio-Temporal Analysis and Prediction of Cellular Traffic in Metropolis", IEEE Trans. Mob. Comput., vol. 18, No. 9, 2019, 14 pages.

T. Chen, Y. Yang, H. Zhang, H. Kim, and K. Horneman, "Network energy saving technologies for green wireless access networks", IEEE Wireless Commun., vol. 18, No. 5, Oct. 2011. 9 pages.

S. McLaughlin, P. M. Grant, J. S. Thompson, H. Haas, D. I. Laurenson, C. Khirallah, Y. Hou, and R. Wang, "Techniques for improving cellular radio base station energy efficiency", IEEE Wireless Commun., vol. 18, No. 5, Oct. 2011. 8 pages.

O-RAN Work Group 1 (Use Cases and Overall Architecture). "Network Energy Saving Use Cases Technical Report", O-RAN. WG1.NESUC-R003-v02.00, 2023, 105 pages.

G. N. Katsaros, R. Tafazolli and K. Nikitopoulos, "On the Power Consumption of Massive-MIMO, 5G New Radio with Software-Based PHY Processing," 2022 IEEE Globecom Workshops (GC Wkshps), Rio de Janeiro, Brazil, 2022, pp. 765-770.

N. P. Le, F. Safaei and L. C. Tran, "Antenna Selection Strategies for MIMO-OFDM Wireless Systems: An Energy Efficiency Perspective," in IEEE Transactions on Vehicular Technology, vol. 65, No. 4, pp. 2048-2062, Apr. 2016.

C. Han et al. "Green radio: Radio techniques to enable energy-efficient wireless networks", IEEE Commun. Mag., vol. 49, No. 6, May 2011. 9 pages.

Mitra, et al. "Low Complexity Cellular Traffic Prediction" U.S. Appl. No. 18/656,200, filed May 6, 2024, 54 pages.

Notice of Allowance mailted Jan. 13, 2026 for U.S. Appl. No. 18/656,200, 52 pages.

* cited by examiner

1600

1700

ENHANCED RADIO FREQUENCY CHANNEL RECONFIGURATION

BACKGROUND

Communication networks can enable users to use devices to wirelessly connect to a communication network and communicate with other devices (e.g., wireless devices or other communication devices). A device, such as a mobile device (e.g., smart phone or other mobile wireless device) can connect (e.g., wirelessly connect) to a cell (e.g., cell of a base station) or other access point associated with a radio access network (RAN) to facilitate connection to a communication network. Devices, via connection to the RAN and communication network, can utilize various types of services and applications of or associated with the communication network.

The above-described description is merely intended to provide a contextual overview regarding communication systems, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise: from a group of radio frequency (RF) channel configuration modes, determining, by a system comprising at least one processor, respective RF channel configuration modes that can be able to satisfy a defined performance criterion associated with a device with regard to an amount of data traffic expected to be communicated between a base station and the device over a defined time period, wherein the determining of the respective RF channel configuration modes can be based on a group of performance indicators and a communication condition associated with the device. The method also can comprise determining, by the system, respective amounts of power expected to be consumed by utilization of the respective RF channel configuration modes with regard to the amount of the data traffic expected to be communicated between the base station and the device over the defined time period, the determining of the respective amounts of power being based on power measurement information associated with the base station and a spatial power consumption model that can model power consumption by the base station. The method further can comprise: from the respective RF channel configuration modes, determining, by the system, an RF channel configuration mode to be utilized by the base station for communication of the data traffic between the base station and the device, wherein the determining of the RF channel configuration mode can be based on a determination that an amount of power expected to be consumed by utilization of the RF channel configuration mode is lower than other amounts of power expected to be consumed by utilization of other RF channel configuration modes of the respective RF channel configuration modes.

In certain embodiments, the disclosed subject matter can comprise a system that can comprise at least one memory that can store computer executable components, and at least one processor that can execute computer executable components stored in the at least one memory. The computer executable components can comprise a channel configurator that, from a group of RF channel configuration modes, can determine respective RF channel configuration modes that can be capable of satisfying a defined performance criterion associated with a user equipment with regard to an amount of data traffic predicted to be communicated between a base station and the user equipment over a defined time period, based on a group of performance indicators and a communication condition associated with the user equipment. The computer executable components also can comprise a recommendation engine that can determine respective amounts of power consumption associated with utilization of the respective radio frequency channel configuration modes with regard to the amount of the data traffic predicted to be communicated between the base station and the user equipment over the defined time period, based on power measurement data associated with the base station and a spatial power consumption model that can model power consumption by the base station. From the respective RF channel configuration modes, the channel configurator can determine an RF channel configuration mode to be utilized by the base station for communication of the data traffic between the base station and the user equipment, based on a determination that an amount of power consumption associated with utilization of the RF channel configuration mode is less than other amounts of power consumption associated with utilization of other RF channel configuration modes of the respective RF channel configuration modes.

In still other embodiments, the disclosed subject matter can comprise a non-transitory machine-readable medium, comprising executable instructions that, when executed by at least one processor, can facilitate performance of operations. The operations can comprise: from a group of channel configuration modes, determining respective channel configuration modes that can be predicted to satisfy a defined performance criterion associated with a user equipment with regard to an amount of data traffic expected to be communicated between network equipment and the user equipment over a defined time period, based on a group of performance indicators and a communication condition associated with the user equipment. The operations also can comprise determining respective amounts of power consumption associated with utilization of the respective channel configuration modes with regard to the amount of the data traffic expected to be communicated between the network equipment and the user equipment over the defined time period, based on power measurement data associated with the network equipment and a spatial power consumption model that can model power consumption by the network equipment. The operations further can comprise: from the respective channel configuration modes, determining a channel configuration mode to be utilized for communication of the data traffic between the network equipment and the user equipment, based on a determination that an amount of power consumption associated with utilization of the channel configuration mode is lower than other amounts of power consumption associated with utilization of other channel configuration modes of the respective channel configuration modes.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents.

Other advantages and features will become apparent from the following detailed description when considered in conjunction with the drawings.

DETAILED DESCRIPTION

Figure 1:
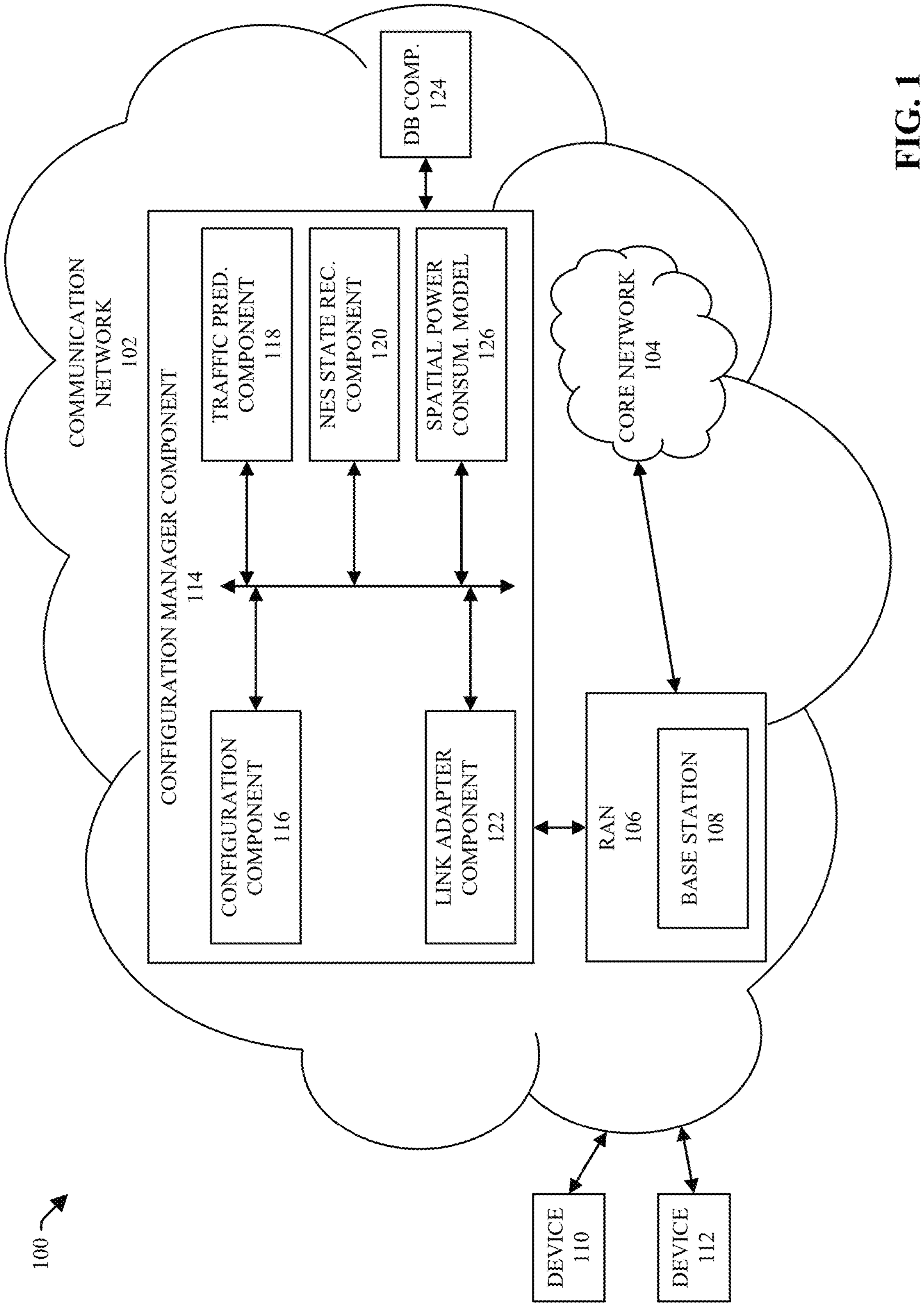
FIG. 1 illustrates a block diagram of a non-limiting example system that can desirably manage radio frequency (RF) channel configuration (e.g., configuration or reconfiguration) to achieve desirable communication performance and network energy savings, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

This disclosure relates generally to enhanced radio frequency (RF) channel configuration, reconfiguration, and management thereof, to achieve desirable communication performance and network energy savings. In recent years, there has been a significant increase in cellular network traffic. The significant increase of cellular network traffic has meant progressive increase in the use of multiple-input, multiple-output (MIMO) technology over the years, whereby a base station can be equipped with an antenna array and each antenna element either can be embedded in a phased-array or when used at lower frequencies can have a separate radio frequency (RF) port that can correspond to each transmitting element, such as in four-transmit four-receive (4T4R) or eight-transmit eight-receive 8T8R configurations. The use of multiple antennas can help improve the transmission data rate through various means. It can help achieve increased received signal-to-noise ratio (SNR) through the use of transmit or receive diversity that can take advantage of the fact that while the signals at each antenna port can be correlated, the noise is not, and therefore clever signal processing can yield a higher received SNR (e.g., ideally 3 decibels (dB) higher for each additional antenna port). Increased received SNR also can allow for use of a higher modulation and coding scheme (MCS). Alternatively, each antenna port may transmit different data (e.g., spatial diversity), thereby increasing the number of parallel channels transmitted, increasing the effective data rate. Finally, a large number of antenna elements can be used as a phased array antenna to do beamforming resulting in a beam that can be better directed towards an intended user equipment (UE) or group of UEs. The latter method also can help by enabling the multiple-user (MU)-MIMO mode that can increase network throughput significantly.

Figure 15:
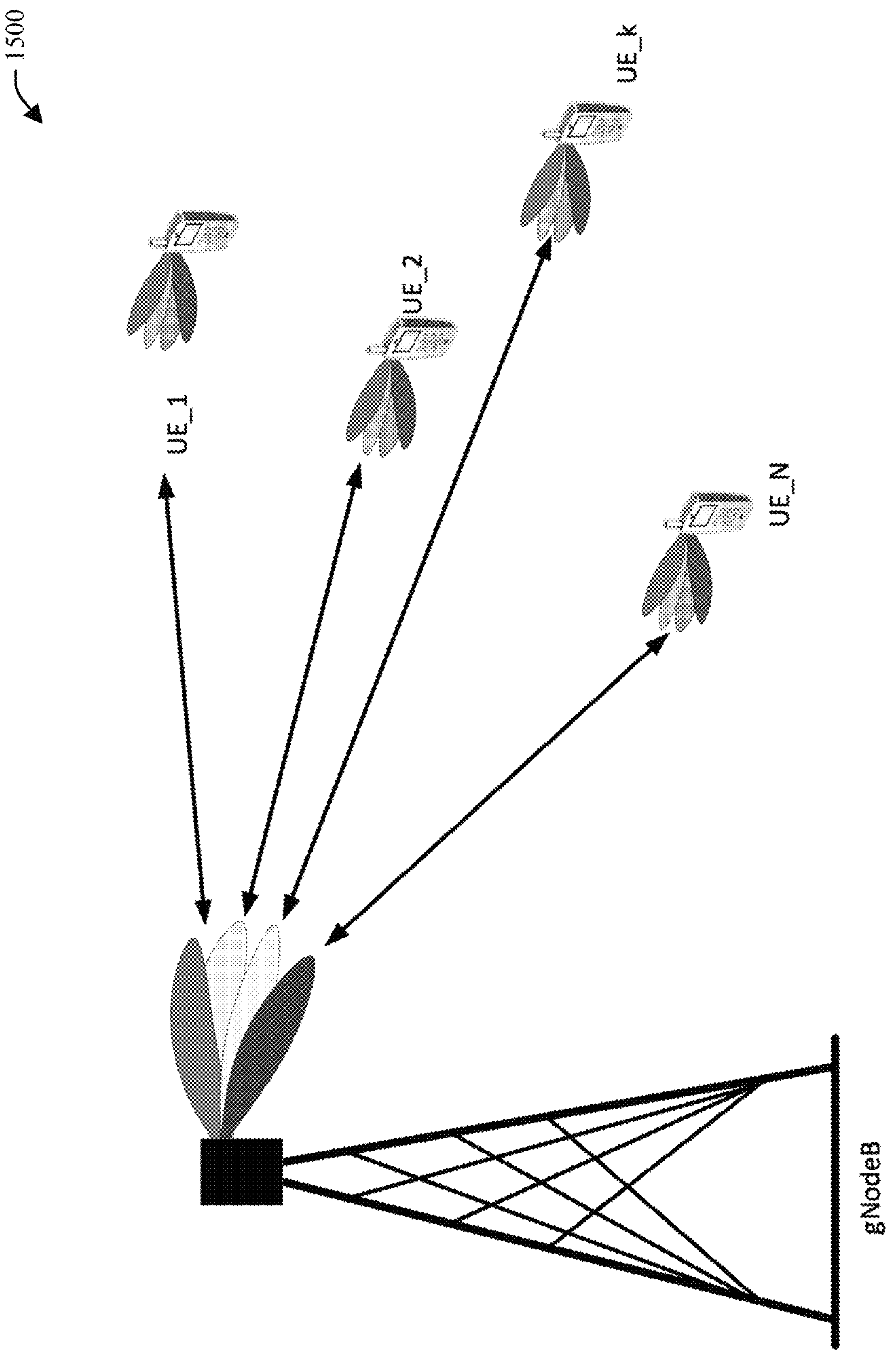
FIG. 15 depicts a diagram of multiple-input, multiple-output (MIMO)-based cellular communication for desirable throughput and robustness.

Referring to FIG. 15, FIG. 15 depicts a diagram of MIMO-based cellular communication 1500 for desirable throughput and robustness. As shown in FIG. 15, MIMO-enabled cellular communication typically can have multiple antennas at both the base station (N transmit (Tx) antennas) and the UEs (K receive (Rx) antennas) resulting in an N×K matrix for the channel H in the downlink (DL) for example. Depending on the channel correlation properties, there may be significant interference between the layers and so for spatial diversity all N layers may not be available. This can be determined by the rank of the matrix for the channel H. If multiple spatial layers are not needed, the base station also may operate in transmit (Tx) diversity mode to boost the SNR at the receiver (Rx) (e.g., the UEs), and thereby can enable the selection of a higher MCS at the link adaptation phase.

The underlying cost of improved network throughput using MIMO methods can be increased power consumption in addition to increased complexity of the processing circuitry, as compared to single input and single output (SISO) transmission. In a mobile communication network, the radio access network (RAN) can account for approximately 75% to 80% of the consumed power. A larger transmit and receive array can contribute further to this problem in a material way as an increased power consumption can be caused by additional hardware related to each of the base station antennas. High power consumption can increase network operators' costs and also can degrade the carbon footprint of information and communication technology (ICT) infrastructure. Therefore, achieving a higher energy efficiency (EE) through greater network energy savings (NES) can be one of the desirable objectives for fifth generation (5G) and beyond communication networks.

Due to the various dimensions involved when the base station is operated in a MIMO network, several opportunities for improvement of energy efficiency can exist along with their associated dependencies. While the highest gains for network energy savings can be expected to be achieved by switching off underutilized base stations, it often is not possible to switch underutilized base stations off entirely due to presence of non-negligible data traffic or the variations observed in data traffic can be sporadic and difficult to capture through statistical or machine learning (ML) based prediction approaches. In that respect, some of the aspects of the RF front-end operation can be reconfigured while the communication network is carrying live traffic in order to address network energy savings actively. For example, the transmit and receive antennas of an antenna array of a base station (e.g., a radio unit (RU) of a base station) can be selectively used (e.g., turned on or off), MIMO spatial streams (e.g., MU-MIMO and/or single user (SU)-MIMO spatial streams) can be modified, and/or certain other actions can be taken or modifications to functions or parameters can be made to try to address network energy savings.

In principle, the number of MIMO layers and therefore the number of antennas should be adapted to the network state, which can be represented by the traffic demand, the number of connected UEs, the latency requirements of the UEs, and/or other factors. The goal of RF channel reconfiguration can be to reduce network energy consumption by performing appropriate RU (e.g., open RAN (O-RAN) RU (O-RU)) Tx/Rx array selection given the operational environment of the RU, which can include channel conditions for each connected UE, mobility patterns of the UE, and also energy consumption in a given mode. However, it is not straightforward to achieve higher energy efficiency as, while higher number of antennas can help increase spectral efficiency, a reduced spatial domain footprint (e.g., to save energy) may impact throughput, coverage, latency, or other performance indicators. It can therefore be desirable (e.g., wanted or needed) to satisfy (e.g., meet) a fine balance of multiple objectives, wherein the complexity of decision-making can increase with the number of potential modes that the base station can be in, especially when massive MIMO (mMIMO) is enabled with 32, 64, or 128 antennas. With such changes, appropriate transmit power control (TPC) loops also can be desirable (e.g., wanted or needed) to maintain a maximum power envelope and can be used in conjunction with various aspects of the disclosed subject matter, such as described herein.

Communication networks inherently can be dynamic, and therefore, while heuristic approaches have been proposed to reduce the computational complexity of solving the problem of achieving optimal network operational state, this can lead to a rule-based operation of the network. This, however, can prevent the decision loops from being updated as per the changing dynamics of the wireless environment as further learning (e.g., based on the observed data relating to the communication network) to improve the network state may not be able to be applied.

Figure 16:
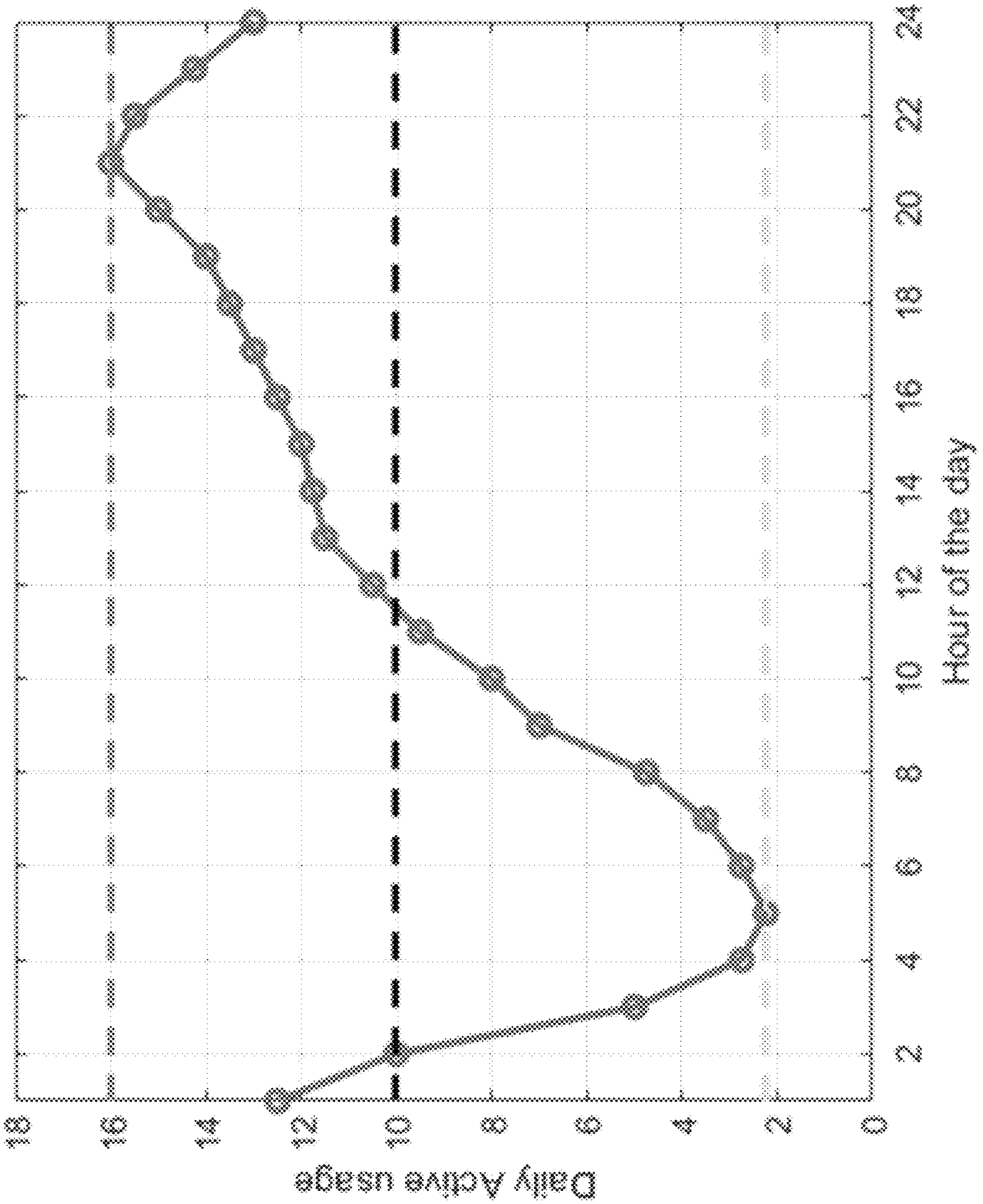
FIG. 16 illustrates a diagram of an example graph that can represent an example typical diurnal variation in the number of active users in a cellular communication network.
Figure 17:
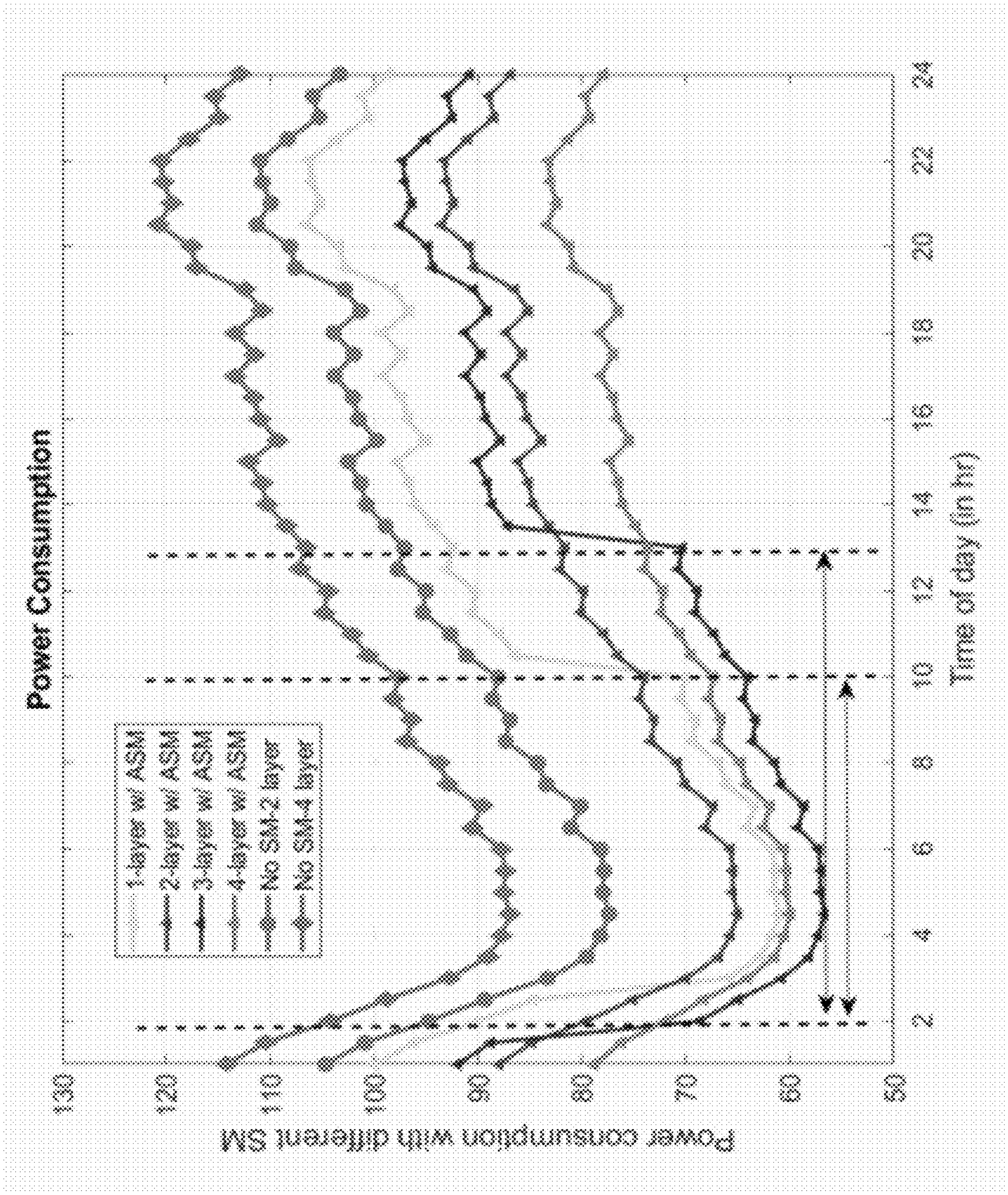
FIG. 17 depicts a diagram of an example graph that can represent an example impact of RF MIMO mode on power consumption over a 24-hour period.

Referring briefly to FIGS. 16 and 17, to establish the significance of changing network dynamics, for example, through the number of active users, FIG. 16 illustrates a diagram of an example graph 1600 that can represent an example typical diurnal variation in the number of active users in a cellular communication network, and FIG. 17 depicts a diagram of an example graph 1700 that can represent an example impact of RF MIMO mode on power consumption over a 24-hour period. The graphs 1600 and 1700 of FIGS. 16 and 17, respectively, can illustrate or demonstrate the variation in power consumption when considering a 4T4R transmission without and with (using advanced sleep modes (ASMs)) energy saving features.

As the graph 1600 of FIG. 16 shows, traffic demand during the course of a day does not stay constant and can be characterized using a daily active usage (DAU) metric that can capture the percentage of users that are active at any given time. The graph 1600 can show the variation in DAU experienced by a base station as captured from real data for a 24-hour period. The fraction of active users can decrease significantly in the hours between late night and early morning and can steadily increase (e.g., ramps up) from early morning and through the day until about 7:00 p.m., after which it can start to fall off again. While such variations are likely to occur in all scenarios, when the peaks and troughs occur can be dependent on the location of the base station and the user activity around the area.

The graph 1700 of FIG. 17 illustrates the impact on power consumption of the RAN when considering SISO transmission in relation to different levels of MIMO that can be possible with 4T4R combination to support the traffic demand. Additionally, when using higher MIMO configurations, the base station opportunistically can be transitioned into sleep (e.g., low power) mode(s) when the data traffic is not high enough to require transmission over all MIMO layers. In particular, in the graph 1700, it can be observed that using only the SISO mode is not beneficial even from an energy savings perspective as the base station is forced to stay active for longer durations when the data traffic demand is relatively higher. In such cases, since a higher SE can be achieved using more transmit layers, the data traffic demand can be serviced with fewer transmission time intervals (TTIs), providing the base station with an opportunity to operate in lower power modes as the traffic buffer is not constantly high.

It can be desirable (e.g., wanted or needed) to have improvement in energy efficiency of next generation communication networks at the core of the design process rather than an added feature in order to reduce operational expenses for mobile network operators (MNOs) and satisfy various climate goals outlined by network operators. Use of multiple antennas in both legacy MIMO transmission (e.g. up to 8T8R) and massive MIMO transmission (e.g., sixty four-transmit sixty four-receive (64T64R)) can lead to significant increase in power consumption. A judicious choice in the use of the elements of the Tx/Rx array can facilitate optimizing the enormous power consumption in those modes and can make sure that the network performance indicators (e.g., key performance indicators (KPIs)) can still be satisfied.

In contrast to the signaling approaches proposed for 5G new radio (NR), earlier types of base stations always had to be on in order to signal their presence and monitor the radio channel to be visible by UEs. While power consumption reduction strategies for base stations, such as sleep procedures (or low power consumption states), have been introduced, they have had limited efficacy thus far due to lack of effective operational policies that can absorb the complexities of various parametric and non-parametric dependencies associated with communication networks. Upgrading network deployments to improve throughput increasingly can rely on network densification, increasing the magnitude of the problem even more with randomness in traffic patterns, coverage and a diverse set of UE specifications (e.g., requirements). Some of the issues related to RF channel adaptation and reconfiguration to achieve network energy savings (NES) in particular are listed below.

One problem with existing techniques relating to RF channel adaptation and reconfiguration can be a lack of optimal criteria for selection of an optimal RF MIMO mode for a base station. Some existing techniques in this area typically can address RF mode selection and adaptation to improve throughput only and, in that regard, often times can use the UE recommended rank indicator to determine the number of RF ports that should be used at the base station to transmit. If the throughput demand of the UE(s) is not too high, transmit diversity can be used, which transparently can increase the received SNR without requiring the UE to do much work, otherwise the number of spatial layers can be the same as the UE recommended rank. Alternatively, rule-based MIMO state determination that has been used in communication networks heretofore can be very difficult to apply in existing and future communication networks, especially when embedding energy savings as an optimality criterion as well. A drawback of such an approach can be that the use of a higher MCS (e.g., enabled by a combination of Tx. and Rx. diversity) may not be explored as a valid transmission configuration for the higher throughput target. While another layer may technically provide almost double the capacity compared to one layer, the usable MCS may be lower due to the worse block error rate (BLER) performance of MIMO transmission with higher rank, and hence, undesirably may have to utilize higher transmission frames in some cases.

Another problem with existing techniques relating to RF channel adaptation and reconfiguration can be that RF Mode selection using NES criteria largely has been absent. With existing techniques, in MIMO mode selection, energy efficiency rarely has been considered as a critical design factor in previous generation networks due to several reasons. First, network densification was much lower than the scenarios envisioned for 5G and beyond, and hence, the fraction of operational expense increase due to EC was lower. Moreover, to the extent that any energy efficiency enhancement opportunity prediction was done, it was performed using relatively simple models and only on larger time scales, where only factors such as time of day and geographically varying factors (e.g., downtown core versus suburban) were taken into account. For these purposes, a macro level L2 scheduler can suffice as only slowly varying phenomena were accounted for. However, in contemporary communication networks, the network behavior may offer significantly more opportunities for RF mode adaptation (and therefore commensurate network energy savings), and it can be desirable to have the base station be sufficiently agile to respond with appropriate operational changes in an agile manner.

Still another problem with existing techniques relating to RF channel adaptation and reconfiguration can be that such existing techniques may not be sufficiently data driven. Modern communication networks can generate enormous amounts of data that can be very valuable if useful network intelligence can be discerned from this data. For instance, with regard to the disclosed subject matter, in addition to triggering a network action in response to varying network behavior, a further feedback loop can be additionally leveraged to ascertain if the actions taken were indeed moving the network to a more optimal state. However, with regard to existing techniques, data-driven approaches to optimize a complex network state have been non-existent, with most network operations being largely static based on long-term statistics. Additionally, with regard to existing techniques, scalable integration of artificial intelligence (AI)/machine learning (ML) capability at various levels of compute capacity was not practically feasible before.

The disclosed subject matter can address and overcome the aforementioned deficiencies and other deficiencies of such existing techniques relating to RF channel adaptation and reconfiguration. To that end, techniques that can desirably (e.g., automatically, dynamically, suitably, reliably, efficiently, enhancedly, and/or optimally) manage RF channel configuration (e.g., configuration or reconfiguration) to achieve desirable communication performance and network energy savings, are presented. A system can comprise a communication network that can comprise one or more RANs. A RAN can comprise one or more base stations that can facilitate communication (e.g., wireless communication) of data between devices associated with the communication network (e.g., communicatively connected to a base station of the communication network, or otherwise connected to the communication network).

In accordance with various embodiments, the communication network (e.g., a controller component, such as a RAN intelligent controller (RIC), of the communication network) can comprise a configuration manager component (also can be referred to as a configuration manager module) that can desirably manage RF channel configuration to achieve desirable communication performance and network energy savings, in accordance with defined configuration management criteria. In some embodiments, the configuration manager component can comprise a traffic predictor component that can employ traffic prediction to predict an amount of data traffic to be communicated between the base station and the device during a defined time period. The configuration manager component also can comprise a configuration component that can determine, from a group of RF channel configuration modes, a subgroup of candidate RF channel configuration modes that can satisfy defined performance criteria (e.g., throughput, latency, and/or another performance indicator) associated with (e.g., applicable to) the device and/or a service being used by the device based at least in part on the results of analyzing the data traffic demand (e.g., the amount of data traffic) associated with the device, performance indicators and/or communication conditions associated with the device, and/or respective performance levels associated with the respective RF channel configuration modes of the group of RF channel configuration modes. In certain embodiments, the configuration component also can make an initial (e.g., preliminary) determination of a desirable (e.g., preferred or best) candidate RF channel configuration mode. For example, the configuration component can make an initial determination that the RF channel configuration mode, which is associated with the highest performance level (e.g., best satisfies the defined performance criteria) with regard to the data traffic demand (e.g., the amount of data traffic), can be the desirable candidate RF channel configuration mode.

In some embodiments, the configuration manager component can comprise a mobility component that can perform device mobility prediction and can provide handover information (e.g., information relating to previous handovers of the device and/or prediction of a future handover(s) of the device from one cell to another cell). The configuration component can incorporate the device mobility prediction and/or handover information into the analysis, along with the data traffic demand and other information, to determine, from the group of RF channel configuration modes, the subgroup of candidate RF channel configuration modes that can satisfy the defined performance criteria associated with the device and/or the service.

In certain embodiments, with the subgroup of candidate RF channel configuration modes determined, the configuration manager component can comprise an NES state recommendation component that can obtain power measurement information (e.g., measurement reports) relating to power consumption of the RAN (e.g., power consumption of or associated with an RU of the RAN) from the base station (e.g., from the RU). The power measurement information can indicate respective power consumption associated with the respective RF channel configuration modes. The NES state recommendation component can analyze the power measurement information, and/or can apply a spatial power consumption model to the power measurement information and/or other information (e.g., information relating to the respective candidate RF channel configuration modes). For instance, the NES state recommendation component can utilize the spatial power consumption model to perform the analysis on the power measurement information and/or the other information. Based at least in part on the analysis results, the NES state recommendation component can determine respective amounts of power consumption associated with the respective candidate RF channel configuration modes with regard to the amount of data traffic predicted to be communicated between the base station and the device during the defined time period. From the respective amounts of power consumption, the NES state recommendation component can determine which candidate RF channel configuration mode of the respective candidate RF channel configuration modes can provide highest NES (e.g., can have the lowest amount of power consumption) and/or can rank the respective candidate RF channel configuration modes in order based at least in part on the respective NES associated with the respective candidate RF channel configuration modes. The NES state recommendation component can communicate a recommendation message to the configuration component, wherein the recommendation message can recommend that the candidate RF channel configuration mode provided the highest NES be selected for use by the base station with regard to the communication of data traffic between the base station and the device, and/or can comprise ranking information that can indicate the respective rankings of the respective candidate RF channel configuration modes in order of the respective NES associated with the respective candidate RF channel configuration modes.

The configuration component can analyze the recommendation and/or the ranking information relating to the respective candidate RF channel configuration modes. In some embodiments, based at least in part on the results of such analysis, the configuration can determine and select the candidate RF channel configuration mode, of the subgroup of candidate RF channel configuration modes, that is to be used by the base station with regard to the communication of data traffic between the base station and the device during the defined time period. For example, based at least in part on such analysis results, the configuration component can determine that the candidate RF channel configuration mode that can provide the highest NES (while also satisfying the defined performance criteria) is to be utilized by the base station with regard to the communication of data traffic between the base station and the device during the defined time period. The configuration component can communicate configuration information (e.g., configuration instructions or commands, and/or other information) to a link adapter component associated with the base station. The link adapter component can configure or facilitate configuring the base station to utilize the selected candidate RF channel configuration mode for the communication of data traffic between the base station and the device during the defined time period.

In certain embodiments, the configuration manager component can comprise or can employ a reinforcement learning (RL) decision engine that can initiate a desired RF channel configuration mode selection for utilization by the base station during a communication session with a device. The RL decision engine can obtain and analyze information relating to the impact on performance indicators and the impact on energy consumption associated with RAN due to the use of that RF channel configuration mode selection by the base station, and can learn about the operational environment of the RAN based at least in part on the results of such analysis. Based at least in part on such analysis results and learning, the RL decision engine can determine whether the RF channel configuration mode is to be adapted (e.g., changed to a different RF channel configuration mode) or can remain the same, and/or can determine whether another action is to be taken, such as described herein.

These and other aspects and embodiments of the disclosed subject matter will now be described with respect to the drawings.

Referring now to the drawings, FIG. 1 illustrates a block diagram of a non-limiting example system 100 that can desirably (e.g., automatically, dynamically, suitably, reliably, efficiently, enhancedly, and/or optimally) manage RF channel configuration (e.g., configuration or reconfiguration) to achieve desirable communication performance and network energy savings, in accordance with various aspects and embodiments of the disclosed subject matter. The system 100 can comprise a communication network 102 that can comprise a core network 104 and one or more radio access networks (RANs), such as RAN 106, that can be associated with (e.g., communicatively connected to) the core network 104. Each RAN (e.g., RAN 106) can comprise one or more base stations, such as, for example, base station 108, that each can comprise one or more cells (not shown in FIG. 1).

The core network 104, the one or more RANs (e.g., RAN 106), the one or more base stations (e.g., base station 108), and the one or more cells can facilitate (e.g., enable) wireless communication of data (e.g., voice or other audio data, video data, textual data, or other data) between devices (e.g., communication devices or UEs), such as devices associated with the core network 104, via the one or more RANs, one or more base stations, and one or more cells, and other devices associated with the core network 104 or, more generally, the communication network 102 (e.g., a device, such as a server or computer, can be connected to the communication network 102 via a wireline connection or via a network other than the core network 104).

The devices can comprise, for example, devices 110 and/or 112. A device (e.g., 110 or 112) can be, for example, a wireless, mobile, or smart phone, a computer, a laptop computer, a server, an electronic pad or tablet, a virtual assistant (VA) device, electronic eyewear, an electronic watch, or other electronic bodywear, an electronic gaming device, an Internet of Things (IoT) device (e.g., a health monitoring device, a toaster, a coffee maker, blinds, a music player, speakers, a telemetry device, a smart meter, a machine-to-machine (M2M) device, or other type of IoT device), a device of a connected vehicle (e.g., car, airplane, train, rocket, and/or other at least partially automated vehicle (e.g., drone)), a personal digital assistant (PDA), a dongle (e.g., a universal serial bus (USB) or other type of dongle), a communication device, or other type of device. In some embodiments, the non-limiting term user equipment (UE) can be used to describe the device. The device (e.g., 110 or 112) can be associated with (e.g., communicatively connected to) the communication network 102 via a communication connection and channel, which can include a wireless or wireline communication connection and channel.

In accordance with various embodiments, the core network 104 can comprise various network components that can facilitate wireless communication of data. In some embodiments, the RAN 106 can be a 5G, other NR, 4th generation (4G), 4G long term evolution (LTE), 3rd generation (3G), 2nd generation (2G), multiple radio access technology (RAT) RANs, or other type of RAN (e.g., gNB or other NR-type or xG RAN, wherein x can be 5 or a number greater than or less than 5), and/or the base station(s) (e.g., base station 108) can be a 5G, other NR, 4G, 4G LTE, 3G, 2G, multi-RAT, or other type of base station (e.g., gNB or other NR-type or xG base station). In some embodiments, the RAN 106 can be an open-RAN (O-RAN) that can be part of an O-RAN architecture and environment (e.g., the communication network 102 can employ an O-RAN architecture and environment). In certain embodiments, the core network 104 can comprise a user plane function (UPF) node, an access and mobility management function (AMF) node, and/or other network functions (not shown in FIG. 1 for reasons of brevity and clarity). The UPF node can connect to or interface with the one or more RANs (e.g., RAN 106) and the one or more base stations (e.g., base station 108), can be an interconnect point between the core network 104 and a data network (DN), can provide or facilitate providing a protocol data unit (PDU) session anchor point for providing mobility associated with RATs, can provide or facilitate providing data packet routing or forwarding, and/or can perform or manage other functions. The AMF node can be a control plane function that can manage registration and deregistration of devices (e.g., devices 110 and/or 112) with the core network 104, manage connections of devices with the core network 104, manage mobility associated with devices (e.g., maintain knowledge of locations of devices, update locations of devices), and/or manage or perform other functions. In accordance with various other embodiments, the RAN(s) (e.g., RAN 106) and/or the base station(s) (e.g., base station 108) can be a 4G LTE RAN or base station, or the RAN or base station can comprise 4G LTE technology and functions, and 5G or other NR-type or xG technology and functions.

The communication network 102, more generally, or the core network 104 can comprise various other network equipment (e.g., routers, gateways, transceivers, switches, access points, network functions, processor components, data stores, or other devices or network nodes) that facilitate (e.g., enable) communication of information between respective items of network equipment of the communication network 102, and/or communication of information between the one or more devices (e.g., devices 110 and/or 112) and the communication network 102. The communication network 102, including the core network 104, can provide or facilitate wireless or wireline communication connections and channels between the one or more devices (e.g., devices 110 and/or 112), and/or respectively associated services or applications, and the communication network 102. For reasons of brevity or clarity, some of the various network equipment, components, functions, or devices of the communication network may not be explicitly shown or described herein.

At various times, the respective devices (e.g., devices 110 and/or 112) can utilize respective services. The services can comprise or relate to, for example, voice service (e.g., conversational voice services or other voice services), video streaming service, conversational video service, buffered video service, audio streaming service, other type of streaming service, text or messaging service, data service, control message service (e.g., control message service relating to control of communication network functions and operations), signaling service, real time gaming service, interactive gaming service, transmission control protocol (TCP) service, control message service relating to automated or semi-automated vehicles or motorized devices, law enforcement-related service, medical-related service, emergency-related service, military-related service, background traffic service, or other desired types of service. In some embodiments, a service can be an extended reality (XR) service or other type of service that can involve or relate to communication of data bursts comprising PDU sets.

As disclosed, existing technique relating to RF channel adaptation and reconfiguration can be deficient and undesirable in a number of ways. One problem with existing techniques relating to RF channel adaptation and reconfiguration can be a lack of optimal criteria for selection of an optimal RF MIMO mode for a base station. Another problem with existing techniques relating to RF channel adaptation and reconfiguration can be that RF mode selection using network energy savings criteria largely has been absent. Still another problem with existing techniques relating to RF channel adaptation and reconfiguration can be that such existing techniques may not be sufficiently data driven.

The disclosed subject matter can overcome these deficiencies and other problems of existing techniques. To that end, the system 100 can comprise a configuration manager component 114 (also can be referred to as a configuration manager module) that desirably (e.g., automatically, dynamically, suitably, reliably, efficiently, enhancedly, and/or optimally) can enhance manage RF channel configuration and reconfiguration associated with devices (e.g., device 110 and/or device 112) to achieve desirable communication performance associated with the devices and network energy savings for the communication network 102, in accordance with the defined configuration management criteria. In some embodiments, the configuration manager component 114 can be part of the communication network 102 and associated with (e.g., communicatively connected to) the RAN 106 (as depicted), such as described herein. In certain embodiments, the configuration manager component 114 can be a standalone component or part of another component, such as a controller (e.g., a RIC or other type of controller), associated with the RAN(s) 106), and/or can be located or situated elsewhere in or associated with the communication network 102, wherein the configuration manager component 114 can be associated with (e.g., communicatively connected to) the RAN 106. In other embodiments, the configuration manager component 114 can be part of the RAN 106.

In accordance with various embodiments, the configuration manager component 114 can determine, from a group of RF channel configuration modes, a desirable (e.g., suitable, reliable, efficient, enhanced, and/or optimal) RF channel configuration mode to be utilized by the base station 108 to serve the device 110, wherein the desirable RF channel configuration mode can provide desirable communication and/or service performance to the device 110, while also achieving desirable network energy savings for the communication network 102 (e.g., for the RAN 106 of the communication network 102), in accordance with the defined configuration management criteria. In some embodiments, the configuration manager component 114 can comprise a configuration component 116 that can determine, select, and configure (e.g., configure or reconfigure) or facilitate configuration of desired RF channel configuration modes for base stations (e.g., base station 108) associated with (e.g., connected to and/or serving) devices (e.g., devices 110 and/or 112), a traffic predictor component (TRAFFIC PRED. COMPONENT) 118 (e.g., traffic predictor engine) that can predict an amount of data traffic that a device (e.g., device 110) will communicate over a defined time period, an NES state recommendation component (NES STATE REC. COMPONENT) 120 (e.g., NES state recommendation engine) that desirably can determine which RF channel configuration modes of candidate RF channel configuration modes can provide desirable (e.g., suitable, maximum, or optimal) network energy savings for the communication network 102, and a link adapter component 122 that can facilitate setting (e.g., configuring or reconfiguring) the desired RF channel configuration mode for the base station 108, such as described herein.

At a desired time(s), the device 110 can be connected (e.g., wirelessly connected) to or can desire to be connected to the base station 108 of the RAN 106 to communicate with another device (e.g., device 112) associated with the communication network 102 and/or utilized a desired service. For instance, the device 110 can be utilized to make a phone call to the device 112, or can be utilized to connect to a service (e.g., connect to the device 112, or another device, that can facilitate providing the service), such as a video service, an audio service, a news service, a web browsing service, an electronic gaming service, and/or another desired service to download content (e.g., video content, audio content, and/or other content) and/or communicate with the service.

To facilitate communications (e.g., wireless communications) between devices and the base station 108, there can be a group of RF channel configuration modes that can be employed by the base station 108, wherein respective (e.g., different or unique) RF channel configuration modes of the group can involve respective numbers of antennas, respective MIMO settings (e.g., respective numbers of MIMO spatial layers, MU MIMO, SU MIMO, and/or other settings), respective MCS values, respective transmit diversity (e.g., respective transmit diversity parameters), and/or other respective parameter values relating to RF channel configuration. The respective RF channel configuration modes can facilitate respective types or levels of performance being provided by the base station 108 to devices (e.g., device 110) and can utilize respective amounts of power, depending in part on various factors, such as described herein.

With regard to serving the device 110, the base station 108 can be configured to be in an RF channel configuration mode of the group of RF channel configuration modes when serving the device 110. In accordance with various embodiments, the configuration manager component 114 can determine which RF channel configuration mode, of the group of modes, can be desirable (e.g., most desirable, suitable, or optimal) to be utilized by the base station 108 to serve the device 110 to achieve desirable communication and/or service performance for the device 110 that can satisfy (e.g., meet or exceed) the defined performance criteria (e.g., defined performance criteria of the defined configuration management criteria) and also can achieve desirable (e.g., suitable, maximum, enhanced, or optimal) network energy savings for the communication network 102, in accordance with the defined configuration management criteria.

To facilitate such desirable determination of the RF channel configuration mode to use, the traffic predictor component 118 can predict an amount of data traffic that a device (e.g., device 110) will communicate over a defined time period (e.g., a desired number of seconds or minutes, and/or a desired number of TTIs). The traffic predictor component 118 can employ a relatively faster (e.g., real time or near real time) data traffic prediction process (e.g., a fast AI/ML data traffic prediction process) and/or a longer term (e.g., non-real time) data traffic prediction process (e.g., a longer term AI/ML data traffic prediction process) to desirably (e.g., accurately, quickly, suitably, efficiently, or optimally) predict the amount of data traffic that the device 110 will communicate over the defined time period, such as described herein. In some embodiments, the traffic predictor component 118 can predict the amount of data traffic that the device 110 will communicate over the defined time period based at least in part on the device type (e.g., smart phone, laptop computer, IoT, or other type of device; capabilities or functions of the device; or other type of features) of the device 110, the service (e.g., type of service (e.g., video content provider service, video streaming service, audio content provider service, audio streaming service, electronic gaming service, or other type of service); capabilities or functions of the service; service specifications, guidelines, or requirements of the service; service level agreement (SLA) of the service; or other service features) being utilized by the device 110, communication conditions associated with the device 110, and/or other factors. In certain embodiments, the traffic predictor component 118 can employ trained ML-based data traffic prediction models and techniques that can enable the traffic predictor component 118 and associated models to desirably predict respective amounts of data traffic that will be communicated between the base station 108 and devices (e.g., device 110 and/or device 112) over respective time periods, wherein the ML-based data traffic prediction models can trained based at least in part on application or input, to such models, of information relating to previous communication sessions (e.g., previous communications of data traffic) between the base station(s) (e.g., base station 108 and/or another base station(s)) and the devices, such as described herein. The traffic predictor component 118 can communicate, to the configuration component 116, prediction information relating to the amount of data traffic predicted to be communicated between the base station 108 and the device 110 over the defined time period.

The configuration component 116 can determine, from the group of RF channel configuration modes, a subgroup of RF channel configuration modes that can satisfy (e.g., meet or exceed) the defined performance criteria for communication of the amount of data traffic between the base station 108 and the device 110 over the defined time period based at least in part on the results of analyzing the prediction information relating to the predicted amount of data traffic, performance indicators (e.g., KPIs) and/or communication conditions associated with the device 110 and base station 108, service specifications (e.g., service requirements or SLAs) associated with the service, respective performance of the base station 108 when in the respective RF channel configuration modes (e.g., in relation to, or in consideration of, the amount of data traffic, the performance indicators, and/or the communication conditions). The defined performance criteria can relate to or indicate, for example, one or more respective threshold performance indicator values or other threshold values that can be applicable to the communication session between the device 110 and base station 108. For example, the defined performance criteria can relate to, indicate, or specify a defined threshold minimum throughput level that has to be satisfied for the communication of the data traffic (e.g., the amount of data traffic), a defined threshold maximum latency amount (e.g., the maximum latency amount indicated by the latency specifications or guidelines associated with the class of service request) that can be allowed with regard to the communication of the data traffic, and/or another desired threshold value relating to the communication of the amount of data traffic between the base station 108 and the device 110 over the defined time period. The performance indicators can relate to or comprise, for example, throughput (e.g., data traffic throughput), SNR, a signal-to-interference-plus-noise ratio (SINR), a received signal strength indicator (RSSI), reference signal received power (RSRP) (e.g., an RSRP value), reference signal received quality (RSRQ) (e.g., an RSRQ value), quality of service (QOS (e.g., a QoS value), a channel quality indicator (CQI), a data packet loss rate, an amount of latency, spectral efficiency (SE) (e.g., an SE value), a bit error rate (BER), a block error rate (BLER), and/or another desired performance indicator, that can be associated with the data traffic or a communication channel associated with the device 110 and/or base station 108.

In certain embodiments, the system 100 can comprise a database component (DB COMP.) 124 that can be associated with (e.g., communicatively connected to) the configuration component 116 (and/or other components of the configuration manager component 114), and can comprise information relating to the respective RF channel configuration modes, respective threshold values associated with the respective RF channel configuration modes, and/or other desired information. The database component 124 can be a shared database library of information, for example. The information relating to the respective RF channel configuration modes and respective threshold values also can comprise contextual information, such as, for example, respective (e.g., different) threshold values or parameters that can be associated with the modes, the base station 108, the RAN 106, the core network 104, and/or the communication network 102 more generally for or during respective times (e.g., respective times of day, respective days of week, or respective months or seasons of the year) and/or under respective conditions. The configuration component 116 can obtain such information from the database component 124 and/or from another desired data source (e.g., data source component or device).

The subgroup of RF channel configuration modes determined by the configuration component 116 to satisfy the defined performance criteria can be an initial or preliminary recommendation of candidate RF channel configuration modes that can be further considered (e.g., by the configuration component 116) for utilization by the base station 108 to facilitate communication of the amount of data traffic between the base station 108 and device 110 over the defined time period. In some embodiments, as part of such determination, the configuration component 116 can determine which of the candidate RF channel configuration modes is a primary (e.g., first, top, or most highly recommended) candidate RF channel configuration mode of the subgroup of RF channel configuration modes. For example, the configuration component 116 can determine that a candidate RF channel configuration mode that best satisfies the defined performance criteria, as compared to the other candidate RF channel configuration modes, can be the primary candidate RF channel configuration mode with regard to the communication session between the device 110 and base station 108.

The configuration component 116 can communicate candidate information relating to the subgroup of candidate RF channel configuration modes to the NES state recommendation component 120 for further evaluation by the NES state recommendation component 120. In some embodiments, the candidate information can indicate which of the candidate RF channel configuration modes is the primary candidate RF channel configuration mode, although, in other embodiments, the candidate information may not specify which one is the primary candidate RF channel configuration mode. The NES state recommendation component 120 can take as input (e.g., input information) the respective total power consumption of the respective candidate RF channel configuration modes, which can be valid potential options for servicing the traffic demand (e.g., the amount of data traffic) associated with the device 110 in accordance with the defined performance criteria (e.g., can satisfy the throughput specifications, latency specifications, and/or other performance criteria over a desired number of TTIs using a given RF channel configuration mode). The NES state recommendation component 120 can recommend, to the configuration component 116, the candidate RF channel configuration mode of the subgroup of candidate RF channel configuration modes that is determined to provide desirable (e.g., suitable, maximum, or optimal) network energy savings, as compared to other candidate RF channel configuration modes of the subgroup of candidate RF channel configuration modes, and/or can indicate a ranking of the respective candidate RF channel configuration modes in order from the mode that can provide the highest amount of network energy savings to the mode that can provide the lowest amount of network energy savings.

In some embodiments, the NES state recommendation component 120 can obtain power measurement information and/or other information relating to the subgroup of candidate RF channel configuration modes from the RAN 106 (e.g., a radio unit (RU) of the base station 108 of the RAN 106), the database component 124, and/or another data source. For example, the NES state recommendation component 120 can obtain some or all of the power measurement information relating to the subgroup of candidate RF channel configuration modes from the RU of the base station 108, in response to a request for measurement report (e.g., power measurement report request) sent by the NES state recommendation component 120 to the RU.

In certain embodiments, the NES state recommendation component 120 can comprise, can be associated with, and/or can employ a spatial power consumption model (SPATIAL POWER CONSUM. MODEL) 126 that desirably (e.g., suitably, accurately, reliably, enhancedly, or optimally) can model and/or represent power consumption of the RAN 106 under various conditions and configurations, comprising modeling and/or representing respective power consumption of respective components of the RAN 106 (e.g., base station 108, and components thereof, such as one or more DUs, one or more RUs, a central unit (CU), and/or other components) under respective conditions (e.g., time conditions, network congestion conditions, or other conditions) and respective configurations, and if and when using respective RF channel configuration modes (e.g., for the base station 108). In some embodiments, the spatial power consumption model 126 can comprise a mapping of respective power consumption of the RAN 106, or components (e.g., base station 108, RU, DU, CU, or other component) thereof, to respective RF channel configuration modes and/or to respective conditions or respective configurations. In certain other embodiments, the spatial power consumption model 126 can be a trained ML-based model that can be trained (e.g., based at least in part on training data, previous power consumption data, feedback data, or other data) to predict respective power consumption of the RAN 106, or components thereof, under respective conditions or respective configurations, and if and when respective RF channel configuration modes are employed by the base station 108.

In some embodiments, the NES state recommendation component 120 can apply the spatial power consumption model 126 to the candidate information, the power measurement information, and/or the other information to determine or facilitate determining, or predict or facilitate predicting, respective amounts of power that would be consumed by the RAN 106, or components thereof, if and when the respective candidate RF channel configuration modes are utilized by the base station 108 with regard to communication of the data traffic (e.g., the amount of data traffic) between the base station 108 and the device 110 over the defined time period. For instance, the NES state recommendation component 120 can input the candidate information, the power measurement information, and/or the other information into the spatial power consumption model 126 and can apply the spatial power consumption model 126 to such information. The spatial power consumption model 126 can analyze such information, and based at least in part on the results of such analysis, the NES state recommendation component 120 and/or the spatial power consumption model 126 can determine or predict the respective amounts of power that would be consumed by the RAN 106, or components thereof, if and when the respective candidate RF channel configuration modes are utilized by the base station 108 with regard to communication of the data traffic between the base station 108 and the device 110 over the defined time period. In accordance with various embodiments, the respective amounts of power associated with the respective candidate RF channel configuration modes can be or represent respective average (e.g., mean), median, or most frequently occurring (e.g., mode) amounts of power, a respective range of amounts of power, and/or respective standard deviations of respective mean amounts of power, as desired. In certain embodiments, the NES state recommendation component 120 and/or the spatial power consumption model 126 can determine (e.g., calculate) or predict the respective amounts of power to be consumed by the respective candidate RF channel configuration modes on a per TTI basis, as desired.

The NES state recommendation component 120 can analyze (e.g., compare) the respective amounts of power associated with the respective candidate RF channel configuration modes. Based at least in part on the results of such analysis, the NES state recommendation component 120 can determine the amount of power of the respective amounts of power that is lower (e.g., lowest) than the other respective amounts of power, as the amount of power that is the lowest, relative to the other respective amounts of power, can provide the highest (e.g., greatest or most) network energy savings to the communication network 102. Accordingly, the NES state recommendation component 120 also can determine the candidate RF channel configuration mode that is associated with (e.g., that is determined or predicted to consume) the lower (e.g., lowest) amount of power. In certain embodiments, based at least in part on the results of such analysis, the NES state recommendation component 120 can rank the respective candidate RF channel configuration modes in order from the candidate mode that can be determined or predicted to provide the highest amount of network energy savings (e.g., can consume the lowest amount of power) to the candidate mode that can be determined or predicted to provide the lowest amount of network energy savings (e.g., can consume the highest amount of power) if and when utilized by the base station 108 in connection with communication of the data traffic between the base station 108 and the device 110 over the defined time period. For example, the NES state recommendation component 120 can rank the respective candidate RF channel configuration modes in order from a first ranked (e.g., highest or top ranked) candidate RF channel configuration mode that can consume the lowest amount of power and provide the highest amount of network energy savings, followed by a second ranked candidate RF channel configuration mode that can consume the second lowest amount of power and provide the second highest amount of network energy savings, followed by a third ranked candidate RF channel configuration mode that can consume the third lowest amount of power and provide the third highest amount of network energy savings, and so on, through to a lowest ranked candidate RF channel configuration mode that can consume the highest amount of power and provide the lowest amount of network energy savings relative to the other candidate RF channel configuration modes.

The NES state recommendation component 120 can generate a recommendation message that can comprise recommendation and/or ranking information that can indicate or specify the candidate RF channel configuration mode, of the subgroup of candidate RF channel configuration modes, that is recommended for use by the base station 108 for the communication of data traffic between the base station 108 and the device 110 during the defined time period due to such candidate mode being determined or predicted to provide the highest amount of network energy savings, can indicate or specify how much that network energy savings is (and/or the amount of power determined or predicted to be consumed); and/or can indicate or specify the ranking of the candidate RF channel configuration modes and/or the associated respective amounts of network energy savings (and/or the respective amounts of power determined or predicted to be consumed). The NES state recommendation component 120 can communicate the recommendation message, comprising the recommendation and/or ranking information, to the configuration component 116.

The configuration component 116 can analyze the recommendation and/or ranking information of the recommendation message. Based at least in part on the results of analyzing the recommendation and/or ranking information, the configuration component 116 can determine (e.g., identify) the recommended and/or highest ranked candidate RF channel configuration mode of the subgroup of candidate RF channel configuration modes, and/or can determine the respective rankings of the respective candidate RF channel configuration modes. Based at least in part on the recommended and/or highest ranked candidate RF channel configuration mode, and/or the ranking of the candidate RF channel configuration modes, the configuration component 116 can determine a desired candidate RF channel configuration mode of the subgroup that can be utilized by the base station 108 for the communication of the data traffic between the base station 108 and device 110 during the defined time period, in accordance with the defined configuration management criteria.

In some embodiments, the configuration component 116 can select the recommended and/or highest ranked candidate RF channel configuration mode, since that candidate mode can provide, or at least can be expected to provide, the highest amount of network energy savings, and since that candidate mode (like all of the candidate modes) has been determined to satisfy the defined performance criteria as well. This typically can be a desirable (e.g., suitable, efficient, enhanced, or optimal) mode that can desirably balance the constraints of desirably satisfying the data traffic demand and achieving desirable network energy savings.

In certain other embodiments, the configuration component 116 can select one of the candidate RF channel configuration modes that can provide a desired balance of relatively high performance (e.g., network performance, service performance, and/or device performance) and a relatively high amount of network energy savings, even if such candidate RF channel configuration mode is not the recommended or highest ranked candidate mode providing the highest amount of network energy savings (e.g., only if doing so is in accordance with the defined configuration management criteria). In that regard, in some embodiments, the configuration component 116 can apply respective weight values (e.g., performance weight value, and network energy savings weight value) to the respective performance levels and the respective amounts of network energy savings associated with the respective candidate RF channel configuration modes to generate (e.g., calculate) respective weighted performance levels and respective weighted amounts of network energy savings. The respective weight values can be determined in accordance with the defined configuration management criteria. If it is desired to prioritize performance levels over network energy savings, the configuration component 116 can select performance weight values and network energy savings weight values that can result in prioritizing performance levels over network energy savings. If, instead, it is desired to prioritize network energy savings over performance levels, the configuration component 116 can select performance weight values and network energy savings weight values that can result in prioritizing network energy savings over performance levels. The configuration component 116 can combine (e.g., add or integrate) and/or normalize the values of the respective weighted performance levels and the corresponding respective weighted amounts of network energy savings to generate respective total values associated with the candidate RF channel configuration modes. The configuration component 116 can identify and select the candidate RF channel configuration mode that has the highest total value as compared to other respective total values associated with the other respective candidate RF channel configuration modes.

Once the configuration component 116 has selected the desired RF channel configuration mode (e.g., the candidate mode providing desirable performance for the device 110 and/or service, and also providing the highest network energy savings; or the candidate mode providing a desired balance of desirable performance and desirable network energy savings), the configuration component 116 can generate configuration information (e.g., configuration instructions and/or parameter setting information) relating to the desired RF channel configuration mode, and can communicate the configuration information to the link adapter component 122 to facilitate (e.g., initiate or trigger) implementation of the desired RF channel configuration mode by the base station 108 and configuration of the base station 108 and/or an associated component of the RAN 106 based at least in part on (e.g., in accordance with) the desired RF channel configuration mode. The link adapter component 122 can configure or facilitate configuring (e.g., selecting the desired mode, setting parameter values, resource configuration and scheduling, and/or other configuration) the base station 108 and/or another component(s) associated with the base station 108 such that the desired RF channel configuration mode can be selected and/or implemented by the base station 108 with regard to the communication of the data traffic between the base station 108 and the device 110 during the defined time period.

Implementation of the desired RF channel configuration mode by the configuration component 116 and link adapter component 122 can comprise or involve configuring or reconfiguring (e.g., modifying configuration of) the antenna component (e.g., antenna array) of the receiver component and/or transmitter component of the base station 108 (e.g., the RU of the base station 108) and/or MIMO spatial streams, and/or parameters relating thereto. For instance, implementation of the desired RF channel configuration mode by the configuration component 116 and link adapter component 122 can comprise or involve configuring or reconfiguring the antenna component, MIMO component, or components associated therewith, with regard to beamforming (e.g., antenna array selection), transmit diversity, spatial multiplexing, and/or other features, functions, and/or parameters of the base station 108. For instance, implementation of the desired RF channel configuration mode by the configuration component 116 and link adapter component 122 can comprise or involve configuring (e.g., setting) or reconfiguring (e.g., modifying or adjusting, if the base station 108 was previously configured using a different RF channel configuration mode with regard to the communication session with the device 110) a number of antennas (e.g., transmitter or receiver antennas) of the base station 108, a number of RF MIMO spatial layers, a type of MIMO (e.g., SU MIMO or MU MIMO), an MCS value (e.g., selected from a group of MCS values), a transmit diversity (e.g., a transmit diversity parameter value(s)), and/or another function, feature, or component (e.g., a parameter value(s) of another function, feature, or component) of or associated with the base station 108, that is or are to be utilized by the base station 108 for the communication of the data traffic between the base station 108 and the device 110 during the defined time period.

The RF channel configuration mode selection by the configuration manager component 114 can be on a per device (e.g., per UE) basis, and the configuration manager component 114 can determine and select respective RF channel configuration modes for the base station 108 with regard to respective amounts of data traffic between the base station 108 and the respective devices (e.g., device 110, device 112, and/or another device(s)) over respective time periods, in accordance with the defined configuration management criteria. In some embodiments, while the respective RF channel configuration modes for the respective devices can be determined and selected by the configuration manager component 114 on a per device basis, the number of antenna ports of the base station 108 that have to be active can be determined by the highest MIMO configuration for the TTI that is under consideration.

In accordance with various embodiments, the configuration manager component 114 can continue to monitor the performance of the communication network 102 (e.g., the RAN 106, the base station 108, or other component) and/or the power consumption of components (e.g., the RAN 106, the base station 108, RU, DU, CU, or other component) of the communication network 102 with regard to communication of data traffic between the base station 108 (and/or another base station(s)) and devices (e.g., device 110, device 112, and/or another device(s)) over time, to facilitate determining whether there are any performance issues, power consumption issues, or other issues, and determining whether any modifications are to be made to any of the RF channel configuration mode selections associated with any of the communication sessions of any of the devices, such as described herein. In some embodiments, the configuration manager component 114 can employ an RL decision engine and a reward function that can reward and reinforce desirable (e.g., suitable, good, efficient, or optimal) RF channel configuration mode selections, and can discourage, and can encourage modification of, a RF channel configuration mode selection that is determined to be undesirable (e.g., due to not satisfying performance criteria, not providing desirable network energy savings, or both), such as more fully described herein.

Figure 2:
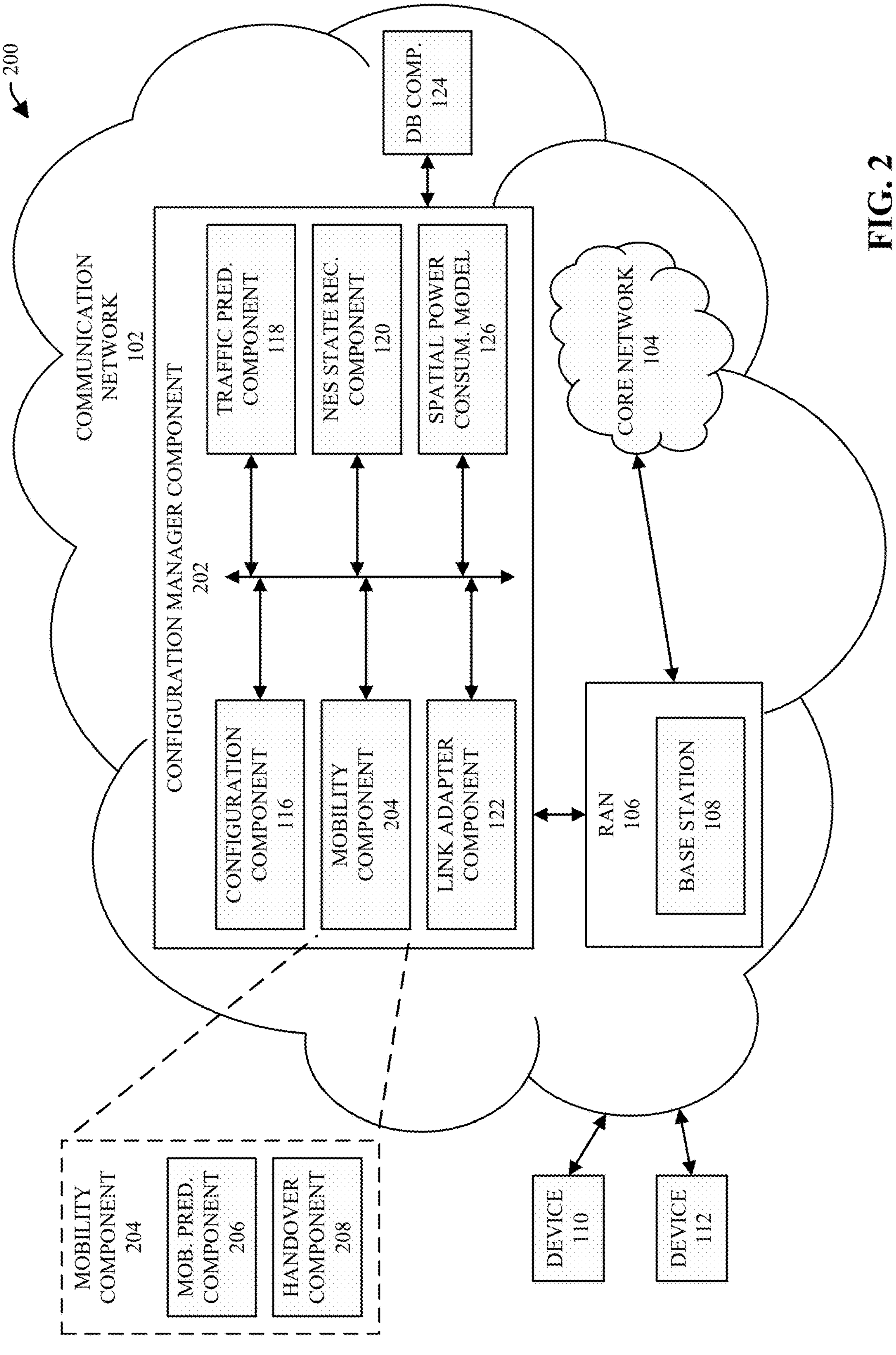
FIG. 2 illustrates a block diagram of a non-limiting example system that can desirably manage RF channel configuration for a base station with regard to communication sessions associated with devices to achieve desirable communication performance and network energy savings, including employing mobility prediction and handover information associated with a device to facilitate such management of RF channel configuration, in accordance with various aspects and embodiments of the disclosed subject matter.

Referring to FIG. 2 (along with FIG. 1), FIG. 2 illustrates a block diagram of a non-limiting example system 200 that can desirably (e.g., automatically, dynamically, suitably, reliably, efficiently, enhancedly, and/or optimally) manage RF channel configuration (e.g., configuration or reconfiguration) for a base station with regard to communication sessions associated with devices to achieve desirable communication performance and network energy savings, including employing mobility prediction and handover information associated with a device to facilitate such management of RF channel configuration, in accordance with various aspects and embodiments of the disclosed subject matter. The system 200 can comprise the communication network 102, the core network 104, the RAN 106, the base station 108, and the devices 110 and 112, such as described herein. The system 200 also can comprise a configuration manager component 202, such as described herein. The configuration manager component 202 can comprise the configuration component 116, the traffic predictor component 118, the NES state recommendation component 120, and the link adapter component 122, such as described herein. The configuration manager component 202 also can comprise or be associated with the database component 124 and the spatial power consumption model 126, such as described herein.

In accordance with various embodiments, the configuration manager component 202 can comprise a mobility component 204 that can comprise a mobility predictor component (MOB. PRED. COMPONENT) 206 and a handover component 208. The mobility component 204 can determine and provide mobility predictions relating to devices (e.g., device 110 and/or device 112) and/or can track and provide handover information relating of handovers of devices (e.g., device 110 and/or device 112) between cells of one or more base stations (e.g., base station 108 and/or another base station). The mobility component 204 can determine and account for when devices (e.g., device 110 or device 112) are moving away from the base station 108, are stationary in relation to the base station 108, or are moving toward the base station 108.

In accordance with various embodiments, the mobility predictor component 206 can employ ML-based techniques and/or models that can desirably predict mobility (e.g., movement, location, and/or velocity) of devices (e.g., device 110 or device 112), predict handover of the device (e.g., device 110) between cells of the base station 108 or another base station, and/or predict service (e.g., call or other service) dropping of the device by the base station 108. Mobility prediction can be somewhat more problematic than prediction of some other features, as devices typically can move in a two-dimensional pattern (or three-dimensional pattern) that often can be governed by the transportation infrastructure layout. Certain less complex mobility prediction approaches can use hidden Markov models (HMMs), however, in some embodiments, the mobility predictor component 206 can employ ML-based techniques and/or models for trajectory prediction to predict mobility of devices (e.g., device 110 or device 112) as trajectory prediction can make simultaneous use of transportation maps (e.g., road map of an area(s) where the device was, is, or in the future may be located) and real time information (and/or near real time or non-real time information) regarding mobility of the device (e.g., device 110), and can provide at least two sets of mobility-related information that can be desirable (e.g., wanted, vital, or useful) for handover management and resource allocation with regard to the device, comprising probabilities of future locations of the device (e.g., in combination with an assessment of velocity of travel of the device that can be obtained through other measures, such as Doppler shifts) and handover or service dropping probability associated with the device, as it can be a desirable network performance indicator. It is noted that, in other embodiments, the mobility predictor component 206 can utilize HMMs for mobility prediction to predict mobility of devices (e.g., device 110 or device 112). The mobility information (e.g., mobility prediction information) can be desirable (e.g., useful) in making determinations (e.g., by the configuration component 116) regarding which RF channel configuration modes of the group of RF channel configuration modes can be desirable (e.g., suitable, viable, or valid) candidate RF channel configuration modes that can satisfy the defined performance criteria associated with the device and, as a result, can be options that can be further considered and evaluated (e.g., evaluated with regard to network energy savings) to facilitate RF channel configuration mode selection.

The handover component 208 can track information relating to previous handovers of the device (e.g., device 110) between cells of the base station 108 or another base station, and predictions of future handovers of the device between cells of the base station 108 or another base station. This handover-related information can be desirable (e.g., useful) in making determinations (e.g., by the configuration component 116) regarding which RF channel configuration modes of the group of RF channel configuration modes can be desirable (e.g., suitable, viable, or valid) candidate RF channel configuration modes that can satisfy the defined performance criteria associated with the device and, as a result, can be options that can be further considered and evaluated (e.g., evaluated with regard to network energy savings) to facilitate RF channel configuration mode selection.

With further regard to mobility and handover prediction, the mobility information associated with a device (e.g., device 110) can be utilized by the configuration manager component 114 in a number of ways. In some embodiments, with regard to a device (e.g., device 110) that can be perceived or predicted to be moving away (e.g., in an RF signal power sense and/or in a physical distance sense) from the base station 108, the configuration manager component 114 can determine that the number of MIMO spatial layers is not to be increased. The channel quality may degrade for the device that is traveling away from the base station 108, and, as a result, there can be an increased CQI reporting condition (e.g., requirement) for the device just to be able to maintain the MIMO configuration (e.g., the MIMO configuration with the current number of MIMO spatial layers) and associated MCS value.

On the other hand, when the device (e.g., device 110) is moving toward the base station 108 (e.g., in an RF signal power sense and/or in a physical distance sense), this can lead to progressively improving CQI reports, and, as a result, the configuration manager component 114 can determine that the MIMO spatial layers associated with the device can be increased, or at least increasing of MIMO spatial layers associated with the device can be considered, when determining which RF channel configuration mode to utilize at the base station 108 for the device during the communication session. For example, considering $$D_{flow}^{k}$$

as a variable for the kth device (e.g., device 110) connected to the base station 108 that can be used to determine (e.g., by the configuration manager component 114) the RF channel configuration mode in conjunction with other parametric dependence, $$D_{flow}^{k}$$

can be defined as follows:

$$D_{flow}^{k} = \begin{cases} -1, & \text{if } M_{avg}^{-} \text{ consecutive } UE \text{ reports are worse than its precedent and the } UE \text{ is moving} \\ +1, & \text{if } M_{avg}^{+} \text{ consecutive } UE \text{ reports are better than the its precedent and the } UE \text{ is moving} \end{cases}$$

In the above equation for $$D_{flow}^{k},\ M_{avg}^{-} < M_{avg}^{+},$$

and these can be configurable parameters (e.g., configurable by configuration manager component 114 and/or a user) that can imply that the move towards use of higher (e.g., more) MIMO layers in RF can be approached (e.g., by the configuration manager component 114) more conservatively than reducing a MIMO layers (e.g., reducing the number of MIMO layers, with regard to the device during the communication session. Additionally, in certain embodiments, the mobility component 204 can determine (e.g., compute or calculate) a device-specific handover (HO) probability $$(P_{HO}^{k,t})$$

if at the t$^{th}$ measurement epoch, $$D_{flow}^{k} = -1. \text{ For } P_{HO}^{k,t}$$

above a certain threshold value $$P_{HO}^{THRESH},$$

the network energy savings policy, implemented by the NES state recommendation component 120, may further restrict an upgrade (e.g., increase) to higher MIMO spatial layers with regard to the device during the communication session.

With further regard to the foregoing, for example, the configuration manager component 114 can determine or perceive whether the device 110 is moving away from or towards the base station 108 based at least in part on the quality of the received signal, as perceived or indicated by SINR (e.g., at receiver of the base station 108), CQI (e.g., reduced CQI can indicate the device 110 is moving away from the base station 108), or other type of signal indicator, that can indicate degraded or improving signal quality at the receiver of the base station 108 due to device mobility, such as described herein. The configuration manager component 114 can enhance or optimize the use of more or fewer antenna ports of the base station 108 for the probability of success of receiving the data from the device 110 within the target BLER when a greater number of antenna ports are used specifically to increase the number of spatial layers, for example, to increase the effective data rate. Further, since use of transmit diversity also can lead to the power being divided between the active antenna ports (wherein average transmitter power can be fixed) along with use of a transmit precoding matrix at the base station 108, this can be a relatively higher power consumption mode for the base station 108. When network energy savings is prioritized, the configuration manager component 114, employing the techniques and methods described herein, also may discourage selection of a transmit diversity mode for devices (e.g., device 110) that are perceived or determined to be moving away from the base station 108. Based at least in part on how aggressive the network energy savings policy is towards prioritizing the network energy savings, the likelihood of such mode selection may increase or decrease, but can be well captured by the above-disclosed equation for defining or determining $$D^k_{flow}.$$

With regard to the device 110, the configuration component 116 can receive the mobility information and handover-related information, including mobility and handover predictions relating to the device 110 and/or calculations or determinations relating to mobility and handovers associated with the device 110, from the mobility component 204. In some embodiments, when determining which RF channel configuration modes of the group of RF channel configuration modes can be desirable candidate RF channel configuration modes for further consideration with regard to a communication session between the base station 108 and the device 110, the configuration component 116 can analyze the data traffic demand (e.g., the amount of data traffic that can be predicted to be communicated during the defined time period), the defined performance criteria (e.g., throughput, latency, and/or other performance criteria), the mobility information, the handover-related information, and respective performance information associated with the respective RF channel configuration modes. Based at least in part on the results of such analysis, the configuration component 116 can determine which RF channel configuration modes of the group of RF channel configuration modes can be desirable candidate RF channel configuration modes for further consideration with regard to a communication session between the base station 108 and the device 110. For instance, based at least in part on the results of such analysis, the configuration component 116 can determine which RF channel configuration modes can satisfy the defined performance criteria associated with the device 110 and/or service used by the device 110, and/or, can determine whether one or more of RF channel configuration modes are to be removed from consideration (e.g., not included as a candidate mode) due to the predicted mobility or predicted handover of the device 110 during or in connection with the defined time period. For example, if the mobility information predicts that the device 110 will be moving away from the base station 108 during or in connection with the defined time period when the data traffic is to be communicated, the configuration component 116 can remove from consideration (e.g., not include as a candidate mode) one or more RF channel configuration modes that relate to or involve increasing the number of MIMO spatial layers (e.g., even if the one or more RF channel configuration modes were otherwise determined to satisfy the defined performance criteria associated with the device 110).

Figure 3:
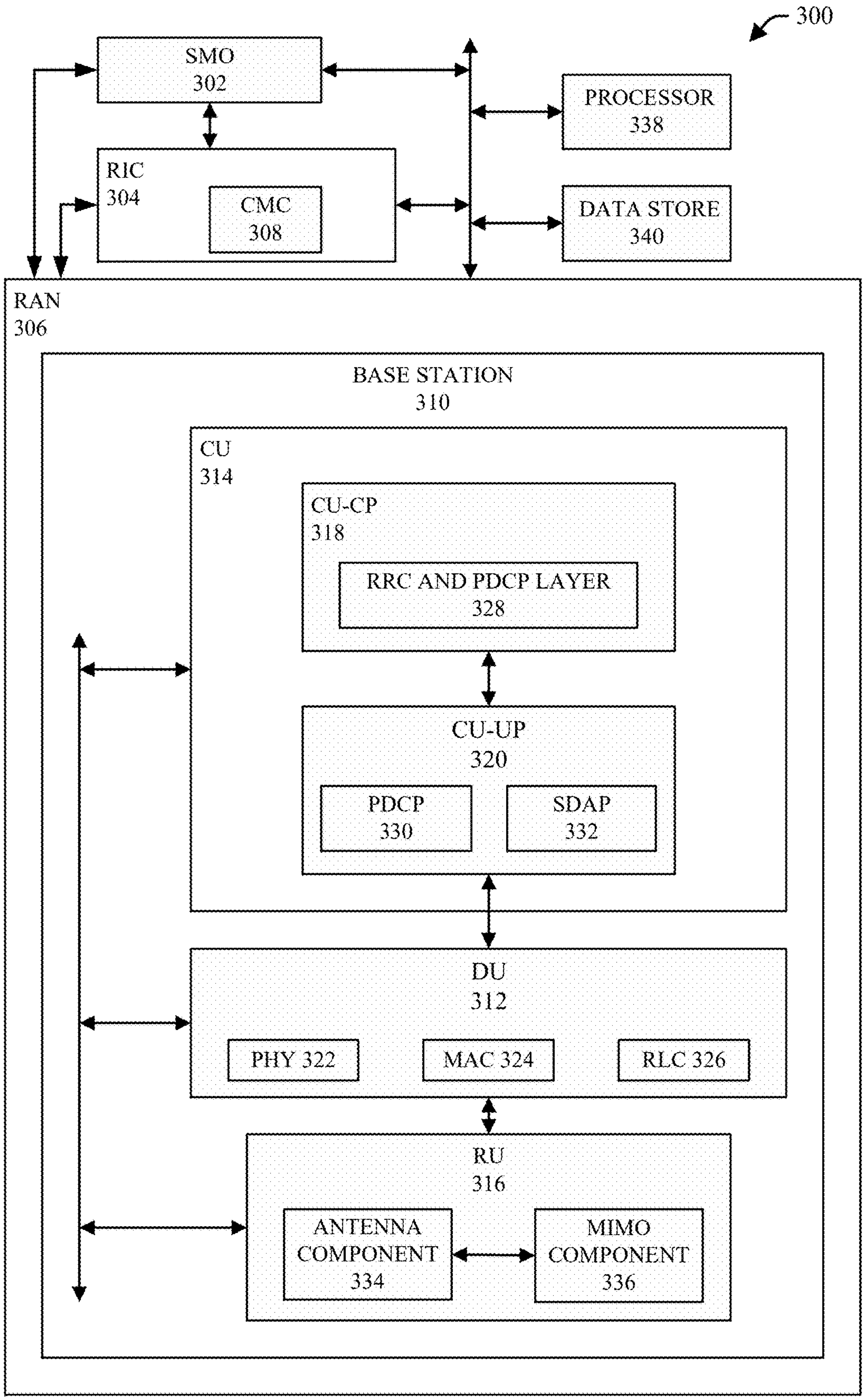
FIG. 3 depicts a block diagram of non-limiting example system that can comprise a configuration manager component in an open radio access network (O-RAN) communication network environment to facilitate desirable management of RF channel configuration for a base station with regard to communication sessions associated with devices to achieve desirable communication performance and network energy savings, in accordance with various aspects and embodiments of the disclosed subject matter.

Turning to FIG. 3 (along with FIGS. 1 and 2), FIG. 3 depicts a block diagram of non-limiting example system 300 that can comprise a configuration manager component in an O-RAN communication network environment to facilitate desirable (e.g., suitable, reliable, efficient, enhanced, and/or optimal) management of RF channel configuration for a base station with regard to communication sessions associated with devices to achieve desirable communication performance and network energy savings, in accordance with various aspects and embodiments of the disclosed subject matter. In some embodiments, the system 300 can be part of the system 100 depicted in FIG. 1 or the system 200 depicted in FIG. 2.

The system 300 can comprise a service management and orchestration (SMO) 302, a RIC 304, a RAN 306, and the configuration manager component 308. In some embodiments, the configuration manager component 308 can be part of the RIC 304. In other embodiments, all or a portion of (e.g., all or some of the components of) the configuration manager component 308 can be part of another component (e.g., the RAN 306, SMO 302, or another component), or can be a standalone component that can be associated with the SMO 302, RIC 304, and RAN 306.

In some embodiments, the RAN 306 can be an O-RAN that can be part of an O-RAN architecture and environment (e.g., the communication network 102 can employ an O-RAN architecture and environment). In certain embodiments, the RAN 306 can be a cloud-based or centralized RAN (C-RAN) that can be part of a cloud or centralized RAN (C-RAN), or a virtual RAN (vRAN) that can be part of a vRAN architecture and environment (e.g., the communication network 102 can employ a C-RAN or vRAN architecture and environment). In still other embodiments, the RAN 306 may not be an O-RAN, C-RAN, or vRAN.

In accordance with various embodiments, the RAN 306 and associated communication network (e.g., communication network 102) can be part of a 5G or other communication environment (e.g., an xG communication environment, wherein x can be 5 or a number other than 5). With regard to 5G or other cellular standard generation, the RAN 306 can comprise base stations, such as a gNodeB (gNB) or NR NodeB (NR NB), that can be disaggregated into a CU (e.g., gNB or other NR NB CU), comprising a CU-user plane (CU-UP) (e.g., gNB or other NR NB CU-UP), a CU-control plane (CU-CP) (e.g., gNB or other NR NB CU-CP), and a DU (e.g., gNB or other NR NB DU). The CU-UP and DU can be part of the user plane node, with the CU-UP hosting packet data convergence protocol (PDCP) and service data adaption protocol (SDAP) entities, and the DU can host the radio link control (RLC), medium access control (MAC), and physical (PHY) layers.

For instance, the RAN 306 can comprise the base station 310 that can comprise a DU 312, a CU 314, and an RU 316 (e.g., a gNB or other NR NB RU). The CU 314 can comprise a CU-CP 318 (also referred to as a CU-CP node) and a CU-UP 320 (also referred to as a CU-UP node). In accordance with various embodiments, the DU 312, the CU 314, the RU 316, or another component of or associated with the base station 310 can be associated with (e.g., communicatively connected to) the configuration manager component 308, which can comprise various components and functions, and can perform various operations, such as described herein. In certain embodiments, the RAN 306 and/or the base station 310 can comprise multiple DUs, multiple CU-CPs, multiple CU-UPs, and/or multiple RUs.

The DU 312 can be a logical node that can host or handle baseband (e.g., PHY) 322 and layer 2 (L2) (e.g., a MAC layer 324 and a RLC layer 326) functionality associated with the base station 310. The CU-CP 318 can be a logical node that can host or handle layer 3 (L3) (e.g., a radio resource control (RRC) and PDCP layer 328) control plane functionality associated with the base station 310. The CU-UP 320 can be a logical node that can host or handle data traffic between the core network 104 (e.g., 5G core network) and one or more DUs (e.g., the DU 312) to which the CU-UP 320 is connected. In some embodiments, the CU-UP 320 can comprise a PDCP component (PDCP) 330 that can perform PDCP functions, and an SDAP component (SDAP) 332 that can perform SDAP functions.

The RU 316 can be or can comprise a logical node that can host a lower PHY layer and RF processing, where signals (e.g., RF signals) can be transmitted, received, amplified, digitized, or otherwise processed, to facilitate communication of information (e.g., signals comprising information) between the RAN 306 and other devices (e.g., devices 110 and/or 112) or components (e.g., components or functions of the core network 104 or communication network 102). In some embodiments, the RU 316 can comprise an antenna component 334 that can comprise an antenna array that can comprise a desired number of transmitter and receiver antennas to facilitate transmission and receiving of signals comprising information, and perform various beamforming, antenna-related, and communication-related functions. The RU 316 also can comprise a MIMO component 336 that can be employed to generate or modify a number of MIMO spatial layers and a number of spatial streams employed by the base station 310 (e.g., with regard to a device(s)) during a communication session between the base station 310 and a device (e.g., device 110), and perform MIMO spatial multiplexing functions. In certain embodiments, the MIMO component 336 can be configured in an SU-type MIMO mode or an MU-type MIMO mode. The RU 316 also can comprise or be associated with other functions, including, for example, MCS functions and transmit diversity functions. The configuration of the RU 316 (or portion thereof), including the configuration of the antenna component 334, MIMO component 336, MCS functions, transmit diversity functions, and/or other functions can be based at least in part on the RF channel configuration mode that being selected and implemented by the configuration manager component 308 with regard to a communication session between the base station 310 and device (e.g., device 110).

In some embodiments, as disclosed, the system 300 can comprise an O-RAN architecture and environment, and the RAN 306 can be an O-RAN. In some embodiments, in the O-RAN architecture and environment, the SMO component 302 can be associated with (e.g., communicatively connected to) the RIC 304 and/or the RAN 306 (and/or one or more other RANs) via an interface(s) (e.g., an O1 interface, an AI interface, or another interface), to facilitate communication of information between the SMO component 302 and the RIC 304 and/or the RAN 306 (and/or one or more other RANs), and the RIC 304 can be associated with the RAN 306 (and/or one or more other RANs) via an interface(s) (e.g., an E2 interface or another interface), to facilitate communication of information between the RIC 304 and the RAN 306 (and/or one or more other RANs).

The SMO component 302 can act and operate as a management and orchestration layer that can control configuration and automation aspects of the RIC 304 and RAN elements of the RAN(s) 306. The SMO component 302 can comprise various types of management services and various network functions, comprising network management functions, which can include RAN-type or RAN-related functions, core management functions, transport management functions, network slice management functions (e.g., end-to-end network slice management functions), and/or other network management functions. In accordance with various embodiments, the network functions can be or can comprise physical network functions, virtualized network functions (e.g., virtual machines (VMs), containers, or other virtualized network functions). At least some of the various network functions (e.g., network management functions or other network functions) can operate in real time or near real time.

The RIC 304 can operate to control (e.g., manage) and enhance (e.g., improve or optimize) RAN functions and services of the RAN(s) 306. At least some of the various network functions and components of the RIC 304 can operate in real time or near real time, and some network functions and components of the RIC 304 may operate in non-real time. As disclosed, in accordance with various embodiments, the configuration manager component 308, or a portion thereof, can be part of the RIC 304. Some of the functions of the configuration manager component 308 (e.g., certain traffic prediction functions of the traffic predictor component 118) can be performed in real time or near real time, and certain other functions of the configuration manager component 308 (e.g., longer-term traffic prediction functions of the traffic predictor component 118) can be performed in non-real time, such as described herein.

In accordance with various embodiments, the system 300 can comprise a processor component 338 that can be associated with (e.g., communicatively connected to) and can work in conjunction with other components of the system 300, including the SMO 302, the RIC 304, the RAN 306, the configuration manager component 308, a data store 340, and/or other components of the system 300, to facilitate performing the various functions and operations of the system 300. The processor component 338 can employ one or more processors (e.g., one or more central processing units (CPUs)), microprocessors, or controllers that can process information relating to data, files, services, applications, communication networks, RANs, cells, devices, users, resources, communication sessions (e.g., PDU or other communication sessions), performance indicators, RF channel configuration modes, link adaptation, data traffic prediction and determinations, data traffic statistics, power consumption associated with modes, spatial power consumption model, AI/ML-based models, measurement reports, device mobility predictions and determinations, device handover predictions and determinations, mappings relating to power consumption and RF channel configuration modes, reward functions, weight values, threshold (e.g., maximum, minimum, or other threshold) values, PDU sets, grants (e.g., downlink or uplink periodic grants or configured grants), downlink control information (DCI), training data, feedback information, congestion information or indicators, data processing operations, messages, notifications, alarms, alerts, preferences (e.g., user or client preferences), hash values, metadata, parameters, traffic flows, policies, the defined performance criteria, the defined configuration management criteria, algorithms (e.g., enhanced configuration management algorithms, enhanced mode selection or determination algorithms, enhanced prediction algorithms, hash algorithms, data compression algorithms, data decompression algorithms, and/or other algorithm), interfaces, protocols, tools, and/or other information, to facilitate operation of the system 300, and control data flow between the system 300 and/or other components (e.g., network components, another RAN, the communication network 102, a device (e.g., 110 or 112), a node, a service, a user, or other entity) associated with the system 300.

The data store 340 can store data structures (e.g., user data, metadata), code structure(s) (e.g., modules, objects, hashes, classes, procedures) or instructions, information relating to data, files, services, applications, communication networks, RANs, cells, devices, users, resources, communication sessions (e.g., PDU or other communication sessions), performance indicators, RF channel configuration modes, link adaptation, data traffic prediction and determinations, data traffic statistics, power consumption associated with modes, spatial power consumption model, AI/ML-based models, measurement reports, device mobility predictions and determinations, device handover predictions and determinations, mappings relating to power consumption and RF channel configuration modes, reward functions, weight values, threshold (e.g., maximum, minimum, or other threshold) values, PDU sets, grants (e.g., downlink or uplink periodic grants or configured grants), downlink control information (DCI), training data, feedback information, congestion information or indicators, data processing operations, messages, notifications, alarms, alerts, preferences (e.g., user or client preferences), hash values, metadata, parameters, traffic flows, policies, the defined performance criteria, the defined configuration management criteria, algorithms (e.g., enhanced configuration management algorithms, enhanced mode selection or determination algorithms, enhanced prediction algorithms, hash algorithms, data compression algorithms, data decompression algorithms, and/or other algorithm), interfaces, protocols, tools, and/or other information, to facilitate controlling or performing operations associated with the system 300. The data store 340 can comprise volatile and/or non-volatile memory, such as described herein. In an aspect, the processor component 338 can be functionally coupled (e.g., through a memory bus) to the data store 340 in order to store and retrieve information desired to operate and/or confer functionality, at least in part, to the SMO 302, RIC 304, RAN 306, configuration manager component 308, processor component 338, data store 340, and/or other component of the system 300, and/or substantially any other operational aspects of system 300.

As disclosed, the data store 340 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), flash memory, non-volatile memory express (NVMe), NVMe over fabric (NVMe-oF), persistent memory (PMEM), or PMEM-oF. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 4:
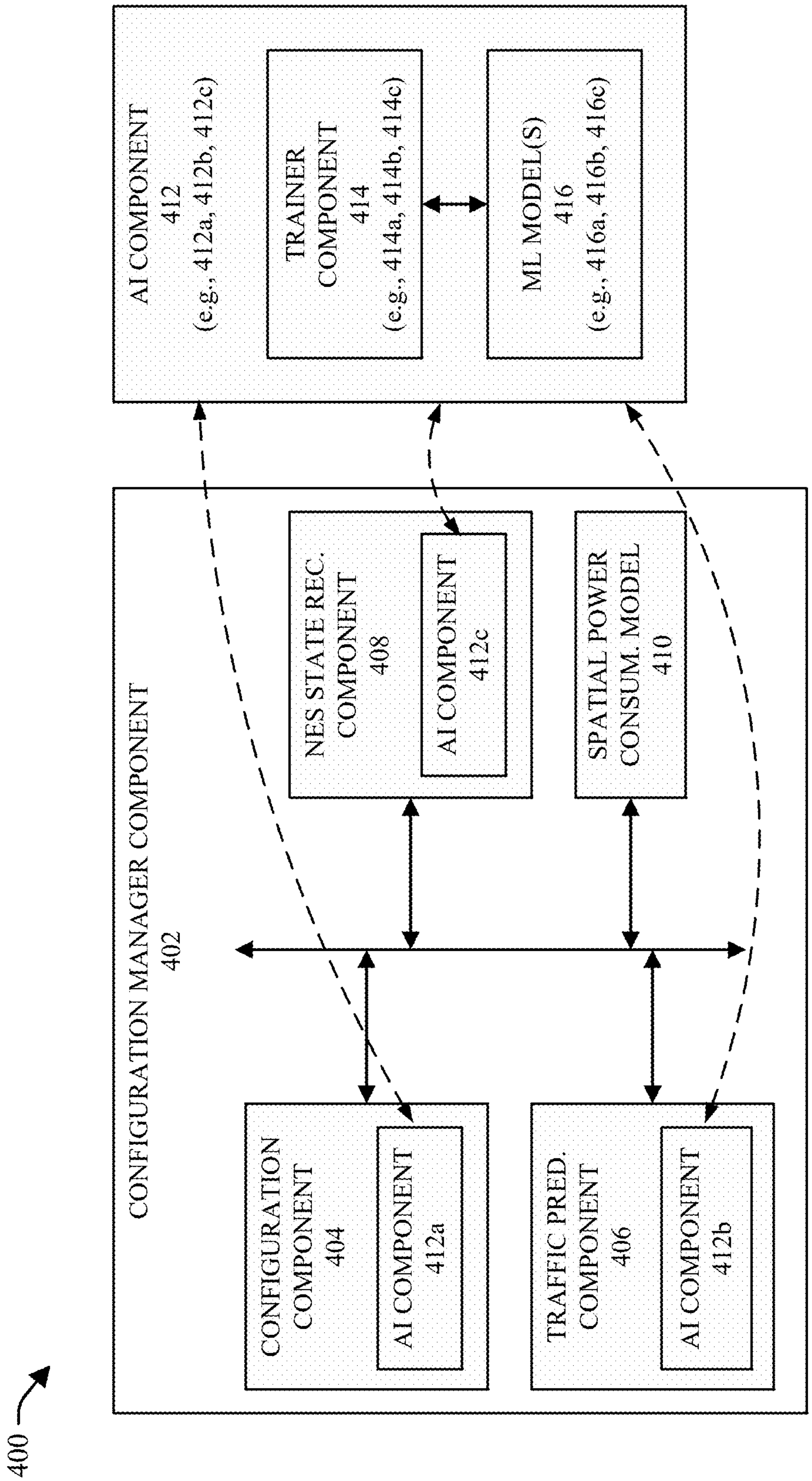
FIG. 4 illustrates a block diagram of non-limiting example system that can employ artificial intelligence and machine learning based techniques to facilitate desirable management of RF channel configuration for a base station with regard to communication sessions associated with devices to achieve desirable communication performance and network energy savings, in accordance with various aspects and embodiments of the disclosed subject matter.

Referring to FIG. 4 (along with FIGS. 1, 2, and 3), FIG. 4 illustrates a block diagram of non-limiting example system 400 that can employ AI and ML-based techniques to facilitate desirable (e.g., suitable, reliable, efficient, enhanced, and/or optimal) management of RF channel configuration for a base station with regard to communication sessions associated with devices to achieve desirable communication performance and network energy savings, in accordance with various aspects and embodiments of the disclosed subject matter. The system 400 can comprise a configuration manager component 402 that can operate and perform various functions, such as described herein. The configuration manager component 402 can comprise a configuration component 404, a traffic predictor component 406, an NES state recommendation component 408, and a spatial power consumption model 410 that can respectively operate and perform various respective functions, such as described herein.

In accordance with various embodiments, the configuration manager component 402 can comprise an AI component 412 (e.g., 412*a*, 412*b*, and 412*c*) that can employ AI and/or ML techniques to render (e.g., make) various predictions or determinations relating to enhancing management of RF channel configuration, including selection of RF channel configuration modes, with regard to communication sessions between base stations (e.g., base station 108) and devices (e.g., device 110 and/or device 112) and/or perform various other operations, such as described herein. The AI component 412 can employ AI, ML, and/or other AI-type techniques and algorithms to determine or predict traffic demand (e.g., amount of data traffic) associated with a communication session between the base station and device, determine or predict longer term data traffic trends associated with the RAN, determine or predict respective power consumption associated with respective RF channel configuration modes with regard to a communication session between the base station and device, determine or predict an effect (e.g., impact) on performance indicators (e.g., QoS or other performance indicator) as a result of utilization of an RF channel configuration mode with regard to the communication session, determine or predict an effect on power consumption by the RAN (or other network component) as a result of utilization of an RF channel configuration mode with regard to the communication session, determine or predict mobility of the device during the communication session, determine or predict handover of the device during the communication session, and/or perform other desired functions or operations. In some embodiments, the AI component 412 can comprise, generate, and/or train ML models that can be trained to learn, determine, or predict traffic demand associated with the communication session between the base station and device, learn, determine, or predict longer term data traffic trends associated with the RAN, learn, determine, or predict respective power consumption associated with respective RF channel configuration modes with regard to the communication session, learn, determine, or predict an effect on performance indicators as a result of utilization of an RF channel configuration mode with regard to the communication session, learn, determine, or predict an effect on power consumption by the RAN (or other network component) as a result of utilization of an RF channel configuration mode with regard to the communication session, learn, determine, or predict mobility of the device during the communication session, learn, determine, or predict handover of the device during the communication session, and/or perform other desired functions or operations.

For instance, the AI component 412 (e.g., 412*a*, 412*b*, and 412*c*) can employ a trainer component 414 (e.g., 414*a*, 414*b*, and 414*c*) that can train (or refine or update training of) a (trained) ML model(s) 416 (e.g., model(s) 416*a*, 416*b*, and 416*c*) to learn to determine or predict traffic demand associated with the communication session between the base station and device, determine or predict longer term data traffic trends associated with the RAN, determine or predict respective power consumption associated with respective RF channel configuration modes with regard to the communication session, determine or predict an effect on performance indicators as a result of utilization of an RF channel configuration mode with regard to the communication session, determine or predict an effect on power consumption by the RAN (or other network component) as a result of utilization of an RF channel configuration mode with regard to the communication session, determine or predict mobility of the device during the communication session, determine or predict handover of the device during the communication session, and/or perform other desired functions or operations, based at least in part on application of training data and/or feedback information relating to communication sessions to the (trained) ML model, wherein the training data and/or feedback information can comprise or relate to, for example, current or previous communication sessions associated with a device(s), services, RF channel configuration modes, traffic demand, device mobility, device handovers, power consumption, energy power savings, the defined configuration management criteria, defined performance criteria, threshold values, and/or other data. Such training of the (trained) ML model 416 can enable the trained ML model to learn to determine or predict traffic demand associated with the communication session between the base station and device, determine or predict longer term data traffic trends associated with the RAN, determine or predict respective power consumption associated with respective RF channel configuration modes with regard to the communication session, determine or predict an effect on performance indicators as a result of utilization of an RF channel configuration mode with regard to the communication session, determine or predict an effect on power consumption by the RAN (or other network component) as a result of utilization of an RF channel configuration mode with regard to the communication session, determine or predict mobility of the device during the communication session, determine or predict handover of the device during the communication session, and/or perform or automate other desired functions or operations.

In certain embodiments, the trained ML model 416 can perform an ML-based analysis on information and/or feedback information relating to current or previous communication sessions associated with a device(s), services, RF channel configuration modes, traffic demand, device mobility, device handovers, power consumption, energy power savings, the defined configuration management criteria, defined performance criteria, threshold values, and/or the other desired information. Based at least in part on the results of the ML-based analysis on such information, the trained ML model 416 can determine or predict traffic demand associated with the communication session between the base station and device, determine or predict longer term data traffic trends associated with the RAN, determine or predict respective power consumption associated with respective RF channel configuration modes with regard to the communication session, determine or predict an effect on performance indicators as a result of utilization of an RF channel configuration mode with regard to the communication session, determine or predict an effect on power consumption by the RAN (or other network component) as a result of utilization of an RF channel configuration mode with regard to the communication session, determine or predict mobility of the device during the communication session, determine or predict handover of the device during the communication session, and/or perform or automate other desired functions or operations.

For example, based at least in part on the ML-based analysis results, the trained ML model 416 (e.g., when the model is a traffic prediction model) can determine whether there are one or more data patterns in the data that can indicate an amount of data traffic that is to be communicated between the base station and the device during a defined time period, and/or the trained ML model 416 (e.g., when the model is a mobility predictor model) can determine whether there are one or more data patterns in the data that can indicate whether the device will be moving toward the base station, will be moving away from the base station, or will remain stationary in relation to the base station, during or in connection with the defined time period when the data traffic can be communicated between the base station and the device, to facilitate determining which of the RF channel configuration modes can be the desired RF channel configuration mode, or at least can be a candidate RF channel configuration mode. In some embodiments, the trained ML model 416 (e.g., when the model is a traffic prediction model) can determine a probability (e.g., probability value) that a particular amount of data traffic will be communicated between the base station and the device during the defined time period, and/or can determine respective probabilities that respective amounts of data traffic will be communicated between the base station and the device during the defined time period. The configuration manager component 402, AI component 412, or the trained ML model 416 can determine or predict the amount of data traffic that will be communicated between the base station and the device during the defined time period based at least in part on the respective probabilities and a threshold probability (e.g., a threshold probability value) relating to traffic prediction, and/or based at least in part on whether there are one or more data patterns in the data that can indicate the amount of data traffic that will be communicated between the base station and the device during the defined time period.

For instance, the configuration manager component 402, AI component 412, or the trained ML model 416 can compare the respective probabilities associated with data traffic predictions to the respective threshold probability relating to traffic prediction to determine whether any of respective probabilities satisfy (e.g., meet or exceed; is at or greater than) the respective threshold probability. If, based at least in part on the results of such comparison, the configuration manager component 402, AI component 412, or the trained ML model 416 determines that one or more of the respective probabilities does not satisfy (e.g., is less than) the respective threshold probability, the configuration manager component 402, AI component 412, or the trained ML model 416 can determine that the particular data traffic prediction (e.g., the particular amount of data traffic) associated with such probability is likely or probably not the amount of data traffic that will be communicated between the base station and the device during the defined time period. If, instead, based at least in part on the comparison results, the configuration manager component 402, AI component 412, or the trained ML model 416 determines that one or more of the respective probabilities does satisfy the respective threshold probability, the configuration manager component 402, AI component 412, or the trained ML model 416 can determine that the one or more particular data traffic predictions associated with the one or more respective probabilities at least can be sufficiently likely or probable for the defined time period, and, in some embodiments, the configuration manager component 402, AI component 412, or the trained ML model 416 can determine that the data traffic prediction associated with the highest probability can be a desirable data traffic prediction of the amount of data traffic that will be communicated between the base station and the device during the defined time period.

With regard to the mobility example, the trained ML model 416 (e.g., when the model is a mobility predictor model) can determine respective probabilities that the device will be moving toward the base station, will be moving away from the base station, or will remain stationary in relation to the base station, during or in connection with the defined time period when the data traffic can be communicated between the base station and the device (and/or can determine respective probabilities of respective future locations of the device during or in connection with the defined time period). The configuration manager component 402, AI component 412, or the trained ML model 416 can determine or predict whether the device will be moving toward the base station, will be moving away from the base station, or will remain stationary in relation to the base station, during or in connection with the defined time period based at least in part on the respective probabilities and a threshold probability (e.g., a threshold probability value) relating to mobility prediction, and/or based at least in part on whether there are one or more data patterns in the data that can indicate whether the device will be moving toward the base station, will be moving away from the base station, or will remain stationary in relation to the base station, during or in connection with the defined time period.

For instance, the configuration manager component 402, AI component 412, or the trained ML model 416 can compare the respective probabilities associated with device mobility to the threshold probability relating to mobility predictions to determine whether one or more of the respective probabilities satisfy (e.g., meet or exceed; is at or greater than) the respective threshold probability. If, based at least in part on the results of such comparison, the configuration manager component 402, AI component 412, or the trained ML model 416 determines that a particular respective probability associated with a particular mobility prediction does not satisfy (e.g., is less than) the respective threshold probability, the configuration manager component 402, AI component 412, or the trained ML model 416 can determine that the particular mobility prediction is not likely to be a correct prediction of mobility of the device during or in connection with the defined time period. If, instead, based at least in part on the comparison results, the configuration manager component 402, AI component 412, or the trained ML model 416 determines that one or more of the respective probabilities associated with respective mobility predictions does satisfy the respective threshold probability, the configuration manager component 402, AI component 412, or the trained ML model 416 can determine that the one or more respective device mobility predictions associated with the one or more respective probabilities at least can be sufficiently likely or probable for the defined time period, and, in some embodiments, the configuration manager component 402, AI component 412, or the trained ML model 416 can determine that the device mobility prediction associated with the highest probability can be a desirable device mobility prediction of movement and/or location of the device during or in connection with the defined time period.

It is to be appreciated and understood that, while the configuration manager component 402, AI component 412, or the trained ML model 416 can, if and as desired, employ a threshold probability in making predictions (e.g., with regard to variables, such as device mobility), the configuration manager component 402, AI component 412, or the trained ML model 416 do not have to do so, or can do so in conjunction with or as part of other types or techniques of prediction. For instance, the configuration manager component 402, AI component 412, or the trained ML model 416 (e.g., a trained traffic predictor model) can perform device mobility prediction, wherein the configuration manager component 402, AI component 412, or the trained ML model 416 can predict an evolution or a trajectory (e.g., a travel trajectory) of a location, comprising a predicted future location, of a device (e.g., device 110) based at least in part on an ML-based analysis of previous states (e.g., previous locations and/or other type of state) of the device, the direction of the device, velocity of movement of the device, transportation or road maps (e.g., map of roads in an area(s) where the device was, is, or in the future may be located), information that can indicate whether the device is in a vehicle (e.g., in a moving vehicle) or is being used or possessed by a user who is walking, vehicle traffic information (e.g., vehicle traffic information that can indicate a level of vehicle traffic congestion in the area(s) associated with the device), and/or other information (e.g., other real time information, near real time information, or non-real time information) relating to or indicative of the mobility of the device. In some embodiments, as part of the ML-based analysis and prediction, the configuration manager component 402, AI component 412, or the trained ML model 416 can determine (e.g., calculate) one or more probabilities of one or more potential future locations of the device at one or more future times. In certain embodiments, the configuration manager component 402, AI component 412, or the trained ML model 416 may or may not (e.g., optionally may or may not) utilize (e.g., apply) a desired threshold probability with regard to the one or more probabilities to facilitate prediction of the mobility, including the future location, of the device.

As disclosed, the AI component 412 can perform an AI and/or ML-based analysis on data, such as information relating to communication sessions to the (trained) ML model, wherein the training data and/or feedback information can comprise or relate to, for example, current or previous communication sessions associated with a device(s), services, RF channel configuration modes, traffic demand, device mobility, device handovers, power consumption, energy power savings, the defined configuration management criteria, defined performance criteria, threshold values, and/or other information, such as more fully described herein. In connection with or as part of such an AI or ML-based analysis, the AI component 412 can employ, build (e.g., construct or create), and/or import, AI and/or ML techniques and algorithms, AI and/or ML models (e.g., trained models), neural networks (e.g., trained neural networks), decision trees, Markov chains (e.g., trained Markov chains), and/or graph mining to render and/or generate predictions, inferences, calculations, prognostications, estimates, derivations, forecasts, detections, and/or computations that can facilitate determining or learning data patterns in data, determining or learning a correlation, relationship, or causation between an item(s) of data and another item(s) of data (e.g., occurrence of the other item(s) of data or an event relating thereto), determining or learning a correlation, relationship, or causation between an event and another event (e.g., occurrence of another event), determining or learning about relationships between components (e.g., base stations, cells, network nodes, communication links, devices, or other components or functions) of or associated with the communication network 102, determining or learning about traffic demand associated with a communication session between the base station and device, determine or learning about longer term data traffic trends associated with the RAN, determine or learning about respective power consumption associated with respective RF channel configuration modes with regard to a communication session between the base station and device, determine or learning about an effect on performance indicators as a result of utilization of an RF channel configuration mode with regard to the communication session, determine or learning about an effect on power consumption by the RAN (or other network component) as a result of utilization of an RF channel configuration mode with regard to the communication session, determine or learning about mobility of the device during the communication session, determine or learning about handover of the device during the communication session, performing other desired functions or operations, and/or automating one or more functions or features of the disclosed subject matter, as more fully described herein.

Based at least in part on the results of the analysis, the AI component 412 can determine, train, and generate one or more models 416 (e.g., machine learning model or other model), such as described herein, wherein the models can model or be representative of respective features and/or respective historical performance of the communication network, RAN, cells, configuration manager component, respective RF channel configuration modes, services, devices, and/or other functions, features, or operations, such as described herein. The AI component 412 can update (e.g., modify, adjust, refine, or change), and further train and enhance, the model as additional data (e.g., information relating to further operation of or modifications to the communication network, RAN, cells, configuration manager component, RF channel configuration modes, services, devices, and/or other functions, features, or operations; output results output from the ML model; the feedback information; and/or other information) is received and analyzed by the AI component 412 or model. In some embodiments, as part of the data analysis, and the determining and training of the models, the AI component 412 can employ (and/or train) Markov chains, a neural network(s), decision trees, or other AI-based or ML-based modeling, techniques, functions, or algorithms.

The AI component 412 can employ various AI-based or machine learning-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 412 can examine the entirety or a subset of the data (e.g., the training data; the operational data relating to the communication network, the RAN, the devices, and/or the services; the feedback information; and/or other information, such as described herein) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

With further regard to traffic prediction models, techniques, and algorithms, in accordance with various embodiments, the AI component 412 (e.g., AI component **412*b*) can employ relatively faster traffic prediction techniques, algorithms, and models to enable real time or at least near real time predictions of traffic demand associated with communication sessions between base stations and devices. In some embodiments, the traffic predictor component 406 can perform these data traffic predictions based at least in part on information collected from or related to the DU (e.g., DU 312) of the base station (e.g., base station 310). The data traffic predictions can relate to and/or can be based at least in part on per-subframe data traffic demand associated with devices (e.g., device 110**).

In certain embodiments, the AI component 412 (e.g., AI component **412*b***) can employ a trained decision tree regressor model with time series features, as such trained decision tree regressor model desirably can have relatively low complexity and can facilitate performing such desirable faster (and desirably accurate) traffic demand predictions. A decision tree-based approach (based on a flowchart-like structure that can represent a series of decisions and their possible consequences) for data traffic demand prediction (e.g., cellular data traffic demand prediction), as described herein, can achieve results that are demonstrably within desired tolerance (e.g., accuracy tolerance) levels, with relatively little fine-tuning and significantly lower computational effort that does not require a repeated computation of high-precision weights or multiply-accumulate operations that require increasing bit-widths, in contrast to more complex ML models.

It is noted that decision tree-based approaches typically can be used with tabular data where both input and outputs can be available to determine the functional relationship between the input and output. In data traffic prediction, however, this is not the case, as only the observed traffic data in the form of call data records or physical resource block (PRB) utilization may be available. Further, PRB utilization may be available only when the granularity of the data collection allows for it. Thus, the problem can be recast as a supervised ML problem, along with forming the data pipeline with appropriate feature engineering. An advantage of decision tree regressors can be that they are able to handle non-linear relationships between input features and the target variable, which can be appropriate for cellular data traffic levels, as the time of day and traffic level typically do not have a linear relationship (and seasonal traffic also may have a role to play as well).

While decision tree regressors can be well suited for accurate data traffic prediction as described herein, in some embodiments, the AI component 412 can employ one or more other models, including regressor models, that can perform traffic prediction or other prediction of other variables, based on the technology described herein. Such models can include, but are not limited to, for example, recurrent neural network (RNN), long short-term memory (LSTM), k-nearest neighbors regressor, extra tree regressor, extra trees regressor, Gaussian process regressor, gradient boosting regressor, extra gradient boost (XGB) regressor, Hist gradient boosting regressor, random forest regressor, AdaBoost regressor, bagging regressor, light gradient boosting machine (LGBM) regressor, multilayer perceptron (MLP) regressor, Lasso based, Lars based, ridge, Bayesian ridge, linear regression, transformed target regressor, stochastic gradient descent (SGD) regressor, ElasticNetCV (where CV denotes cross validation), orthogonal matching pursuitCV, ridgeCV Huber regressor, Poisson regressor ElasticNet, Tweedie regressor, NuSVR, gamma regressor, passive aggressive regressor, support vector regression (SVR), orthogonal matching pursuit, linearSVR, dummy regressor, RANSAC regressor, and/or KernelRidge.

In accordance with certain embodiments, additionally or alternatively, the AI component 412 (e.g., AI component 412*b*) can employ desired traffic prediction techniques, algorithms, and models (e.g., LSTM model or other type of model), such as described herein, to enable non-near real time predictions relating to longer term data traffic demand, including longer term data traffic demand trends and longer term data traffic statistics, associated with communication sessions between base stations and devices. In some embodiments, such desired traffic prediction techniques, algorithms, and models employed for these non-near real time predictions relating to longer term data traffic demand can be (but do not have to be) relatively more complex techniques, algorithms, and models than those employed with regard to performing the relatively faster traffic demand prediction described herein. In some embodiments, the traffic predictor component 406, employing the AI component 412 (e.g., AI component 412*b*) and associated models (e.g., models 416*b*), can perform these longer term data traffic predictions based at least in part on information collected from or related to multiple DUs (e.g., DU 312 and one or more other DUs) of one or more base stations (e.g., base station 310 and/or one or more other base stations) of one or more RANs (e.g., RAN 306 and/or one or more other RANs) of the communication network (e.g., communication network 102). The data traffic predictions can relate to and/or can be based at least in part on per-subframe data traffic demand associated with devices (e.g., device 110).

Figure 5:
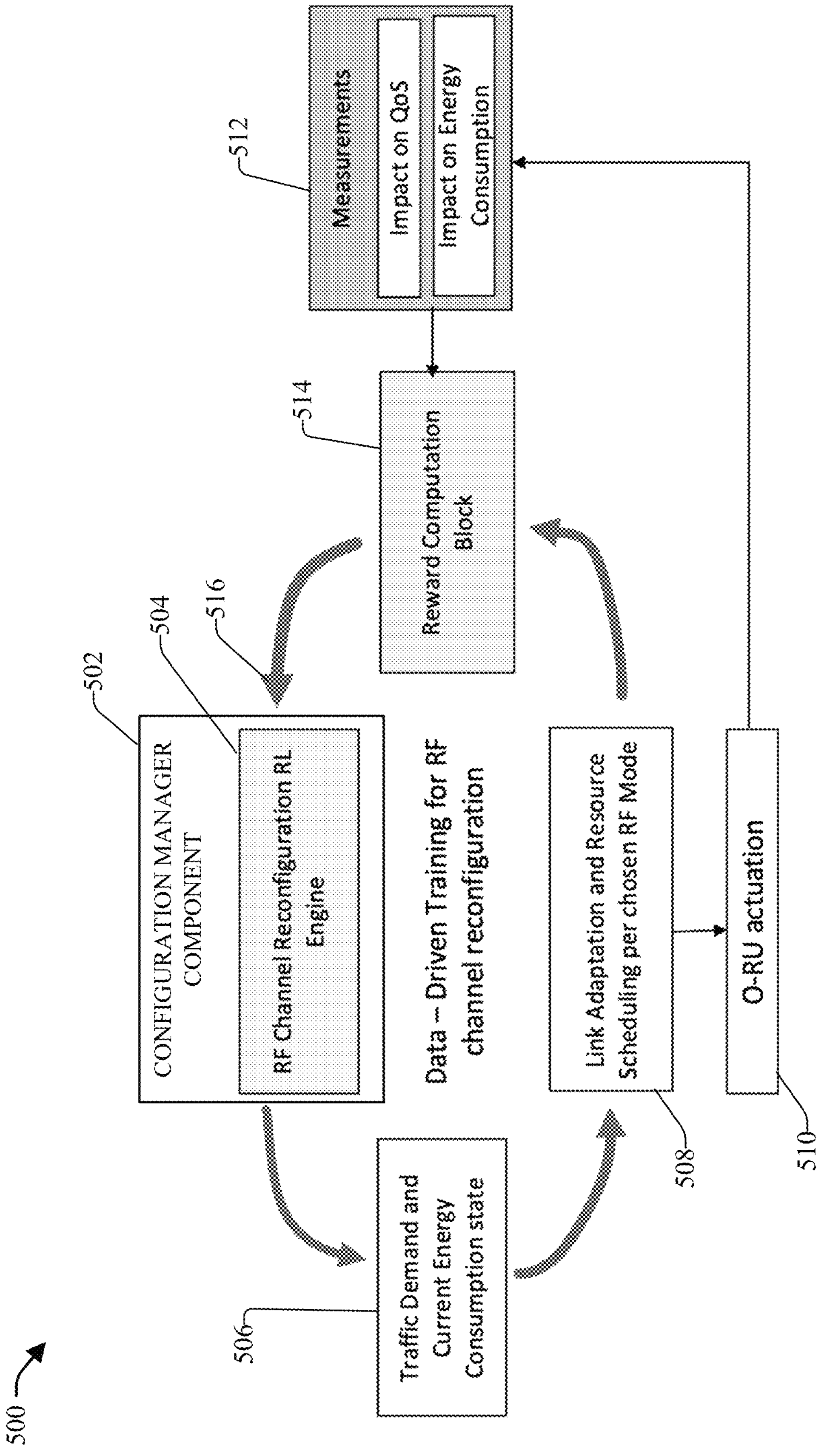
FIG. 5 depicts a block diagram of a non-limiting example reward determination flow that can employ a reinforcement learning (RL)-based decision engine that can be employed by the configuration manager component to facilitate desirable management of RF channel configuration for a base station with regard to communication sessions associated with devices to achieve desirable communication performance and network energy savings, in accordance with various aspects and embodiments of the disclosed subject matter.

Referring to FIG. 5 (along with FIGS. 1-4), FIG. 5 depicts a block diagram of a non-limiting example reward determination flow 500 that can employ a reinforcement learning (RL)-based decision engine that can be employed by the configuration manager component to facilitate desirable (e.g., suitable, reliable, efficient, enhanced, and/or optimal) management of RF channel configuration for a base station with regard to communication sessions associated with devices to achieve desirable communication performance and network energy savings, in accordance with various aspects and embodiments of the disclosed subject matter. Given the dynamics and uncertainty that inherently can exist in wireless network environments (e.g., communication network 102), using existing approaches for selection of operational modes (e.g., RF channel configuration modes) desiring (e.g., wanting or requiring) complete and perfect knowledge of the systems can become inefficient or even inapplicable. The example reward determination flow 500 can employ an approach that can be desirable in that the communication network can be bootstrapped using finite threshold-based methods and techniques to initiate the RF channel configuration mode selection, but also can enable the learning of the operating environment of the communication network through RL-based approaches, such as shown in FIG. 5 and described herein. The example reward determination flow 500 and the RL-based decision engine can employ desirable data-driven training for RF channel configuration that can enhance RF channel configuration for the communication network, enhance performance with respect to serving devices (e.g., satisfy defined performance criteria associated with devices), and enhance network energy savings for the communication network, in accordance with the defined configuration management criteria.

The reward determination flow 500 can involve various components and features, comprising the configuration manager component 502, which can comprise an RF channel configuration RL component 504 (also referred to herein as the RL-based decision engine or RL agent). The configuration manager component 502 can operate and can comprise or perform various functions, such as described herein.

With regard to the reward determination flow 500 and the RL-based decision engine 504, the following descriptions for the state space and action space can be applied. With regard to state, the state space S associated with the reward determination flow 500 and the RL-based decision engine 504 can be defined by the current RF activation matrix $R_t$ and the traffic demand $T_t$. With regard to actions, the actions space A can comprise of the various RF channel configuration modes that the base station (e.g., 310) can be in for the transmission of data for a given device (e.g., device 110), which can include, for example, transmit diversity, MIMO modes with 1 through $N_T$ transmit antennas being active or beamforming with $N_T$, $N_T/2$, or $N_T/4$ antenna ports when massive MIMO is being used, and/or other types of modes.

An aspect of any RL-based approach can be to incentivize the next states such that a global optimum can be obtained through the trajectory of states. This can be referred to as reward shaping, and the reward determination flow 500 and the RL-based decision engine 504 can employ the following approach to reward shaping for desirable network energy savings using RF channel configuration as a tool. The RF channel configuration mode that can be selected (e.g., by the RL-based decision engine 504) with the given data traffic condition and energy consumption incentive can be a combination of performance indicator enhancement (e.g., throughput and/or other performance indicator enhancement) and network energy consumption reduction. While the state space S and the actions space A are well-explained above, the behavior with respect to the traffic demand $T_t$ and the energy consumption change $\Delta E_t$ associated with the communication network can determine the transition from $R_t$ to $R_{t+1}$. More specifically, the reward for the RL agent's actions can be determined as per the RL agent (e.g., the RL-based decision engine 504) providing either a performance indicator enhancement (e.g., throughput and/or other performance indicator enhancement) or a network energy savings enhancement or both. Accordingly, for the state transition from $S_t$ to $S_{t+1}$, the reward can be determined (e.g., calculated) as follows:

$$r(S_t, S_{t+1}) = \beta * \Delta E_t + (1-\beta)^{\alpha} * \Delta D - \Delta L.$$

In the reward equation above, ΔD can be the change in throughput (or other performance indicator, if applicable) rendered through the transition to state $S_{t+1}$ and $0<\beta<1$ can be an importance factor that can be set (e.g., by the configuration manager component 502 or user) closer to 1 when network energy savings is the primary goal, and can be set closer to 0 when performance (e.g., throughput or other performance indicator) is the primary goal. In some embodiments, setting (e.g., by the configuration manager component 502 or user) a~1 can provide an additional degree of freedom that can allow adjusting (e.g., tweaking or tuning) the reward more towards actions that can provide incremental network energy savings benefits. The ΔL, which can be represented as $\Delta L=\Sigma_{k\in U_L} l_k$, can be a cumulative factor that can account for the latency increase (if any) caused by the RL agent's actions in the set of devices that observe a latency increase $U_L$. In some embodiments, the actions space A of the RL-based decision engine 504 can be time dependent (e.g., time-of-day dependent or otherwise time dependent) so as not to make changes that may lead to or result in actions that can take significantly longer. In such cases, the cost function can have a time dependent factor (e.g., a time-of-day dependent factor or other time dependent factor) that can discourage or facilitate discouraging actions that can involve or require significant changes or can have longer activation times (e.g., that may have reduced capability to support average daily data traffic demand during that particular time (e.g., during that hour or other time period)).

In accordance with the example reward determination flow 500, as indicated at reference numeral 506, the configuration manager component 502 can determine or predict the data traffic demand with regard to communication of data traffic between the base station and the device (e.g., device 110) during a defined time period, can determine a current energy (e.g., power) consumption state associated with the communication network, and can determine and select an initial RF channel configuration mode to be utilized by the base station (e.g., base station 310) with regard to communication of data traffic between the base station and the device (e.g., device 110) during a defined time period, such as described herein. As indicated at reference numeral 508 of the reward determination flow 500, the configuration manager component 502 and/or the link adapter component (e.g., link adapter component 122) can perform or facilitate implementing the selected RF channel configuration mode, and performing link adaptation and resource scheduling per the selected RF channel configuration mode, such as described herein. The performing of the link adaptation and the resource scheduling per the selected RF channel configuration mode can lead to, can result in, and/or can include actuation of the RU (e.g., O-RU 316), in accordance with the selected RF channel configuration mode, as indicated at reference numeral 510 of the reward determination flow 500.

As indicated at reference numeral 512 of the reward determination flow 500, the configuration manager component 502 can collect, from the RU (e.g., O-RU 316) and/or other component of the RAN, measurement data (e.g., measurement reports) relating to impact (e.g., effect) on QoS (or other type of performance indicators) and impact on energy consumption by the communication network (e.g., by the RAN 306 or other network component) that can result from the utilization of the selected RF channel configuration mode by the base station (e.g., base station 310) with regard to the communication session with the device (e.g., device 110).

As indicated at reference numeral 514 of the reward determination flow 500, the RL-based decision engine 504, using the equations, functions, and techniques described herein, can determine (e.g., calculate or compute) a reward (e.g., a reward value) that can indicate or represent whether the utilization of the selected RF channel configuration mode by the base station (e.g., base station 310) with regard to the communication session with the device (e.g., device 110) has had a positive effect, a negative effect, or a neutral effect on the performance indicator (e.g., throughput and/or other performance indicator) or network energy savings. If, for example, the reward value indicates that there has been an overall positive effect (e.g., a significant overall positive effect), or there has been a positive effect on both the performance indicator or network energy savings, as result of the utilization of the selected RF channel configuration mode by the base station (e.g., base station 310) with regard to the communication session with the device (e.g., device 110), this can indicate the selected RF channel configuration mode has been desirable (e.g., useful, beneficial, or otherwise can be achieving the desired goals with regard to performance and network energy savings), and can indicate that it may be desirable to continue utilizing the selected RF channel configuration mode for the communication session (unless there has been a significant change in data traffic demand, communication conditions, device mobility, or other factor associated with the device 110).

If, instead, the reward value indicates that there has been an overall negative effect (e.g., a significant overall negative effect), or there has been a negative effect on both, or at least one of, the performance indicator or network energy savings, as result of the utilization of the selected RF channel configuration mode by the base station (e.g., base station 310) with regard to the communication session with the device (e.g., device 110), this can indicate the selected RF channel configuration mode may not be desirable, and can indicate that it may be desirable to change, or at least consider changing (e.g., evaluate whether to change), from using the selected RF channel configuration mode to using (e.g., by the base station 310) a different RF channel configuration mode for the communication session with the device 110.

If, however, the reward value indicates that there has been a relatively small overall positive or negative effect, or there has been a relatively small positive or negative effect on both, or at least one of, the performance indicator or network energy savings, as result of the utilization of the selected RF channel configuration mode by the base station (e.g., base station 310) with regard to the communication session with the device (e.g., device 110), this may indicate that it is unclear whether the selected RF channel configuration mode is desirable or not, and unclear as to whether it can be desirable to change from using the selected RF channel configuration mode to using (e.g., by the base station 310)

a different RF channel configuration mode for the communication session with the device 110.

As indicated at reference numeral 516 of the reward determination flow 500, the RL-based decision engine 504 can determine whether to change from using the selected RF channel configuration mode to using (e.g., by the base station 310) a different RF channel configuration mode for the communication session with the device 110, or maintain the same selected RF channel configuration mode for the communication session, or take another action, based at least in part on evaluation of the reward value, in accordance with the defined configuration management criteria. In some embodiments, the RL-based decision engine 504 can utilize one or more threshold reward values, and evaluate the reward value in relation to the one or more threshold reward values, to facilitate determining whether or not to change from the selected RF channel configuration mode to a different RF channel configuration mode for the communication session, or take another action.

For instance, there can be a first (e.g., higher) threshold reward value and a second (e.g., lower) threshold reward value employed. If the RL-based decision engine 504 determines that the reward value satisfies (e.g., is at or greater than; or meets or exceeds) the first threshold reward value, the RL-based decision engine 504 can determine that there has been a sufficient positive effect from using the selected RF channel configuration mode for the communication session, and the selected RF channel configuration mode can continued to be used for the communication session (unless a significant change has been detected in data traffic demand, communication conditions, device mobility, or other factor associated with the device 110). If, instead, the RL-based decision engine 504 determines that the reward value satisfies (e.g., is at or lower than) the second threshold reward value, the RL-based decision engine 504 can determine that there has been a sufficient negative effect resulting from using the selected RF channel configuration mode for the communication session that can indicate the selected RF channel configuration mode should be changed, and the configuration manager component 502 (e.g., the RL-based decision engine 504 or other component of the configuration manager component 502) can determine a different RF channel configuration mode for the base station to use for the communication session, such as described herein.

If, instead, the RL-based decision engine 504 determines that the reward value is satisfies the second threshold reward value and is lower than the first threshold reward value, the RL-based decision engine 504 can determine that there has not been a significant positive effect or significant negative effect resulting from using the selected RF channel configuration mode for the communication session, and accordingly, the RL-based decision engine 504 may decide to continue to have the base station use the selected RF channel configuration mode for the communication session with the device, and evaluate again later when more measurement data is obtained from the RU.

It is noted that, with regard to mMIMO, mMIMO can consider horizontal and vertical movement of a device (e.g., device 110). When considering a base station (e.g., a macro base station, such as the base station 310) for lower than midband frequencies, vertical movement typically can constitute relatively minor changes in the RF environment unless it changes conditions from non-line of sight (NLoS) to line of sight (LoS) propagation for the affected device, which typically can have a fairly low probability in an urban macro environment, and vertical movements of devices can be relatively rare in suburban or rural environments. The shadowing path loss roughly can remain the same if the radial distance from the base station does not change, and the change in azimuth angle within a building does not affect the MIMO mode configuration decision made, unless such angular movement also leads to a change in the reported CQI or SINR for the device. In the latter case, if there is a change in the reported CQI, SINR, or other indicator for the device, the configuration manager component 502 can take that into account when making decisions and determinations regarding selection of a desirable RF channel configuration mode for the device, such as described herein.

For higher frequency mMIMO, with regard to a change in vertical movement (e.g., vertical only movement) of the device (e.g., device 110), the configuration manager component 502 can change (e.g., modify or adjust) the angular direction of the beam, for example, which, for a fixed distance, does not require a change in the number of antenna elements used by the base station (e.g., base station 310), but rather can involve a change in the phase and amplitude feeding into a phased array antenna to adjust the directionality of the beam. With regard to horizontal movement of the device, on the other hand, this can lead to a change in the amplitudes of the eigenvectors, either reported by the device through a precoding matrix indicator (PMI) (e.g., upon doing a matrix decomposition of the channel) or derived by the base station through a combination of sounding reference signals (SRS) and channel station information (CSI). One of the inputs to the link adaptation and resource scheduling block 508 can be MIMO selection, and, in some embodiments, the decision regarding MIMO selection usually can be made (e.g., by the configuration manager component 502) significantly slower than decisions regarding link adaptation (e.g., MCS selection and PRB allocation). The link adaptation and resource scheduling block 508 can receive a MIMO order (e.g., from the configuration manager component 502) that can be proportional to or somewhat lower (e.g., slightly lower) than the rank of the channel matrix to configure the MIMO mode appropriately, and this can be further refined through network energy savings considerations, such as described herein.

Figure 6:
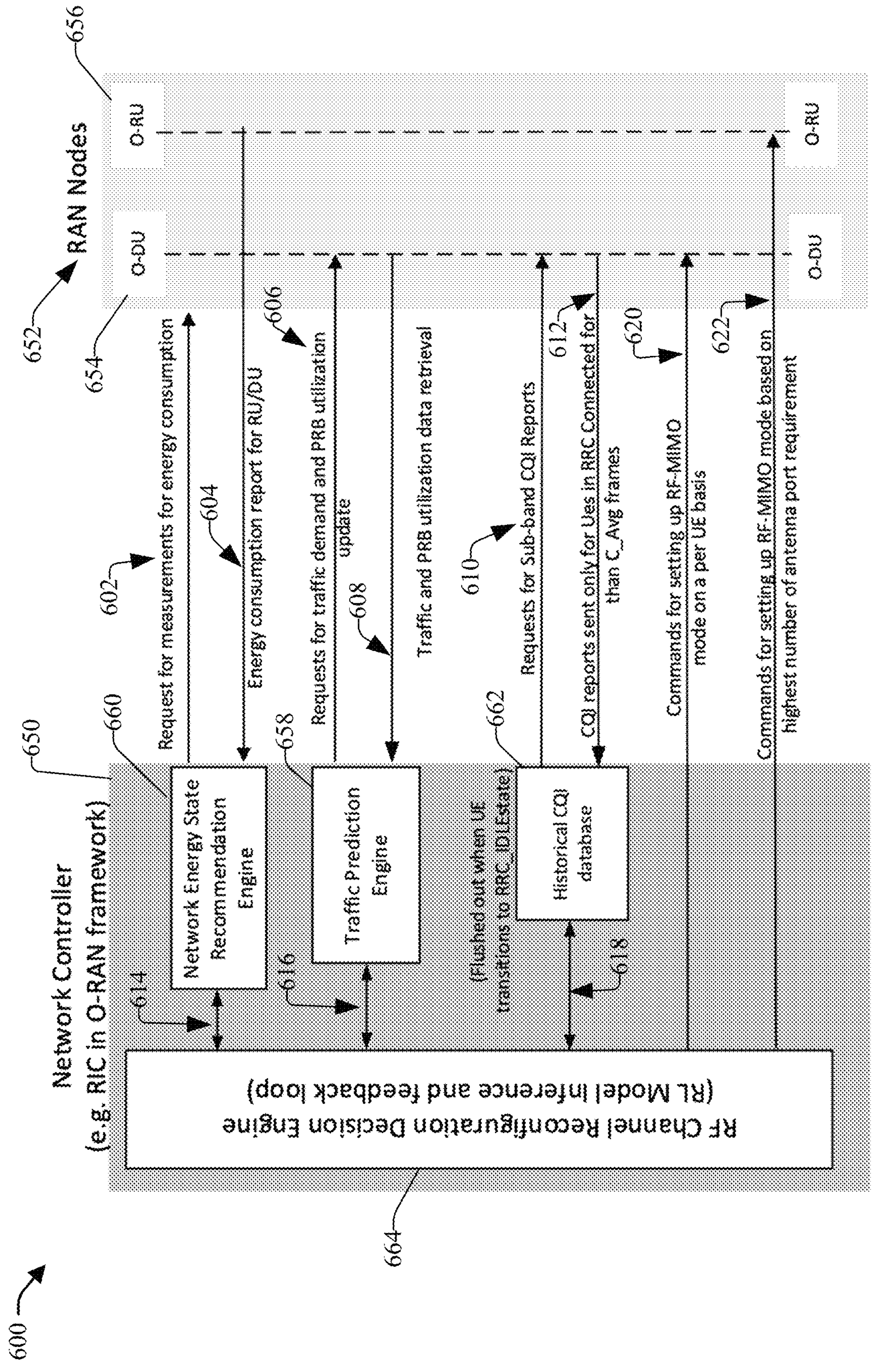
FIG. 6 illustrates a diagram of a non-limiting example message flow that can facilitate desirable management of RF channel configuration for a base station with regard to communication sessions associated with devices to achieve desirable communication performance and network energy savings, in an O-RAN framework, in accordance with various aspects and embodiments of the disclosed subject matter.

Turning to FIG. 6 (along with FIGS. 1-4), FIG. 6 illustrates a diagram of a non-limiting example message flow 600 that can facilitate desirable (e.g., suitable, reliable, efficient, enhanced, and/or optimal) management of RF channel configuration for a base station with regard to communication sessions associated with devices to achieve desirable communication performance and network energy savings, in an O-RAN framework, in accordance with various aspects and embodiments of the disclosed subject matter. The example message flow 600 can involve, for example, a network controller 650 (e.g., the RIC 304 of FIG. 3) and the RAN, including RAN nodes 652, such as the O-DU 654 and O-RU 656. The network controller 650 can comprise or be associated with the traffic prediction engine 658, the NES recommendation engine 660, a historical CQI database 662, and an RF channel reconfiguration decision engine 664 (e.g., RL-based decision engine) that can be associated with the traffic prediction engine 658, the NES recommendation engine 660, and the historical CQI database 662.

In order to go from a state that is determined to be less energy efficient and therefore achieve greater network energy savings for the communication network, a series of messages can be exchanged between various layers of the protocol stack (e.g., by the network controller 650 and the RAN nodes 652, such as the O-DU 654 and O-RU 656) to ensure a desirable (e.g., smooth, efficient, suitable, or optimal) transition to a policy (and associated RF channel configuration mode) determined to be an energy efficient state for the communication network. As depicted in FIG. 6, the message flow 600 can provide a sequential process for state transition that can proceed as follows.

As indicated at reference numeral 602 of the message flow 600, the network controller 650 (e.g., the NES recommendation engine 660 of the network controller 650) can communicate, to the RAN nodes 652, a request message to request measurement information, including measurement information relating to energy consumption, from the RAN nodes 652. As indicated at reference numeral 604 of the message flow 600, the RU 656 (and/or the DU 654) can provide (e.g., communicate) an energy consumption report for the RU 656 and/or DU 654 to the NES recommendation engine 660, wherein the energy consumption report can comprise the requested measurement information relating to or indicating energy consumption of the communication network (e.g., the RAN nodes of the communication network).

As indicated at reference numeral 606 of the message flow 600, the network controller 650 (e.g., the traffic prediction engine 658 of the network controller 650) can communicate a request message to the DU 654 to request update information relating to data traffic demand and PRB utilization associated with the RAN nodes 652 and associated devices. As indicated at reference numeral 608 of the message flow 600, the DU 654 can communicate a response message, comprising data traffic update information, to the traffic prediction engine 658, wherein the data traffic update information can relate to or indicate the data traffic demand and PRB utilization associated with the RAN nodes 652 and associated devices. For instance, the network controller 650 can poll the RAN nodes 652 to request measurement information and other control data, comprising, for example, energy consumption information from RU 656 and/or DU 654, and data traffic updates (e.g., on a periodic basis) to update the local databases of the network controller 650.

As indicated at reference numeral 610 of the message flow 600, the network controller 650 (e.g., the historical CQI database 662 of the network controller 650) can communicate a request message to the DU 654, wherein the request message can request sub-band CQI reports from the DU 654. As indicated at reference numeral 612 of the message flow 600, the DU 654 can communicate, to the historical CQI database 662, a response message comprising the requested sub-band CQI reports. In some embodiments, the DU 654 can send only the CQI reports for UEs in RRC connected for more than C average (C_Avg) frames.

In some embodiments, the NES recommendation engine 660 analyze and process the measurement information, including the measurement information relating to energy consumption associated with the communication network (e.g., the RAN nodes), for example, to facilitate making power measurement determinations, power consumption determinations, and RF channel configuration mode recommendations, such as described herein. As indicated at reference numeral 614 of the message flow 600, the NES recommendation engine 660 can communicate information relating to power measurement determinations, power consumption determinations, RF channel configuration mode recommendations, and/or other analysis results or determinations, and/or the measurement information (e.g., the raw measurement information), to the RF channel reconfiguration decision engine 664 for further processing and/or analysis.

In certain embodiments, the traffic prediction engine 658 can analyze and process the data traffic update information relating to or indicating the data traffic demand and PRB utilization associated with the RAN nodes 652 and associated devices. The traffic prediction engine 658 can perform such analysis and processing, for example, to determine or predict data traffic demand with regard to a communication session between the base station and the device for a defined time period, and/or to make other desired determinations or predictions based on the data traffic update information, such as described herein. As indicated at reference numeral 616 of the message flow 600, the traffic prediction engine 658 can communicate information relating to the determined or predicted data traffic demand associated with the device and/or the other determinations or predictions, and/or the data traffic update information (e.g., the raw data traffic update information), to the RF channel reconfiguration decision engine 664 for further processing and/or analysis.

In some embodiments, the historical CQI database 662 can analyze or process the requested or received sub-band CQI reports. For instance, the historical CQI database 662 can update or populate the historical CQI database 662 based at least in part on the information contained in the requested or received sub-band CQI reports. As indicated at reference numeral 616 of the message flow 600, the historical CQI database 662 can communicate information relating to the updating or populating of the historical CQI database 662, and/or the requested or received sub-band CQI reports (e.g., in raw form), to the RF channel reconfiguration decision engine 664 for further processing and/or analysis.

The RF channel reconfiguration decision engine 664 can analyze and process the respective information received from the traffic prediction engine 658, the NES recommendation engine 660, and the historical CQI database 662, and/or other information (such as described herein). Based at least in part on the results of such analysis and processing, the RF channel reconfiguration decision engine 664 can determine, on a per device (e.g., UE) basis, one or more desired respective RF channel configuration modes that can be utilized by the base station(s) with regard to one or more respective communication sessions between the base station (s) and one or more respective devices, such as described herein. For instance, the RF channel reconfiguration decision engine 664 can perform an exploration process to determine the one or more desired respective RF channel configuration modes that can be utilized by the base station (s). In some embodiments, the RF channel reconfiguration decision engine 664 can generate (e.g., create, build, or construct) a replay buffer in an ongoing manner to facilitate evaluating respective modes of the group of RF channel configuration modes and determining the one or more desired respective RF channel configuration modes that can be utilized by the base station(s). The RF channel reconfiguration decision engine 664 can communicate commands, in accordance with the desired or recommended policy (e.g., the selection of one or more desired respective RF channel configuration modes), to the RAN nodes 652 for actuation by the RAN nodes 652.

For instance, as indicated at reference numeral 620 of the message flow 600, the RF channel reconfiguration decision engine 664 can communicate, to the DU 654, information, comprising commands, to set up the one or more desired respective RF channel configuration modes on the base station(s), on a per device basis. Based at least in part on such commands, the DU 654 can set up the DU 654, and/or associated components or functions, so that the DU 654, and/or associated components or functions, can operate in accordance with the one or more desired respective RF channel configuration modes on the base station with regard to the one or more respective devices.

As indicated at reference numeral 622 of the message flow 600, the RF channel reconfiguration decision engine 664 can communicate, to the RU 656, information, comprising commands, to set up the one or more desired respective RF channel configuration modes on the base station(s), for example, based at least in part on a highest number of antenna ports to be utilized by (e.g., to be wanted or required at) the base station with regard to the one or more communication sessions associated with the one or more respective devices. Based at least in part on such commands, the RU 656 can set up the RU 656, and/or associated components or functions, so that the RU 656, and/or associated components or functions, can operate in accordance with the one or more desired respective RF channel configuration modes on the base station with regard to the one or more respective devices. The configuration of the base station (e.g. the RU 656 and/or associated functions and components) can be based at least in part on the highest number of antenna ports to be utilized by (e.g., to be wanted or required at) the base station with regard to the one or more communication sessions associated with the one or more respective devices because such highest number of antenna ports are to be utilized by the base station with regard to at least one of the one or more desired respective RF channel configuration modes. That is, while the respective RF channel configuration modes for the respective devices can be determined and selected by the RF channel reconfiguration decision engine 664 on a per device basis, the number of antenna ports of the base station that have to be active can be determined by the highest MIMO configuration in that TTI under consideration.

Figure 7:
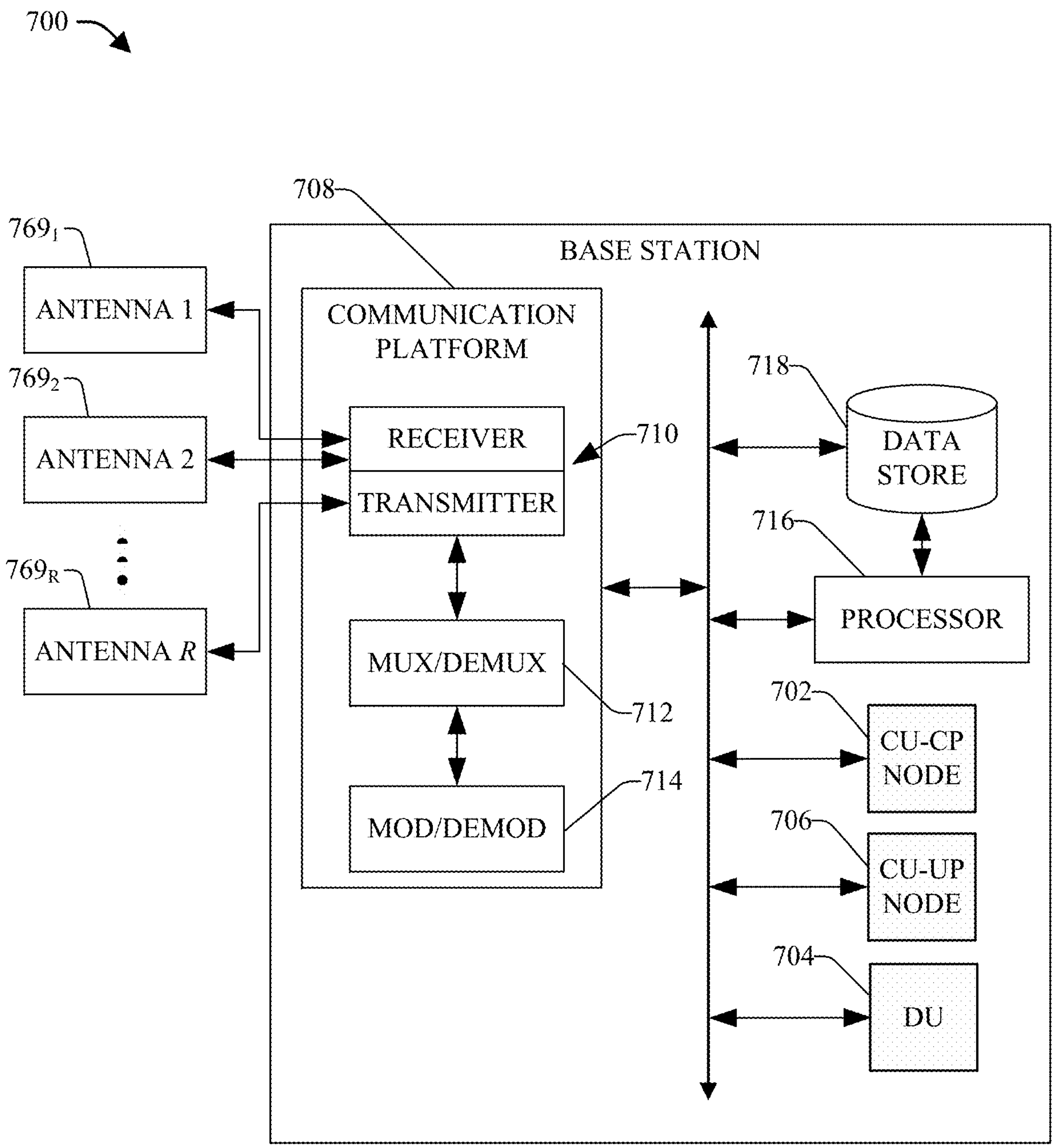
FIG. 7 depicts a diagram of a non-limiting example base station that can desirably facilitate connections and communication of information associated with devices, in accordance with various aspects and embodiments of the disclosed subject matter.

Turning to FIG. 7, FIG. 7 depicts a diagram of a non-limiting example base station 700 that can desirably facilitate (e.g., enable) connections (e.g., wireless connections) and communication of information associated with devices, in accordance with various aspects and embodiments of the disclosed subject matter. In some embodiments, the base station 700 can be a 5G or other NR base station (e.g., gNB or other NR-type or xG base station, wherein x can be a number greater than 5). In other embodiments, the base station 700 can be a 4G or LTE base station, or some other type of base station.

With regard to a 5G or other NR base station, the base station 700 can comprise a CU-CP node 702 (e.g., a gNB or other NR NB CU-CP node), one or more DUs (e.g., a gNB or other NR NB DUs), including DU 704, a desired number of CU-UP nodes (e.g., a gNB or other NR NB CU-UP nodes), including CU-UP node 706, and/or other network equipment. The CU-CP node 702 can be associated or interfaced with the DUs (e.g., DU 704) via an interface (e.g., F1-C interface) or connection. The CU-CP node 702 can be associated or interfaced with the CU-UP nodes (e.g., CU-UP node 706) via an interface (e.g., E1 interface) or connection. The one or more CU-UP nodes (e.g., CU-UP node 706) can be associated or interfaced with the one or more DUs (e.g., DU 704) via an interface (e.g., F1-U interface) or connection.

A DU (e.g., DU 704) can provide support for lower layers of a protocol stack. For instance, a DU (e.g., DU 704) can be a logical node that can host or handle baseband (e.g., PHY) and L2 (e.g., MAC and RLC layer) functionality associated with the base station 700. A CU-UP node (e.g., CU-UP node 706) can be a logical node that can host or handle data traffic between the core network 104 (e.g., 5G or other NR or xG core network) and the DU(s) (e.g., DU 704) to which the particular CU-UP is connected. The CU-CP node 702 can be a logical node that can host or handle L3 (e.g., RRC and packet data convergence protocol (PDCP) layer) control plane functionality associated with the base station 700.

In some embodiments, a device(s) (e.g., device(s) 110 and/or 112) can be connected to the base station 700, via the DU 704, wherein the CU-UP node 706 and the DU 704 can be serving the device by performing or facilitating performing downlink data transfers of downlink data to the device from a data source (e.g., a service and/or another device, or a network component of the communication network 102 or core network 104 (e.g., via the UPF node)), and uplink data transfers of uplink data from the device to a desired destination (e.g., the data source) via the base station 700.

The base station 700 can receive and transmit signal(s) from and to wireless devices like access points (e.g., base stations, femtocells, picocells, or other type of access point), access terminals (e.g., UEs), wireless ports and routers, and the like, through a set of antennas 7691-769R. In an aspect, the antennas 7691-769R can be a part of a communication platform 708, which comprises electronic components and associated circuitry that can provide for processing and manipulation of received signal(s) and signal(s) to be transmitted. In an aspect, the communication platform 708 can include a receiver/transmitter 710 that can convert signal from analog to digital upon reception, and from digital to analog upon transmission. In addition, receiver/transmitter 710 can divide a single data stream into multiple, parallel data streams, or perform the reciprocal operation. In accordance with various embodiments, the communication platform 708 can be, can comprise, or can be associated with an RU (e.g., a gNB or other NR NB RU node).

In an aspect, coupled to receiver/transmitter 710 can be a multiplexer/demultiplexer (mux/demux) 712 that can facilitate manipulation of signal in time and frequency space. The mux/demux 712 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 712 can scramble and spread information (e.g., codes) according to substantially any code known in the art, e.g., Hadamard-Walsh codes, Baker codes, Kasami codes, polyphase codes, and so on. A modulator/demodulator (mod/demod) 714 also can be part of the communication platform 708, and can modulate information according to multiple modulation techniques, such as frequency modulation, amplitude modulation (e.g., M-ary quadrature amplitude modulation (QAM), with M a positive integer), phase-shift keying (PSK), and the like.

The base station 700 also can comprise a processor(s) 716 that can be configured to confer and/or facilitate providing functionality, at least partially, to substantially any electronic component in or associated with the base station 700. For instance, the processor(s) 716 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, and/or other operations on data.

In another aspect, the base station 700 can include a data store 718 that can store data structures; code instructions; rate coding information; information relating to measurement of radio link quality or reception of information related thereto; information relating to devices, communication conditions or performance indicators associated with devices (e.g., SINR, RSRP, RSRQ, CQI, and/or other wireless communications metrics or parameters) associated with devices; information relating to users, applications, services, data traffic, files, services, applications, communication networks, RANs, cells, resources, communication sessions, performance indicators, RF channel configuration modes, link adaptation, power consumption associated with modes, measurement reports, threshold (e.g., maximum, minimum, or other threshold) values, PDU sets, grants (e.g., downlink or uplink periodic grants or configured grants), DCI, congestion information or indicators, data processing operations, messages, notifications, alarms, alerts, preferences (e.g., user or client preferences), hash values, metadata, parameters, traffic flows, policies, the defined performance criteria, the defined configuration management criteria, algorithms (e.g., hash algorithms, data compression algorithms, data decompression algorithms, and/or other algorithm), interfaces, protocols, tools, and/or other information; white list information, information relating to managing or maintaining the white list; system or device information like policies and specifications; code sequences for scrambling; spreading and pilot transmission; floor plan configuration; base station deployment and frequency plans; scheduling policies; and so on. The processor(s) 716 can employ one or more processors (e.g., one or more CPUs), microprocessors, or controllers) that can process information, and can be coupled to the data store 718 in order to store and retrieve at least some of the information (e.g., information, such as algorithms, relating to multiplexing/demultiplexing or modulation/demodulation; information relating to radio link levels; information relating to devices, users, applications, services, data traffic, files, services, applications, communication networks, RANs, cells, resources, communication sessions, performance indicators, RF channel configuration modes, link adaptation, power consumption associated with modes, measurement reports, threshold values, PDU sets, grants, DCI, congestion information or indicators, data processing operations, messages, notifications, alarms, alerts, preferences, hash values, metadata, parameters, traffic flows, policies, the defined performance criteria, the defined configuration management criteria, algorithms, interfaces, protocols, tools, and/or other information) desired to operate and/or confer functionality to the communication platform 708 and/or other operational components of the base station 700.

The data store 718 can comprise volatile memory and/or nonvolatile memory. By way of example and not limitation, nonvolatile memory can include ROM, PROM, EPROM, EEPROM, flash memory, NVMe, NVMe-oF, PMEM, or PMEM-oF. Volatile memory can include RAM, which can act as external cache memory. By way of example and not limitation, RAM can be available in many forms such as SRAM, DRAM, SDRAM, DDR SDRAM, ESDRAM, SLDRAM, and DRRAM. Memory of the disclosed aspects are intended to comprise, without being limited to, these and other suitable types of memory.

Figure 8:
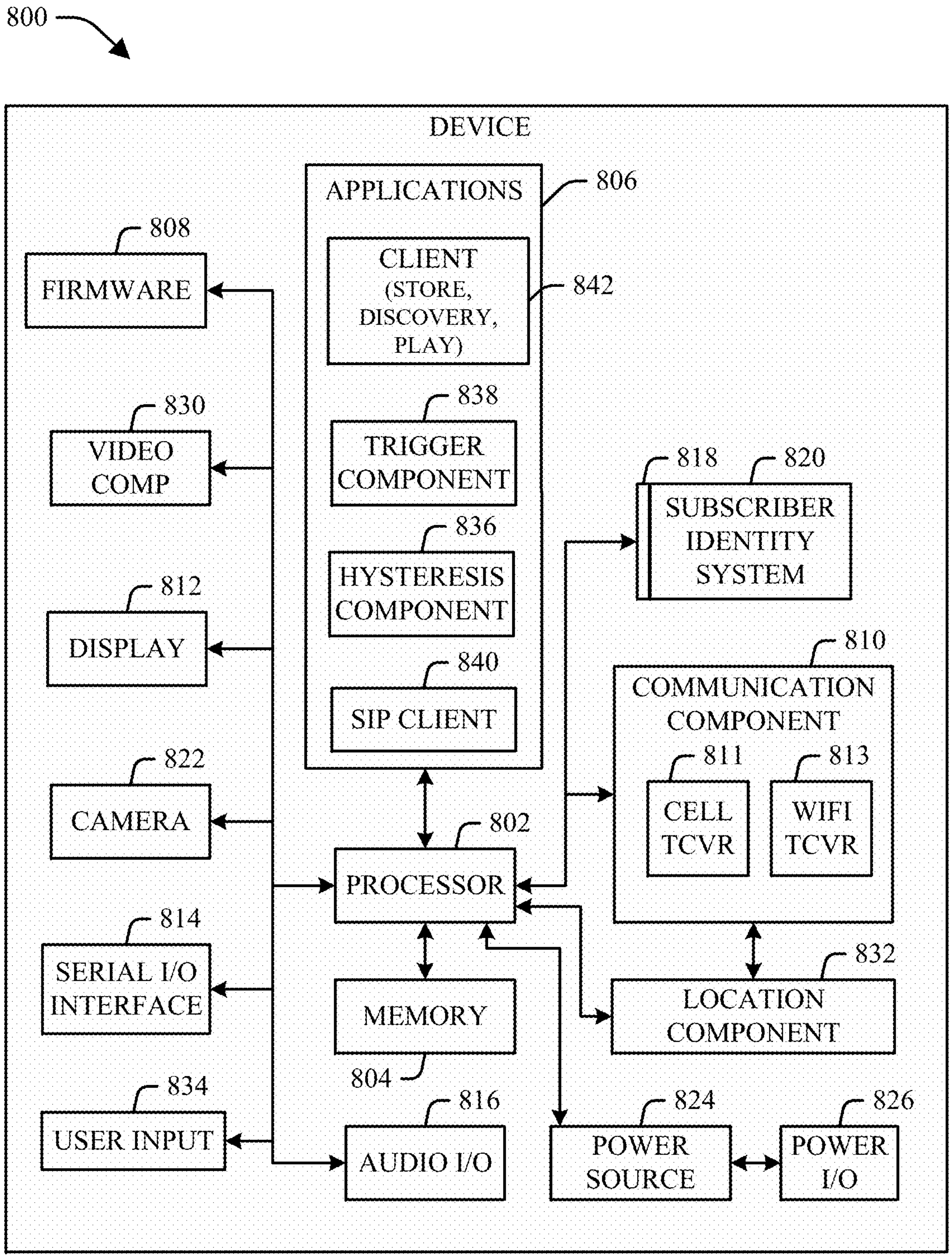
FIG. 8 illustrates a diagram of a non-limiting example device that can be operable to engage in a system architecture that facilitates wireless communications according to one or more embodiments described herein, in accordance with various aspects and embodiments of the disclosed subject matter.

Referring to FIG. 8, FIG. 8 illustrates a diagram of a non-limiting example device 800 (e.g., wireless or mobile phone, electronic pad or tablet, electronic eyewear, electronic watch, other electronic bodywear, IoT device, or other type of communication device or UE) that can be operable to engage in a system architecture that facilitates wireless communications according to one or more embodiments described herein, in accordance with various aspects and embodiments of the disclosed subject matter. Although a device is illustrated herein, it will be understood that other devices can be a communication device, and that the device 800 is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device, such as the device 800, can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of the any of the above should also be included within the scope of computer-readable media.

The device 800 can include a processor(s) 802 for controlling and processing all onboard operations and functions. The processor(s) 802 can comprise one or more processors (e.g., one or more central processing units (CPUs)), microprocessors, or controllers) that can process information associated with the device 800. A memory 804 can interface to the processor(s) 802 for storage of data and one or more applications 806 (e.g., a video player software, user feedback component software, etc.). Other applications can include voice recognition of predetermined voice commands that facilitate initiation of the user feedback signals. The applications 806 can be stored in the memory 804 and/or in a firmware 808, and executed by the processor(s) 802 from either or both the memory 804 or/and the firmware 808. The firmware 808 can also store startup code for execution in initializing the device 800. A communication component 810 interfaces to the processor(s) 802 to facilitate wired/wireless communication with external systems, e.g., cellular networks, VoIP networks, and so on. Here, the communication component 810 can also include a suitable cellular transceiver 811 (e.g., a global system for mobile communication (GSM), orthogonal frequency division multiple access (OFDMA), 4G, LTE, 5G, other NR, or other type of transceiver) and/or an unlicensed transceiver 813 (e.g., Wi-Fi, WiMax) for corresponding signal communications. The device 800 can be a device such as a cellular telephone, a PDA with mobile communications capabilities, and messaging-centric devices. The communication component 810 also facilitates communications reception from terrestrial radio networks (e.g., broadcast), digital satellite radio networks, and Internet-based radio services networks.

The device 800 includes a display 812 for displaying text, images, video, telephony functions (e.g., a Caller ID function), setup functions, and for user input. For example, the display 812 can also be referred to as a "screen" that can accommodate the presentation of multimedia content (e.g., music metadata, messages, wallpaper, graphics, etc.). The display 812 can also display videos and can facilitate the generation, editing and sharing of video quotes. A serial I/O interface 814 is provided in communication with the processor(s) 802 to facilitate wired and/or wireless serial communications (e.g., USB, and/or IEEE 1394) through a hardwire connection, and other serial input devices (e.g., a keyboard, keypad, and mouse). This supports updating and troubleshooting the device 800, for example. Audio capabilities are provided with an audio I/O component 816, which can include a speaker for the output of audio signals related to, for example, indication that the user pressed the proper key or key combination to initiate the user feedback signal. The audio I/O component 816 also facilitates the input of audio signals through a microphone to record data and/or telephony voice data, and for inputting voice signals for telephone conversations.

The device 800 can include a slot interface 818 for accommodating a SIC (Subscriber Identity Component) in the form factor of a card Subscriber Identity Module (SIM) or universal SIM 820, and interfacing the SIM card 820 with the processor(s) 802. However, it is to be appreciated that the SIM card 820 can be manufactured into the device 800, and updated by downloading data and software.

The device 800 can process IP data traffic through the communication component 810 to accommodate IP traffic from an IP network such as, for example, the Internet, a corporate intranet, a home network, a person area network, etc., through an ISP or broadband cable provider. Thus, VoIP traffic can be utilized by the device 800 and IP-based multimedia content can be received in either an encoded or a decoded format.

A video processing component 822 (e.g., a camera) can be provided for decoding encoded multimedia content. The video processing component 822 can aid in facilitating the generation, editing, and sharing of video quotes. The device 800 also includes a power source 824 in the form of batteries and/or an AC power subsystem, which power source 824 can interface to an external power system or charging equipment (not shown) by a power I/O component 826.

The device 800 can also include a video component 830 for processing video content received and, for recording and transmitting video content. For example, the video component 830 can facilitate the generation, editing and sharing of video quotes. A location tracking component 832 facilitates geographically locating the device 800. As described hereinabove, this can occur when the user initiates the feedback signal automatically or manually. A user input component 834 facilitates the user initiating the quality feedback signal. The user input component 834 can also facilitate the generation, editing and sharing of video quotes. The user input component 834 can include such conventional input device technologies such as a keypad, keyboard, mouse, stylus pen, and/or touch screen, for example.

Referring again to the applications 806, a hysteresis component 836 facilitates the analysis and processing of hysteresis data, which is utilized to determine when to associate with the access point. A software trigger component 838 can be provided that facilitates triggering of the hysteresis component 836 when the Wi-Fi transceiver 813 detects the beacon of the access point. A SIP client 840 enables the device 800 to support SIP protocols and register the subscriber with the SIP registrar server. The applications 806 can also include a client 842 that provides at least the capability of discovery, play and store of multimedia content, for example, music.

The device 800, as indicated above related to the communication component 810, includes an indoor network radio transceiver 813 (e.g., Wi-Fi transceiver). This function supports the indoor radio link, such as IEEE 802.11, for the dual-mode GSM device (e.g., device 800). The device 800 can accommodate at least satellite radio services through a device (e.g., handset device) that can combine wireless voice and digital radio chipsets into a single device (e.g., single handheld device).

It is to be appreciated and understood that one or more components (e.g., the devices, configuration manager component, base station, core network, or other component) of the systems (e.g., system 100, system 200, system 300, system 400, or other system) or methods described herein can comprise or be associated with various other types of components, such as display screens (e.g., touch screen displays or non-touch screen displays), audio functions (e.g., amplifiers, speakers, or audio interfaces), or other interfaces, to facilitate presentation of information to users, entities, or other components (e.g., other devices or other servers), and/or to perform other desired functions or operations.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 9-12. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 9:
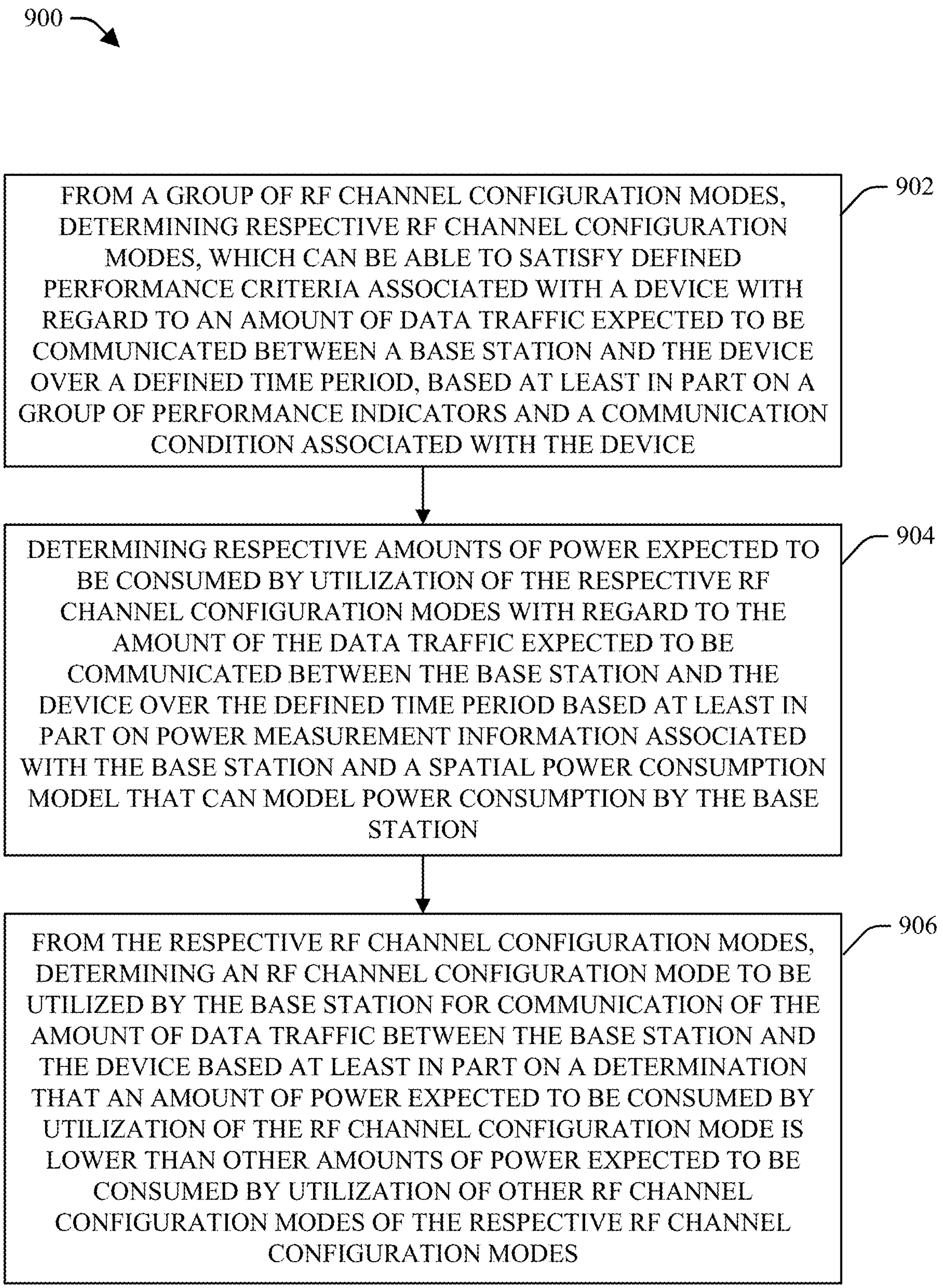
FIG. 9 illustrates a flow chart of an example method that can desirably manage RF channel configuration for a base station with regard to a communication session associated with a device to achieve desirable communication performance and network energy savings, in accordance with various aspects and embodiments of the disclosed subject matter.

FIG. 9 illustrates a flow chart of an example method 900 that can desirably (e.g., automatically, dynamically, suitably, reliably, efficiently, enhancedly, and/or optimally) manage RF channel configuration for a base station with regard to a communication session associated with a device to achieve desirable communication performance and network energy savings, in accordance with various aspects and embodiments of the disclosed subject matter. The method 900 can be employed by, for example, a system comprising the configuration component, the NES state recommendation component, and the traffic predictor component that respectively can comprise or be associated with the processor component, the data store, and/or other components.

At 902, from a group of RF channel configuration modes, respective RF channel configuration modes, which can be able to satisfy defined performance criteria associated with a device with regard to an amount of data traffic expected to be communicated between a base station and the device over a defined time period, can be determined based at least in part on a group of performance indicators and a communication condition associated with the device. The traffic prediction component can predict the amount of data traffic to be communicated between the base station and the device over the defined time period, based at least in part on the results of an analysis (e.g., an ML-based analysis) of traffic information relating to previous communication of data traffic between the base station and devices, which can comprise the device. The configuration component can determine, from the group of RF channel configuration modes, the respective RF channel configuration modes, which can be able to satisfy the defined performance criteria associated with the device with regard to the amount of data traffic expected (e.g., predicted) to be communicated between the base station and the device over the defined time period, based at least in part on the group of performance indicators (e.g., KPIs) and the communication condition(s) associated with the device.

For example, the defined performance criteria can relate to a minimum threshold throughput level, and the configuration component can analyze the group of performance indicators and the communication condition(s) associated with the device. In some embodiments, the configuration component can analyze the group of performance indicators and the communication condition(s) associated with the device in relation to the respective performance (e.g., throughput level, amount of latency, or other type of performance) that can be predicted (e.g., by the configuration component or other component) to be achieved if respective RF channel configuration modes of the group of RF channel configuration modes are employed by the base station. From the group of RF channel configuration modes, the configuration component can determine the respective RF channel configuration modes (e.g., a subgroup of candidate RF channel configuration modes) that can be able to satisfy the defined performance criteria (e.g., the minimum threshold throughput level and/or other criteria, such as a maximum threshold amount of latency).

At 904, respective amounts of power expected to be consumed by utilization of the respective RF channel configuration modes with regard to the amount of the data traffic expected to be communicated between the base station and the device over the defined time period can be determined based at least in part on power measurement information associated with the base station and a spatial power consumption model that can model power consumption by the base station. The NES state recommendation component can determine (e.g., calculate) the respective amounts of power expected (e.g., predicted) to be consumed by utilization of the respective RF channel configuration modes with regard to the amount of the data traffic expected to be communicated between the base station and the device over the defined time period, based at least in part on the results of analyzing the power measurement information associated with the base station and the spatial power consumption model, such as described herein.

At 906, from the respective RF channel configuration modes, a RF channel configuration mode to be utilized by the base station for communication of the amount of data traffic between the base station and the device can be determined based at least in part on a determination that an amount of power expected to be consumed by utilization of the RF channel configuration mode is lower than other amounts of power expected to be consumed by utilization of other RF channel configuration modes of the respective RF channel configuration modes. In certain embodiments, based at least in part on the results of the analyzing of the power measurement information and the spatial power consumption model, the NES state recommendation component can determine the RF channel configuration mode of the respective RF channel configuration modes that can be expected (e.g., predicted) to consume a lower (e.g., lowest) amount of power than other RF channel configuration modes of the respective RF channel configuration modes with regard to communication of the amount of the data traffic between the base station and the device over the defined time period. Based at least in part on determining that the RF channel configuration mode can be expected to consume the lower amount of power, the NES state recommendation component can communicate a recommendation message to the configuration component, wherein the recommendation message can recommend that the RF channel configuration mode be utilized by the base station for the communication of the amount of the data traffic between the base station and the device over the defined time period.

In some embodiments, from the respective RF channel configuration modes, the configuration component can determine the RF channel configuration mode to be utilized by the base station for communication of the data traffic between the base station and the device based at least in part on the determination that the amount of power expected to be consumed by utilization of the RF channel configuration mode is lower than the other amounts of power expected to be consumed by utilization of the other RF channel configuration modes of the respective RF channel configuration modes. For example, based at least in part on determining that the RF channel configuration mode is a candidate mode that can satisfy the defined performance criteria, and based at least in part on the determination that the amount of power expected to be consumed by utilization of the RF channel configuration mode is lower than the other amounts of power expected to be consumed by utilization of the other RF channel configuration modes (e.g., as indicated by the recommendation in the recommendation message), the configuration component can determine that the RF channel configuration mode is to be utilized by the base station for communication of the data traffic between the base station and the device over the defined time period. The configuration component can initiate setting (e.g., configuring) or adjusting the mode (e.g., setting or adjusting one or more parameters relating to setting, adjusting, or selecting the desired RF channel configuration mode) to facilitate implementing the RF channel configuration mode by or at the base station.

Figure 10:
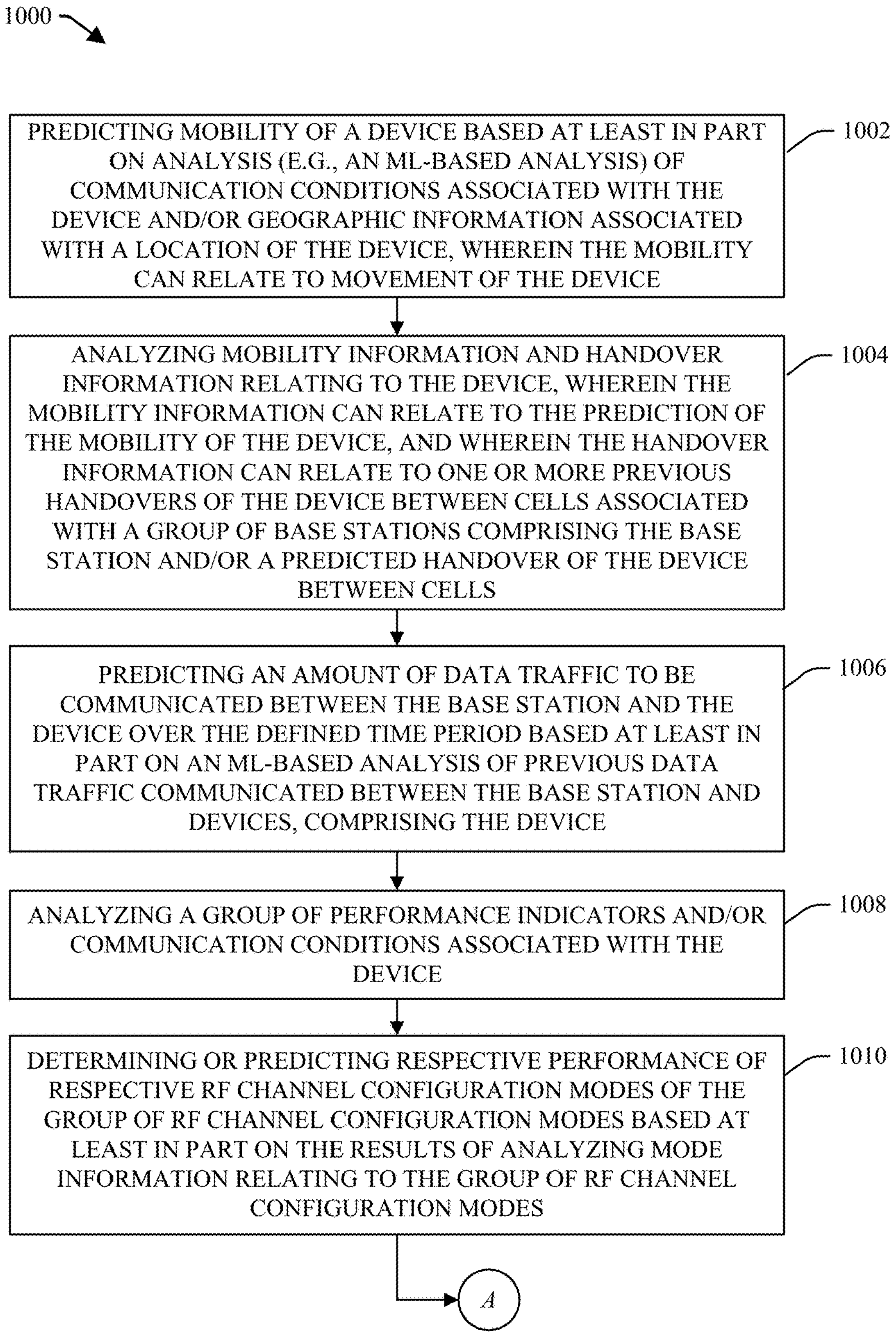
FIGS. 10 and 11 depict a flow chart of an example method that can employ mobility prediction and handover information associated with a device to facilitate desirably managing RF channel configuration for a base station with regard to a communication session associated with a device to achieve desirable communication performance and network energy savings, in accordance with various aspects and embodiments of the disclosed subject matter.
Figure 11:
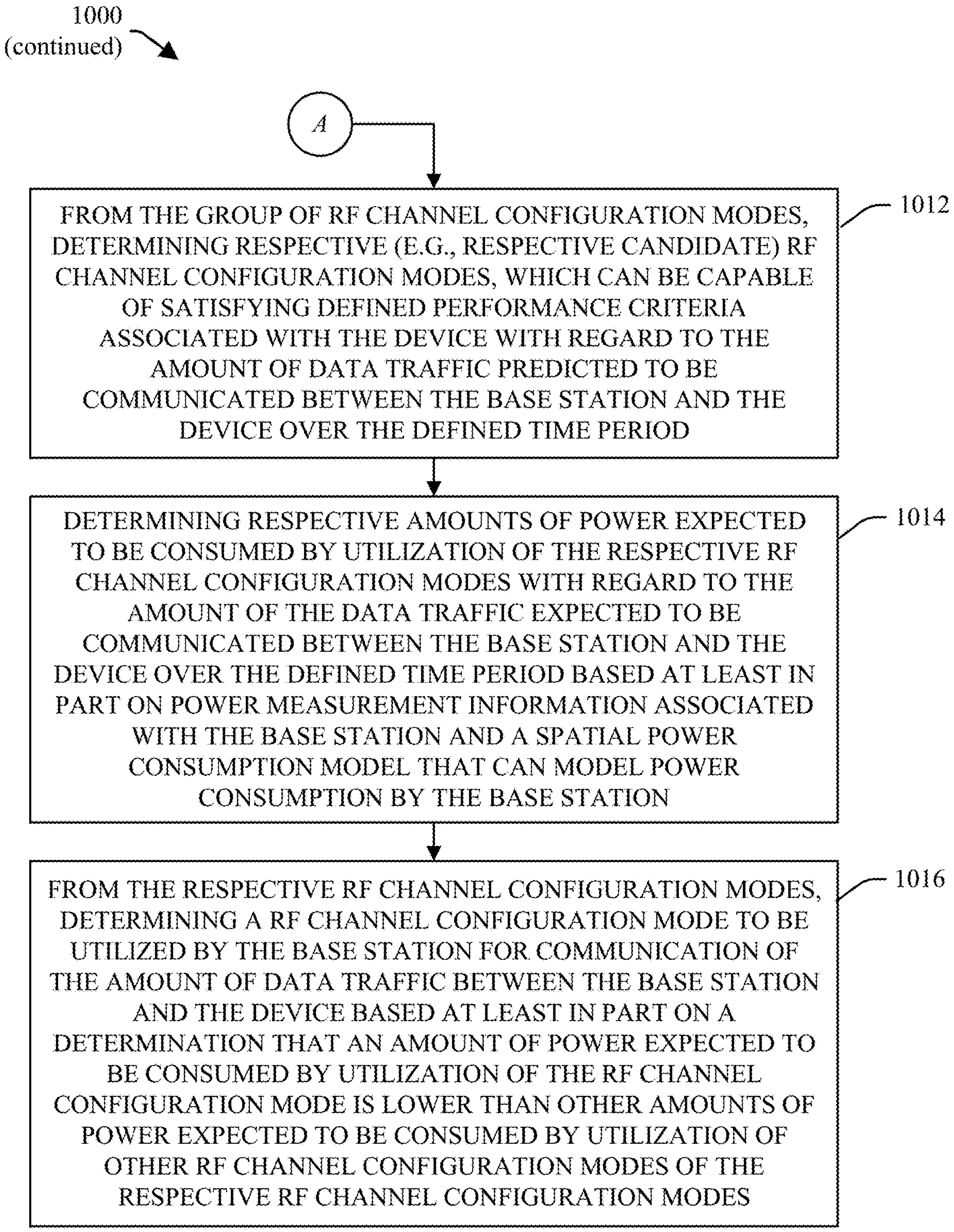

FIGS. 10 and 11 depict a flow chart of an example method 1000 that can employ mobility prediction and handover information associated with a device to facilitate desirably managing RF channel configuration for a base station with regard to a communication session associated with a device to achieve desirable communication performance and network energy savings, in accordance with various aspects and embodiments of the disclosed subject matter. The method 1000 can be employed by, for example, a system comprising the configuration component, the NES state recommendation component, the traffic predictor component, the mobility predictor component, and/or the handover component that respectively can comprise or be associated with the processor component, the data store, and/or other components.

At 1002, mobility of a device can be predicted based at least in part on analysis (e.g., an ML-based analysis) of communication conditions associated with the device and/or geographic information associated with a location of the device, wherein the mobility can relate to movement of the device. The mobility predictor component, employing a trained model, can perform the ML-based analysis on information relating to the communication conditions associated with the device and/or the geographic information associated with the location of the device. The geographic information can comprise travel, transportation, and/or road maps of the area associated with (e.g., comprising and surrounding) the location of the device, and can indicate potential routes of travel and/or future locations of the device. Based at least in part on the results of such ML-based analysis, the mobility predictor component can predict the mobility of the device during a defined time period where data traffic (e.g., an amount of data traffic) is predicted to be communicated between the base station and the device during a defined time period, such as described herein. The mobility of the device can relate to movement and/or change of location of the device during the defined time period. In some embodiments, based at least in part on the results of such ML-based analysis, the mobility predictor component also can predict (e.g., based at least in part on a probability determination) whether there will be a handover of the device from one cell associated with the base station to another cell associated with the base station or another base station, and/or can predict (e.g., based at least in part on another probability determination) whether there will be a call or service drop (e.g., call or service failure or interruption) during the defined time period.

At 1004, mobility information and handover information relating to the device can be analyzed, wherein the mobility information can relate to the prediction of the mobility of the device, and wherein the handover information can relate to one or more previous handovers of the device between cells associated with a group of base stations comprising the base station and/or a predicted handover of the device between cells. The configuration component can analyze the mobility information and the handover information. For instance, the configuration component can analyze the mobility information and the handover information to determine or predict whether the device is or will be moving away from the base station, is or will be stationary or substantially stationary with respect to the base station, or is or will be moving toward the base station.

At 1006, an amount of data traffic to be communicated between the base station and the device over the defined time period can be predicted based at least in part on an ML-based analysis of previous data traffic communicated between the base station and devices, comprising the device. For instance, the traffic predictor component, employing a trained decision tree regressor model and/or other trained ML model, can perform the ML-based analysis of the previous data traffic. Based at least in part on results of the ML-based analysis, the traffic predictor component can predict the amount of data traffic to be communicated between the base station and the device over the defined time period.

At 1008, a group of performance indicators and/or communication conditions associated with the device can be analyzed. For instance, the configuration component can analyze the group of performance indicators and/or the communication conditions associated with the device to facilitate determining, from a group of RF channel configuration modes, one or more potential (e.g., candidate) RF channel configuration modes that can be considered for utilization by the base station in connection with communication of the amount of data traffic between the base station and the device during the defined time period.

At 1010, respective performance of respective RF channel configuration modes of the group of RF channel configuration modes can be determined or predicted based at least in part on the results of analyzing mode information relating to the group of RF channel configuration modes. For instance, the configuration component can analyze the mode information, which can indicate how the base station can respectively perform or operate while in the respective RF channel configuration modes, for example, in connection with communication of data traffic between the base station and the device, wherein the device is associated with (e.g., is experiencing) the group of performance indicators and/or the communication conditions with respect to the base station. Based at least in part on the results of such analysis of the mode information, the configuration component can determine or predict the respective performance of the respective RF channel configuration modes. At this point, the method 1000 can proceed to reference point A, wherein the method 1000 can proceed from reference point A as depicted in FIG. 11 and described herein.

At 1012, from the group of RF channel configuration modes, respective (e.g., respective candidate) RF channel configuration modes, which can be capable of satisfying defined performance criteria associated with the device with regard to the amount of data traffic predicted to be communicated between the base station and the device over the defined time period, can be determined based at least in part on the results of analyzing the mobility information and the handover information, the results of analyzing the group of performance indicators and/or the communication conditions associated with the device, and/or the results of analyzing performance information relating to the determined or predicted respective performance of the respective RF channel configuration modes. For instance, the configuration component can analyze the results of analyzing the mobility information and the handover information, the results of analyzing the group of performance indicators and/or the communication conditions associated with the device, and/or the results of analyzing the performance information. Based at least in part on the results of such analyzing, the configuration component can determine, from the group of RF channel configuration modes, respective (e.g., a subgroup of respective candidate) RF channel configuration modes, which can be capable of satisfying (e.g., meeting or exceeding) the defined performance criteria associated with the device with regard to the amount of data traffic predicted to be communicated between the base station and the device over the defined time period. The defined performance criteria can relate to, for example, a minimum threshold throughput desired for communication of the data traffic, a maximum threshold latency that can be acceptable in connection with communication of the data traffic, and/or another threshold value relating to another performance indicator that can be desirable in connection with communication of the data traffic, in order to be in accordance with (e.g., to satisfy) the defined performance criteria.

At 1014, respective amounts of power expected to be consumed by utilization of the respective RF channel configuration modes with regard to the amount of the data traffic expected to be communicated between the base station and the device over the defined time period can be determined based at least in part on power measurement information associated with the base station and a spatial power consumption model that can model power consumption by the base station. The NES state recommendation component can determine (e.g., calculate) the respective amounts of power expected (e.g., predicted) to be consumed by utilization of the respective (e.g., respective candidate) RF channel configuration modes with regard to the amount of the data traffic expected to be communicated between the base station and the device over the defined time period, based at least in part on the results of analyzing the power measurement information associated with the base station and the spatial power consumption model, such as described herein.

At 1016, from the respective RF channel configuration modes, a RF channel configuration mode to be utilized by the base station for communication of the amount of data traffic between the base station and the device can be determined based at least in part on a determination that an amount of power expected to be consumed by utilization of the RF channel configuration mode is lower than other amounts of power expected to be consumed by utilization of other RF channel configuration modes of the respective RF channel configuration modes. In some embodiments, from the respective RF channel configuration modes, the configuration component can determine the RF channel configuration mode to be utilized by the base station for communication of the amount of data traffic between the base station and the device over the defined time period based at least in part on the determination that the amount of power expected (e.g., predicted) to be consumed by utilization of the RF channel configuration mode by the base station is lower than the other amounts of power expected to be consumed by utilization of the other RF channel configuration modes of the respective RF channel configuration modes by the base station, such as described. In certain embodiments, the NES state recommendation component can communicate a recommendation message to the configuration component, wherein the recommendation message can indicate that the RF channel configuration mode is predicted to consume a lower amount of power than the other respective RF channel configuration modes in connection with communication of the amount of data traffic, and/or can recommend that the RF channel configuration mode be utilized by the base station for the communication of the amount of the data traffic between the base station and the device over the defined time period.

Figure 12:
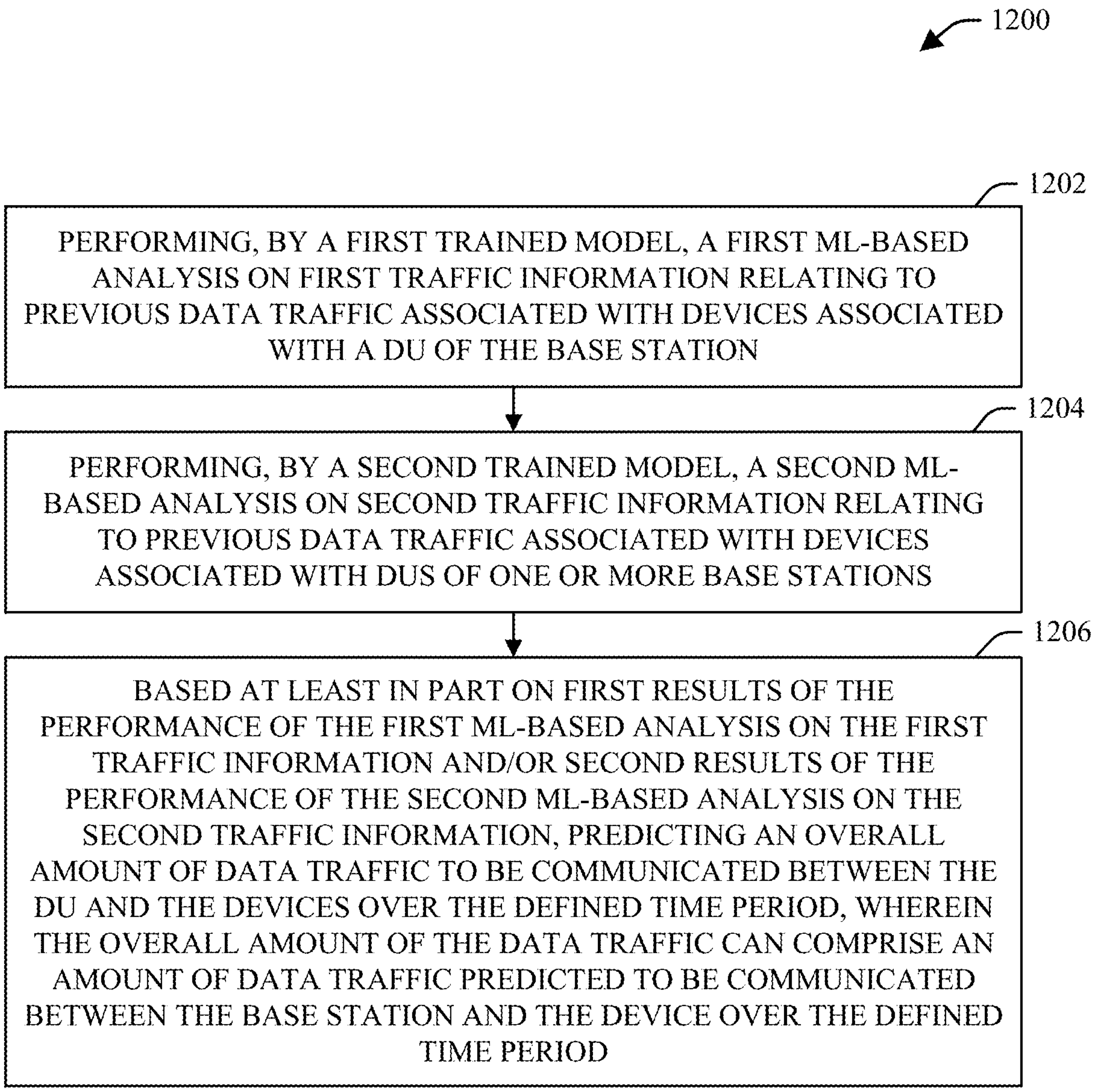
FIG. 12 illustrates a flow chart of an example method that can employ data traffic prediction associated with a device to facilitate desirably managing RF channel configuration for a base station with regard to a communication session associated with a device to achieve desirable communication performance and network energy savings, in accordance with various aspects and embodiments of the disclosed subject matter.

FIG. 12 illustrates a flow chart of an example method 1200 that can employ data traffic prediction associated with a device to facilitate desirably managing RF channel configuration for a base station with regard to a communication session associated with a device to achieve desirable communication performance and network energy savings, in accordance with various aspects and embodiments of the disclosed subject matter. The method 1200 can be employed by, for example, a system comprising the configuration component, the NES state recommendation component, and the traffic predictor component that respectively can comprise or be associated with the processor component, the data store, and/or other components.

At 1202, a first ML-based analysis can be performed, by a first trained model, on first traffic information relating to previous data traffic associated with devices associated with a DU of the base station. In some embodiments, the first trained model can be a trained decision tree regressor model or other type of trained model (e.g., such as described herein) that can provide relatively fast predictions of an amount(s) of data traffic that will be communicated between the base station (e.g., the DU of the base station) and the device(s) over a defined period(s) of time. The traffic predictor component can employ the first trained model to perform the first ML-based analysis on the first traffic information relating to the previous data traffic associated with the devices associated with the DU of the base station.

At 1204, a second ML-based analysis can be performed, by a second trained model, on second traffic information relating to previous data traffic associated with devices associated with DUs of one or more base stations. In certain embodiments, the second trained model can be a trained LSTM model or other type of trained model (e.g., such as described herein) that can provide desirable predictions of amounts of data traffic that will be communicated between the one or more base stations (e.g., the DUs of the one or more base stations) and the devices over a certain time period. For instance, the second trained model can provide cluster level statistics relating to communication of data traffic associated with the RAN, comprising the one or more base stations, that can further refine long-term data traffic trends in the wider area covered by the RAN (e.g., covered by RUs and DUs of the RAN). The traffic predictor component can employ the second trained model to perform the second ML-based analysis on the second traffic information relating to previous data traffic associated with the devices associated with the DUs of the one or more base stations.

At 1206, based at least in part on first results of the performance of the first ML-based analysis on the first traffic information and/or second results of the performance of the second ML-based analysis on the second traffic information, an overall amount of data traffic to be communicated between the DU and the devices over the defined time period can be predicted, wherein the overall amount of the data traffic can comprise an amount of data traffic predicted to be communicated between the base station and the device over the defined time period. In some instances, it can be desirable for the traffic predictor component to make a prediction of an amount of data traffic that is to be communicated between the base station and the device over the defined time period. In such instances, based at least in part on the first results of the performance of the first ML-based analysis on the first traffic information and/or the second results of the performance of the second ML-based analysis on the second traffic information, the traffic predictor component can predict the amount of data traffic that is to be communicated between the base station and the device over the defined time period. In certain embodiments, in connection with such prediction of the amount of data traffic, the traffic predictor component can predict the overall amount of data traffic that is to be communicated between the DU and the devices, comprising the device, over the defined time period.

In accordance with various embodiments, the traffic predictor component can utilize the second results of the performance of the second ML-based analysis on the second traffic information to inform and/or facilitate the first ML-based analysis on the first traffic information and the first results thereof, and/or the traffic predictor component can communicate the second results along with the first results to the configuration component for evaluation, further analysis, and/or use in determining a desirable RF channel configuration mode that can be utilized by the base station in connection with the communication of the amount of data traffic between the base station and the device. The desirable RF channel configuration mode can be a mode that can satisfy the defined performance criteria in connection with the communication of the amount of data traffic between the base station and the device, while also providing desirable (e.g., maximum, suitable, enhanced, or optimal) power savings for the RAN, such as described herein.

Figure 13:
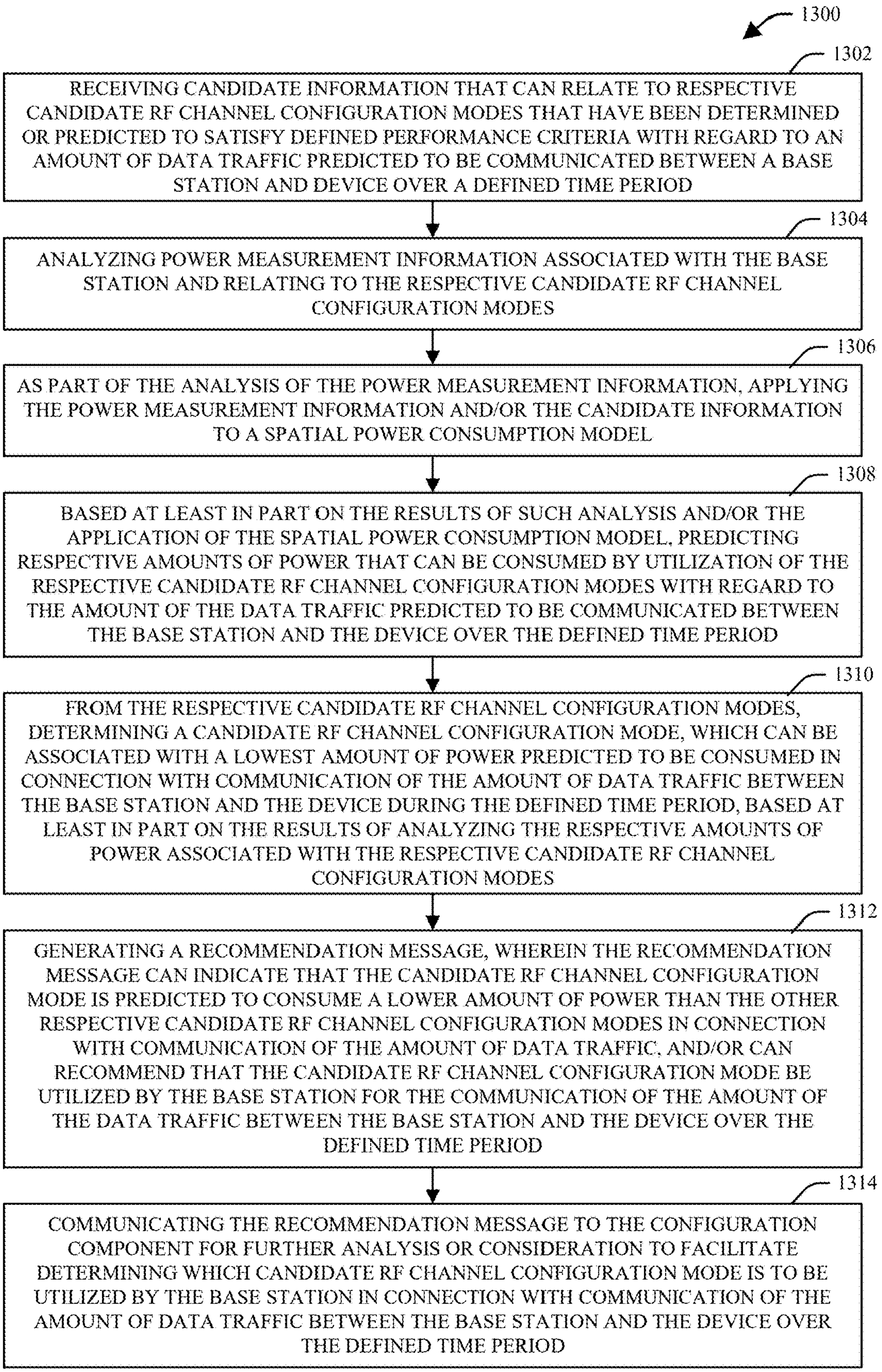
FIG. 13 depicts a flow chart of an example method that can evaluate, generate a recommendation relating to, and/or rank respective candidate RF channel configuration modes with regard to respective power consumption to facilitate desirably managing RF channel configuration for a base station with regard to a communication session associated with a device to achieve desirable communication performance and network energy savings, in accordance with various aspects and embodiments of the disclosed subject matter.

FIG. 13 depicts a flow chart of an example method 1300 that can evaluate, generate a recommendation relating to, and/or rank respective candidate RF channel configuration modes with regard to respective power consumption to facilitate desirably managing RF channel configuration for a base station with regard to a communication session associated with a device to achieve desirable communication performance and network energy savings, in accordance with various aspects and embodiments of the disclosed subject matter. The method 1300 can be employed by, for example, a system comprising the configuration component, the NES state recommendation component, and the traffic predictor component that respectively can comprise or be associated with the processor component, the data store, and/or other components.

At 1302, candidate information can be received, wherein the candidate information can relate to respective candidate RF channel configuration modes that have been determined or predicted to satisfy defined performance criteria with regard to an amount of data traffic predicted to be communicated between a base station and a device over a defined time period. In some embodiments, the configuration component can perform a preliminary analysis to determine, from a group of RF channel configuration modes, the respective candidate RF channel configuration modes that are determined or predicted to satisfy the defined performance criteria with regard to the amount of data traffic predicted to be communicated between the base station and the device over the defined time period. The configuration component can generate the candidate information relating to the respective candidate RF channel configuration modes. The configuration component can communicate the candidate information to the NES state recommendation component, which can receive such candidate information.

At 1304, power measurement information associated with the base station and relating to the respective candidate RF channel configuration modes can be analyzed. At 1306, as part of the analysis of the power measurement information, the power measurement information and/or the candidate information can be applied to (e.g., input to and analyzed by) a spatial power consumption model that can model power consumption by the base station. In some embodiments, the NES state recommendation component can analyze the power measurement information to facilitate determining or predicting respective amounts of power that can be consumed by the base station (or the RAN overall) if the respective candidate RF channel configuration modes are utilized by the base station. In certain embodiments, as part of the analysis, the NES state recommendation component can apply the power measurement information and/or the candidate information to the spatial power consumption model for analysis by the spatial power consumption model.

At 1308, based at least in part on the results of such analysis and/or the application of the spatial power consumption model, respective amounts of power, which can be consumed by utilization of the respective candidate RF channel configuration modes with regard to the amount of the data traffic predicted to be communicated between the base station and the device over the defined time period, can be predicted. For instance, the NES state recommendation component can determine (e.g., calculate) the respective amounts of power predicted to be consumed by utilization of the respective candidate RF channel configuration modes with regard to the amount of the data traffic predicted to be communicated between the base station and the device over the defined time period, based at least in part on the results of analyzing the power measurement information and/or the candidate information, and/or the application of the spatial power consumption model (e.g., the inputting of the power measurement information and/or the candidate information to such model, and the analysis by such model of, or application of such model to, the power measurement information and/or the candidate information), such as described herein.

At 1310, from the respective candidate RF channel configuration modes, a candidate RF channel configuration mode, which can be associated with a lowest amount of power predicted to be consumed in connection with communication of the amount of data traffic between the base station and the device during the defined time period, can be determined, based at least in part on the results of analyzing the respective amounts of power associated with the respective candidate RF channel configuration modes. For instance, the NES state recommendation component can analyze the respective amounts of power associated with the respective candidate RF channel configuration modes. Based at least in part on the results of such analysis, the NES state recommendation component can determine the lowest amount of power that is predicted to be consumed in connection with communication of the amount of data traffic between the base station and the device during the defined time period, and can determine the candidate RF channel configuration mode associated with (e.g., predicted to consume) the lowest amount of power.

At 1312, a recommendation message can be generated, wherein the recommendation message can indicate that the candidate RF channel configuration mode is predicted to consume a lower amount of power than the other respective candidate RF channel configuration modes in connection with communication of the amount of data traffic, and/or can recommend that the candidate RF channel configuration mode be utilized by the base station for the communication of the amount of the data traffic between the base station and the device over the defined time period. At 1314, the recommendation message can be communicated to the configuration component for further analysis or consideration by the configuration component to facilitate determining which candidate RF channel configuration mode is to be utilized by the base station in connection with communication of the amount of data traffic between the base station and the device over the defined time period. The NES state recommendation component can generate the recommendation message, and can communicate the recommendation message to the configuration component for further analysis or consideration by the configuration component.

Figure 14:
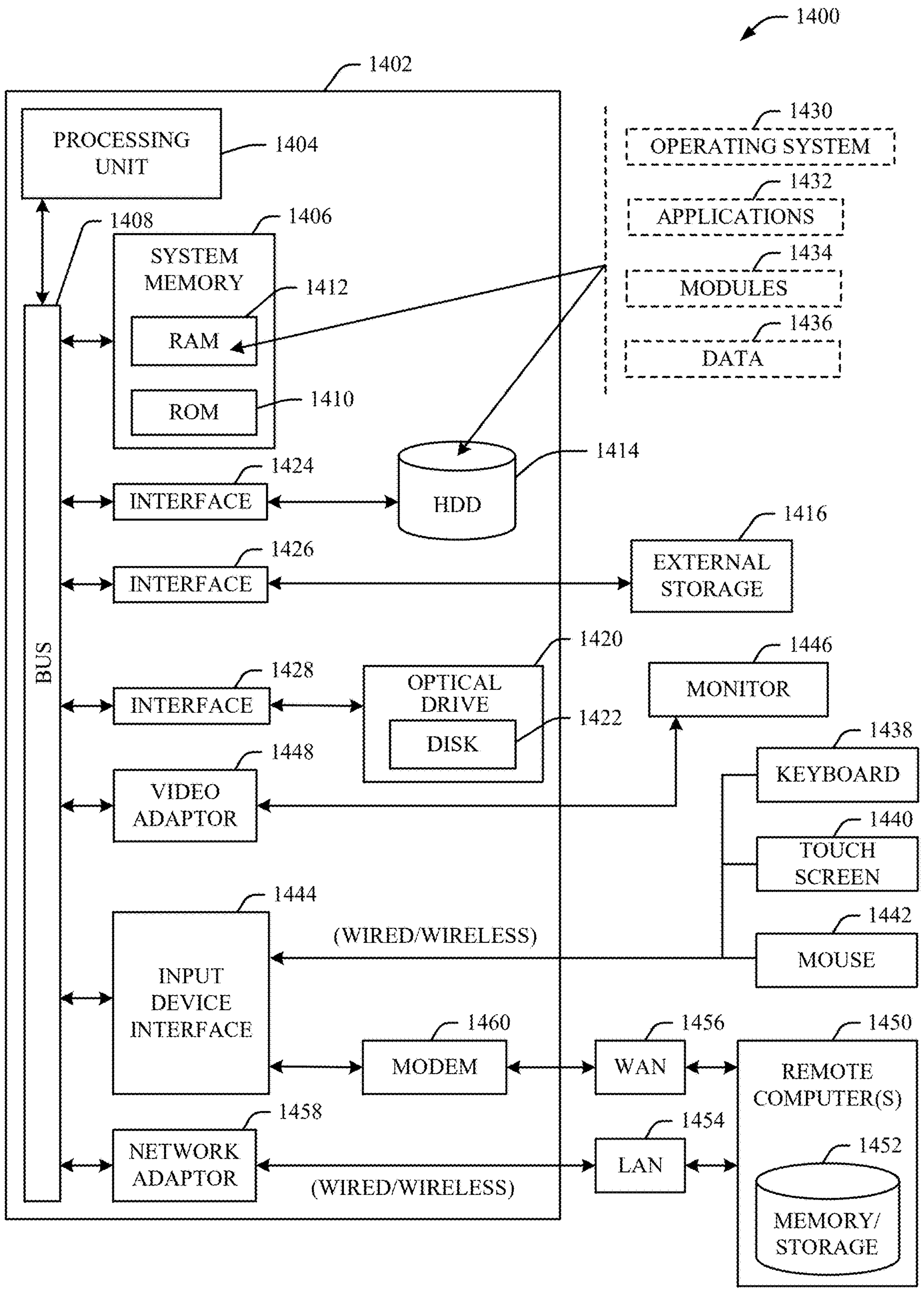
FIG. 14 illustrates an example block diagram of an example computing environment in which the various embodiments of the embodiments described herein can be implemented.

In order to provide additional context for various embodiments described herein, FIG. 14 and the following discussion are intended to provide a brief, general description of a suitable computing environment 1400 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 also can be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456, e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), IoT device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, UE, communication network, core network, RAN, base station, configuration manager component, configuration component, traffic predictor component, NES state component, mobility predictor component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

from a group of radio frequency channel configuration modes, determining, by a system comprising at least one processor, respective radio frequency channel configuration modes that are able to satisfy a defined performance criterion associated with a device with regard to an amount of data traffic expected to be communicated between a base station and the device over a defined time period, the determining of the respective radio frequency channel configuration modes being based on a group of performance indicators and a communication condition associated with the device;

determining, by the system, respective amounts of power expected to be consumed by utilization of the respective radio frequency channel configuration modes with regard to the amount of the data traffic expected to be communicated between the base station and the device over the defined time period, the determining of the respective amounts of power being based on power measurement information associated with the base station and a spatial power consumption model that models power consumption by the base station; and from the respective radio frequency channel configuration modes, determining, by the system, a radio frequency channel configuration mode to be utilized by the base station for communication of the data traffic between the base station and the device, the determining of the radio frequency channel configuration mode being based on a determination that an amount of power expected to be consumed by utilization of the radio frequency channel configuration mode is lower than other amounts of power expected to be consumed by utilization of other radio frequency channel configuration modes of the respective radio frequency channel configuration modes.

2. The method of claim 1, further comprising:

performing, by a trained decision tree regressor model or a trained long short-term memory model of the system, a machine learning-based analysis on traffic information relating to previous data traffic associated with devices associated with a distributed unit of the base station; and predicting, by the trained decision tree regressor model or the trained long short-term memory model of the system, an overall amount of data traffic to be communicated between the distributed unit and the devices over the defined time period based on a result of the machine learning-based analysis, wherein the overall amount of the data traffic comprises the amount of the data traffic to be communicated between the base station and the device over the defined time period.

3. The method of claim 1, further comprising:

performing, by a trained model of the system, a machine learning-based analysis on traffic information relating to previous data traffic associated with devices associated with a group of distributed units associated with a radio access network comprising a group of base stations comprising the base station; and predicting, by the trained model of the system, respective amounts of data traffic to be communicated between the group of distributed units and the devices during respective time periods based on a result of the machine learning-based analysis, wherein the predicting of the respective amounts of the data traffic facilitates predicting the amount of the data traffic to be communicated between the base station and the device over the defined time period.

4. The method of claim 1, further comprising:

receiving, by the system from at least one radio unit associated with at least one base station, the power measurement information associated with at least the one radio unit, wherein at least the one base station comprises the base station;

analyzing, by the system, the power measurement information associated with at least the one radio unit, wherein the determining of the respective amounts of power comprises determining the respective amounts of power expected to be consumed by radio access network equipment by utilization of the respective radio frequency channel configuration modes with regard to the amount of the data traffic expected to be communicated between the base station and the device over the defined time period, based on a first result of the analyzing and the spatial power consumption model that models the power consumption by the radio access network equipment under respective conditions and using the respective radio frequency channel configuration modes, and wherein the radio access network equipment comprises the base station;

based on a second result of comparing the respective amounts of power, determining, by the system, that the amount of power expected to be consumed by utilization of the radio frequency channel configuration mode by the base station is lower than the other amounts of power expected to be consumed by utilization of the other radio frequency channel configuration modes by the base station; and generating, by the system, recommendation information that recommends the radio frequency channel configuration mode be utilized by the base station for the communication of the data traffic between the base station and the device, based on the determining that the amount of power expected to be consumed by utilization of the radio frequency channel configuration mode is lower than the other amounts of power expected to be consumed by utilization of the other radio frequency channel configuration modes.

5. The method of claim 1, further comprising:

predicting, by the system, mobility of the device based on communication conditions associated with the device, wherein the mobility relates to movement of the device; and analyzing, by the system, mobility information and handover information relating to the device, wherein the mobility information relates to the predicting of the mobility of the device, wherein the handover information relates to one or more handovers of the device between cells associated with a group of base stations comprising the base station, and wherein the determining, from the group of radio frequency channel configuration modes, the respective radio frequency channel configuration modes that are able to satisfy the defined performance criterion associated with the device comprises determining, from the group of radio frequency channel configuration modes, the respective radio frequency channel configuration modes that are able to satisfy the defined performance criterion associated with the device with regard to the amount of data traffic expected to be communicated between the base station and the device over the defined time period, based on a result of the analyzing of the mobility information and the handover information, and based on the group of performance indicators and the communication condition associated with the device.

6. The method of claim 5, wherein the group of radio frequency channel configuration modes comprises a mode that involves increasing a number of radio-frequency multiple-input, multiple-output spatial layers to be utilized for the communication of the data traffic between the base station and the device, and wherein the method further comprises:

based on the result of the analyzing indicating that the device is moving away from the base station, determining, by the system, that the mode is not to be included in the respective radio frequency channel configuration modes that are able to satisfy the defined performance criterion; or based on the result of the analyzing indicating that the device is moving toward the base station or is stationary with respect to the base station, determining, by the system, that the mode is able to be considered for inclusion in the respective radio frequency channel configuration modes.

7. The method of claim 1, further comprising:

based on the determining of the radio frequency channel configuration mode:

initiating, by the system, setting or adjusting a first number of transmit or receiver antennas of the base station to be utilized for the communication of the data traffic between the base station and the device;

initiating, by the system, setting or adjusting a second number of radio-frequency multiple-input, multiple-output spatial layers to be utilized by the base station for the communication of the data traffic between the base station and the device;

initiating, by the system, setting or adjusting a modulation and coding scheme value, of a group of modulation and coding scheme values, that is to be utilized by the base station for the communication of the data traffic between the base station and the device; or initiating, by the system, setting or adjusting a transmit diversity to be utilized by the base station for the communication of the data traffic between the base station and the device.

8. The method of claim 1, wherein the defined performance criterion is a first defined performance criterion, and wherein the method further comprises:

subsequent to implementing the radio frequency channel configuration mode at the base station, receiving, by the system from the base station, power consumption information and performance indicator information, wherein the power consumption information indicates a first effect on the power consumption of radio access network equipment relating to the implementing of the radio frequency channel configuration mode, wherein the performance indicator information indicates a second effect on the group of performance indicators relating to the implementing of the radio frequency channel configuration mode, and wherein the radio access network equipment comprises the base station;

performing, by a trained model of the system, a machine learning-based analysis on the power consumption information and the performance indicator information; and based on results of the machine learning-based analysis:

determining, by the system, whether the power consumption of the radio access network equipment has been reduced due to the implementing of the radio frequency channel configuration mode, and determining, by the system, whether the group of performance indicators has been improved according to a second defined performance criterion due to the implementing of the radio frequency channel configuration mode.

9. The method of claim 8, further comprising:

determining, by the system, a reward value based on the determining of whether the power consumption of the radio access network equipment has been reduced, and based on the determining of whether the group of performance indicators has been improved according to the second defined performance criterion, due to the implementing of the radio frequency channel configuration mode; and based on the reward value and a defined threshold reward value, determining, by the system, whether to perform an action relating to adjustment of the radio frequency channel configuration mode.

10. The method of claim 9, wherein the group of radio frequency channel configuration modes comprises a first radio frequency channel configuration mode and a second radio frequency channel configuration mode, wherein the radio frequency channel configuration mode is the first radio frequency channel configuration mode, and wherein the method further comprises:

based on determining that the reward value satisfies the defined threshold reward value, determining, by the system, that the first radio frequency channel configuration mode is to continue to be utilized by the base station for communication of subsequent data traffic between the base station and the device; or based on determining that the reward value does not satisfy the defined threshold reward value, determining, by the system, that the action is to be performed to transition from the first radio frequency channel configuration mode to the second radio frequency channel configuration mode that is to be utilized by the base station for the communication of the subsequent data traffic between the base station and the device.

11. The method of claim 1, wherein the defined performance criterion relates to a throughput, a signal-to-noise ratio, a signal-to-interference-plus-noise ratio, a received signal strength indicator, a reference signal received power value, a reference signal received quality value, a quality of service value, a channel quality indicator, a data packet loss rate, an amount of latency, a spectral efficiency value, a bit error rate, or a block error rate, associated with the data traffic or a communication channel associated with the device.

12. A system, comprising:

at least one memory that stores computer executable components; and at least one processor that executes computer executable components stored in the at least one memory, wherein the computer executable components comprise:

a channel configurator that, from a group of radio frequency channel configuration modes, determines respective radio frequency channel configuration modes that are capable of satisfying a defined performance criterion associated with a user equipment with regard to an amount of data traffic predicted to be communicated between a base station and the user equipment over a defined time period, based on a group of performance indicators and a communication condition associated with the user equipment; and a recommendation engine that determines respective amounts of power consumption associated with utilization of the respective radio frequency channel configuration modes with regard to the amount of the data traffic predicted to be communicated between the base station and the user equipment over the defined time period, based on power measurement data associated with the base station and a spatial power consumption model that models power consumption by the base station, wherein, from the respective radio frequency channel configuration modes, the channel configurator determines a radio frequency channel configuration mode to be utilized by the base station for communication of the data traffic between the base station and the user equipment, based on a determination that an amount of power consumption associated with utilization of the radio frequency channel configuration mode is less than other amounts of power consumption associated with utilization of other radio frequency channel configuration modes of the respective radio frequency channel configuration modes.

13. The system of claim 12, wherein the computer executable components further comprise:

a traffic predictor that employs a trained decision tree regressor model or a trained long short-term memory model that performs a machine learning-based analysis on traffic information relating to previous data traffic associated with a group of user equipment, comprising the user equipment, associated with a distributed unit of the base station, wherein, based on a result of the machine learning-based analysis, the traffic predictor predicts an overall amount of data traffic to be communicated between the distributed unit and the group of user equipment over the defined time period, and wherein the overall amount of the data traffic comprises the amount of the data traffic to be communicated between the base station and the user equipment over the defined time period.

14. The system of claim 12, wherein the computer executable components further comprise:

a traffic predictor that employs a trained model that performs a machine learning-based analysis on traffic information relating to previous data traffic associated with a group of user equipment associated with a group of distributed units associated with a radio access network comprising a group of base stations comprising the base station, wherein, based on a result of the machine learning-based analysis, the traffic predictor predicts respective amounts of data traffic to be communicated between the group of distributed units and the group of user equipment during respective time periods, and wherein, based on the prediction of the respective amounts of the data traffic, the traffic predictor predicts the amount of the data traffic to be communicated between the base station and the user equipment over the defined time period.

15. The system of claim 12, wherein the recommendation engine receives, from at least one radio unit associated with at least one base station, the power measurement data associated with at least the one radio unit, wherein at least the one base station comprises the base station, wherein, based on a first result of an analysis of the power measurement data and the spatial power consumption model, the recommendation engine determines the respective amounts of power consumption associated with utilization of the respective radio frequency channel configuration modes by the base station with regard to the amount of the data traffic predicted to be communicated between the base station and the user equipment over the defined time period, wherein the spatial power consumption model models the power consumption by radio access network equipment under respective conditions and using the respective radio frequency channel configuration modes, and wherein the radio access network equipment comprises the base station.

16. The system of claim 15, wherein, based on a second result of comparing the respective amounts of power consumption, the recommendation engine determines that the amount of power consumption associated with utilization of the radio frequency channel configuration mode by the base station is less than the other amounts of power consumption associated with utilization of the other radio frequency channel configuration modes by the base station, and wherein the recommendation engine communicates, to the channel configurator, recommendation information that recommends the radio frequency channel configuration mode be utilized by the base station for the communication of the data traffic between the base station and the user equipment, based on the determination that the amount of power consumption associated with utilization of the radio frequency channel configuration mode by the base station is less than the other amounts of power consumption associated with utilization of the other radio frequency channel configuration modes by the base station.

17. The system of claim 12, wherein the channel configurator analyzes mobility information and handover information relating to the user equipment, wherein the mobility information relates to a prediction of mobility of the user equipment, wherein the handover information relates to one or more handovers of the user equipment between cells associated with a group of base stations comprising the base station, wherein the mobility relates to movement of the user equipment, and wherein, from the group of radio frequency channel configuration modes, the channel configurator determines the respective radio frequency channel configuration modes that are capable of satisfying the defined performance criterion associated with the user equipment with regard to the amount of data traffic predicted to be communicated between the base station and the user equipment over the defined time period, based on a result of the analysis of the mobility information and the handover information, and based on the group of performance indicators and the communication condition associated with the user equipment.

18. The system of claim 12, wherein, based on the determining of the radio frequency channel configuration mode, the channel configurator initiates configuration or modification of at least one of:

a first number of transmit or receiver antennas of the base station to be utilized for the communication of the data traffic between the base station and the device;

a second number of radio-frequency multiple-input, multiple-output spatial layers to be utilized by the base station for the communication of the data traffic between the base station and the device;

a modulation and coding scheme value, of a group of modulation and coding scheme values, that is to be utilized by the base station for the communication of the data traffic between the base station and the device; or a transmit diversity parameter to be utilized by the base station for the communication of the data traffic between the base station and the device.

19. A non-transitory machine-readable medium, comprising executable instructions that, when executed by at least one processor, facilitate performance of operations, comprising:

from a group of channel configuration modes, determining respective channel configuration modes that are predicted to satisfy a defined performance criterion associated with a user equipment with regard to an amount of data traffic expected to be communicated between network equipment and the user equipment over a defined time period, based on a group of performance indicators and a communication condition associated with the user equipment;

determining respective amounts of power consumption associated with utilization of the respective channel configuration modes with regard to the amount of the data traffic expected to be communicated between the network equipment and the user equipment over the defined time period, based on power measurement data associated with the network equipment and a spatial power consumption model that models power consumption by the network equipment; and from the respective channel configuration modes, determining a channel configuration mode to be utilized for communication of the data traffic between the network equipment and the user equipment, based on a determination that an amount of power consumption associated with utilization of the channel configuration mode is lower than other amounts of power consumption associated with utilization of other channel configuration modes of the respective channel configuration modes.

20. The non-transitory machine-readable medium of claim 19, wherein the operations further comprise:

based on the determining of the channel configuration mode:

initiating a configuration or modification of a first number of transmit antennas of the network equipment to be utilized for the communication of the data traffic between the network equipment and the user equipment;

initiating a configuration or modification of a second number of radio-frequency multiple-input, multiple-output spatial layers to be utilized by the network equipment for the communication of the data traffic between the network equipment and the user equipment;

initiating a configuration or modification of a modulation and coding scheme value, of a group of modulation and coding scheme values, that is to be utilized by the network equipment for the communication of the data traffic between the network equipment and the user equipment; or initiating a configuration or modification of a transmit diversity to be utilized by the network equipment for the communication of the data traffic between the network equipment and the user equipment.

* * * * *